Figures 1, 12:
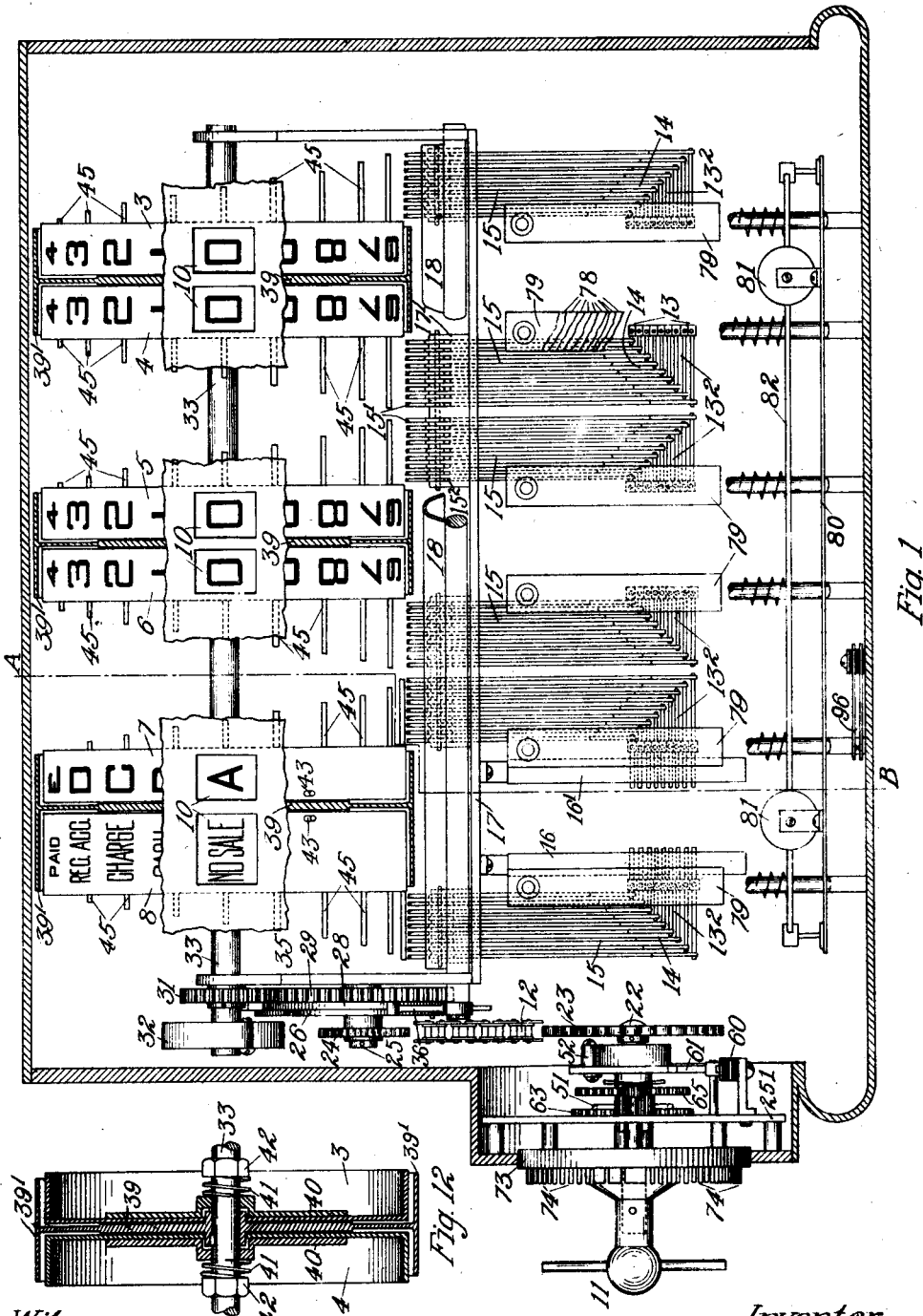

G. W. LORIMER.
REGISTERING, RECORDING, AND COMPUTING SYSTEM.
APPLICATION FILED JULY 12, 1912.

1,189,269.

Patented July 4, 1916.
16 SHEETS—SHEET 1.

Witnesses
Leigh S. Keith
J. S. Baker

Inventor
George W. Lorimer
By McMunn & ???
Attys.

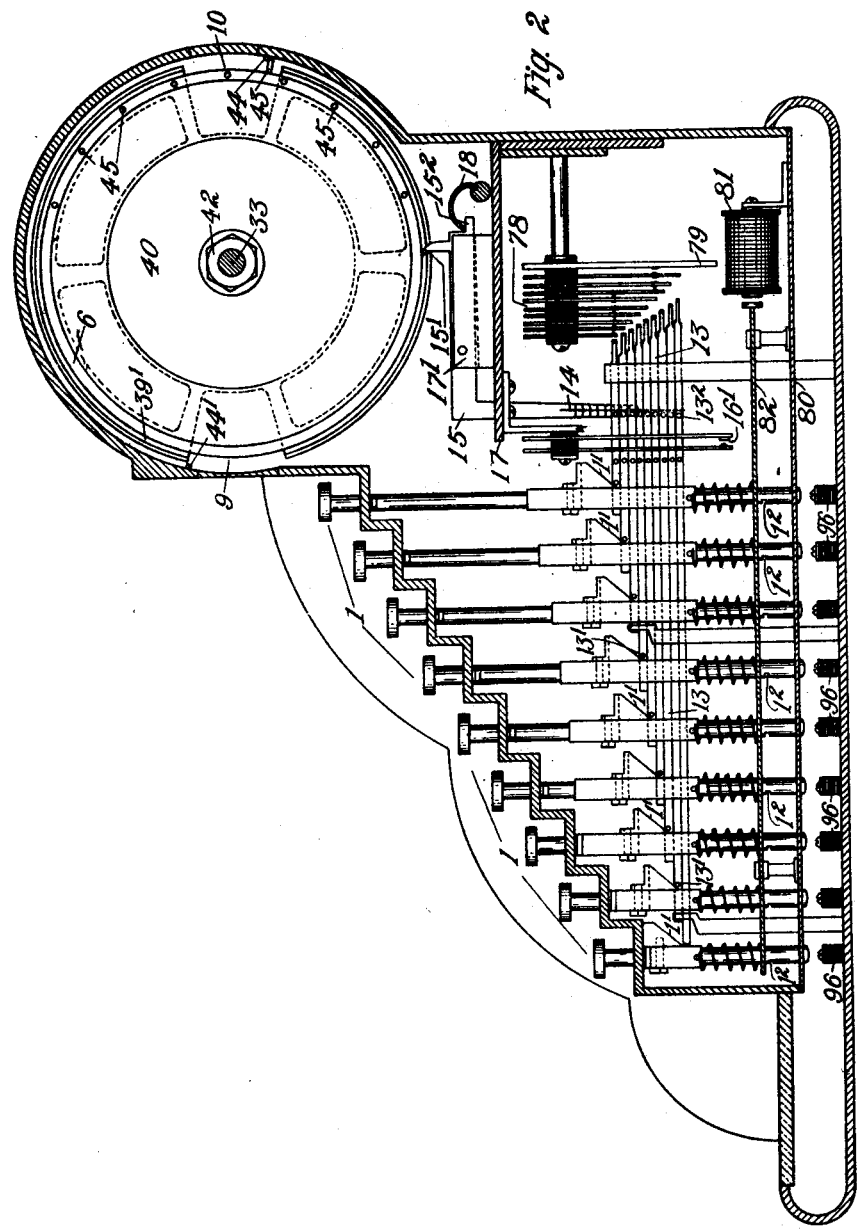

G. W. LORIMER.
REGISTERING, RECORDING, AND COMPUTING SYSTEM.
APPLICATION FILED JULY 12, 1912.

1,189,269.

Patented July 4, 1916.
16 SHEETS—SHEET 3.

Witnesses

Inventor
George W. Lorimer
By McMeen & Miller
Attys

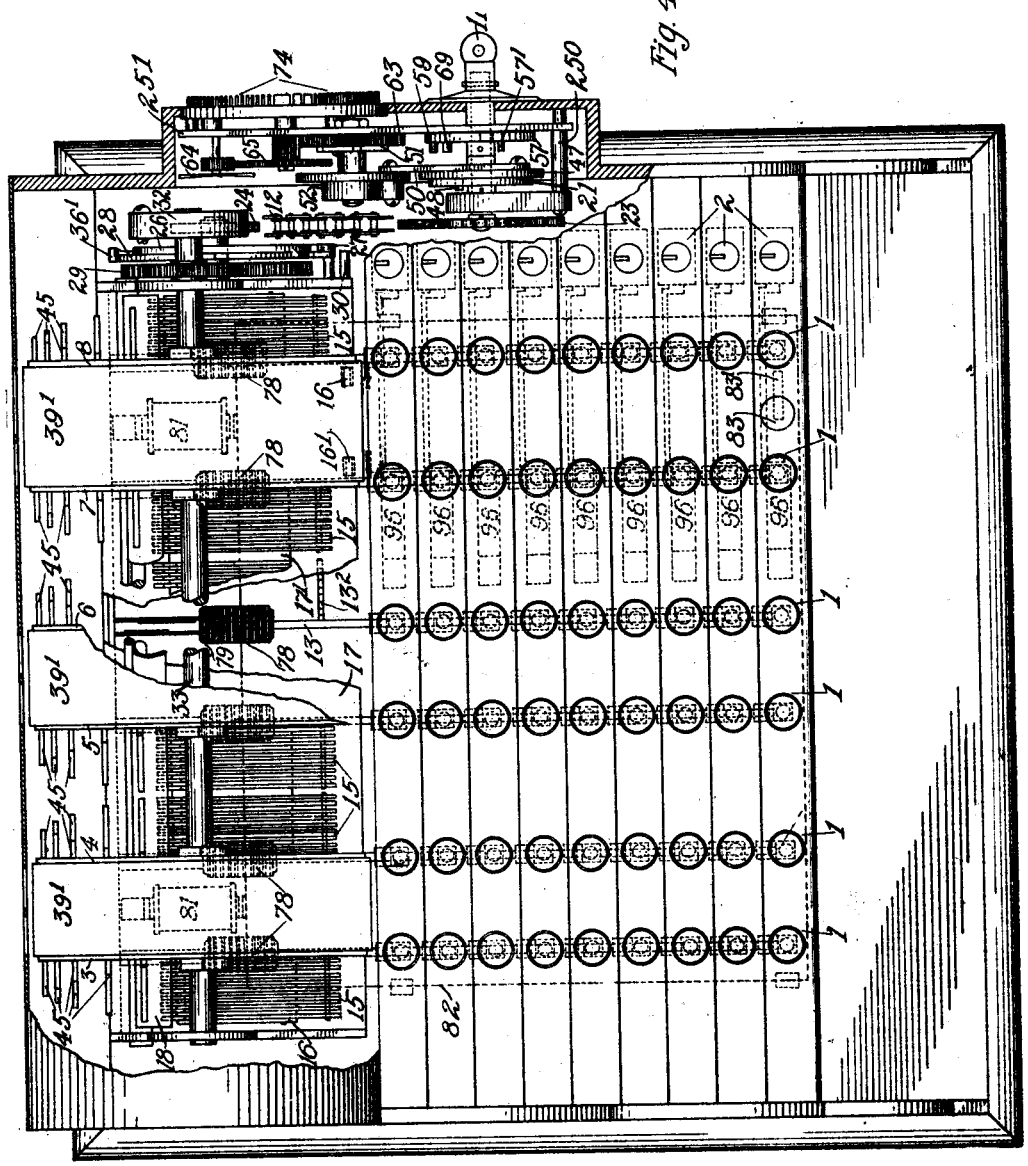

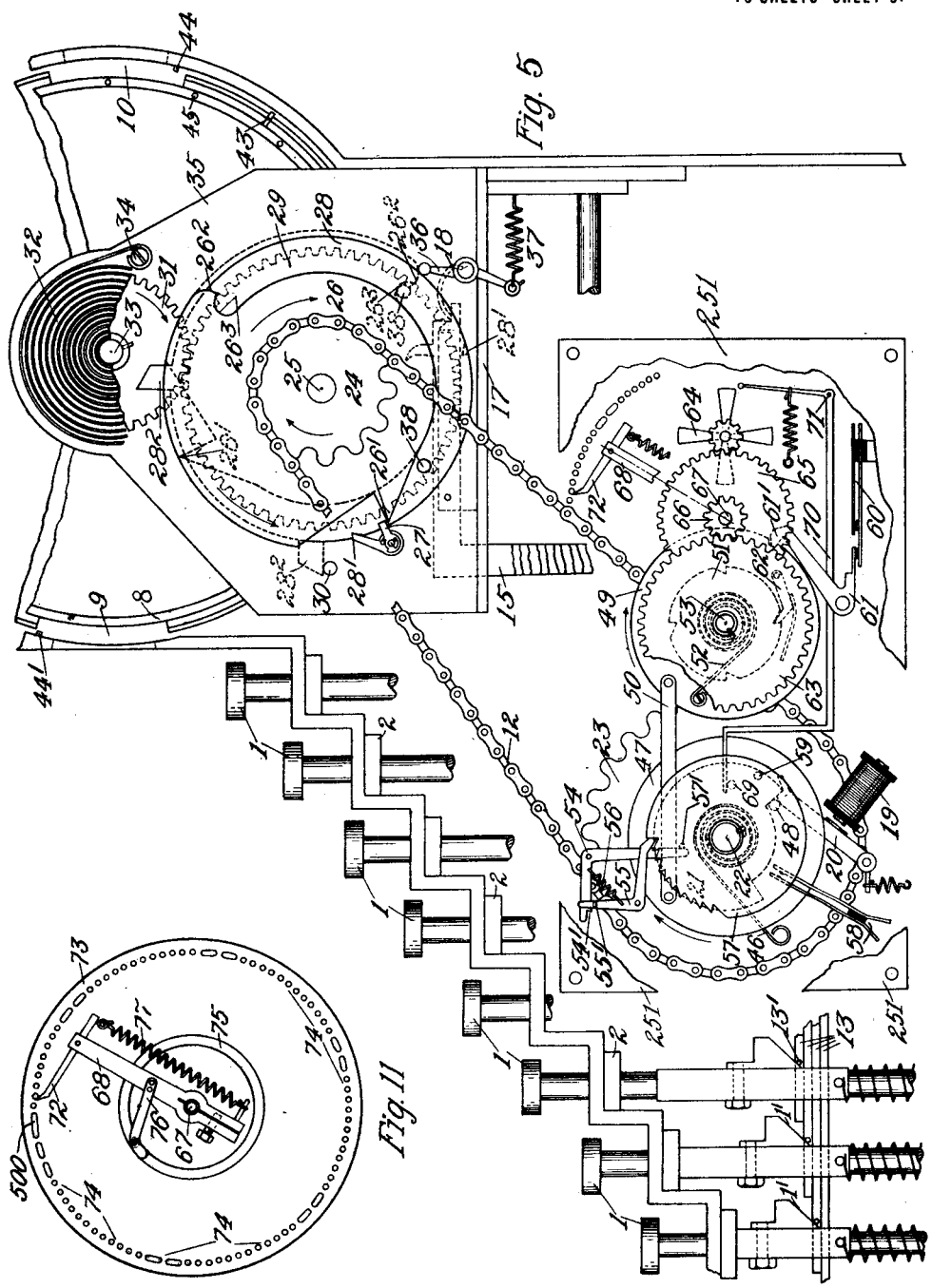

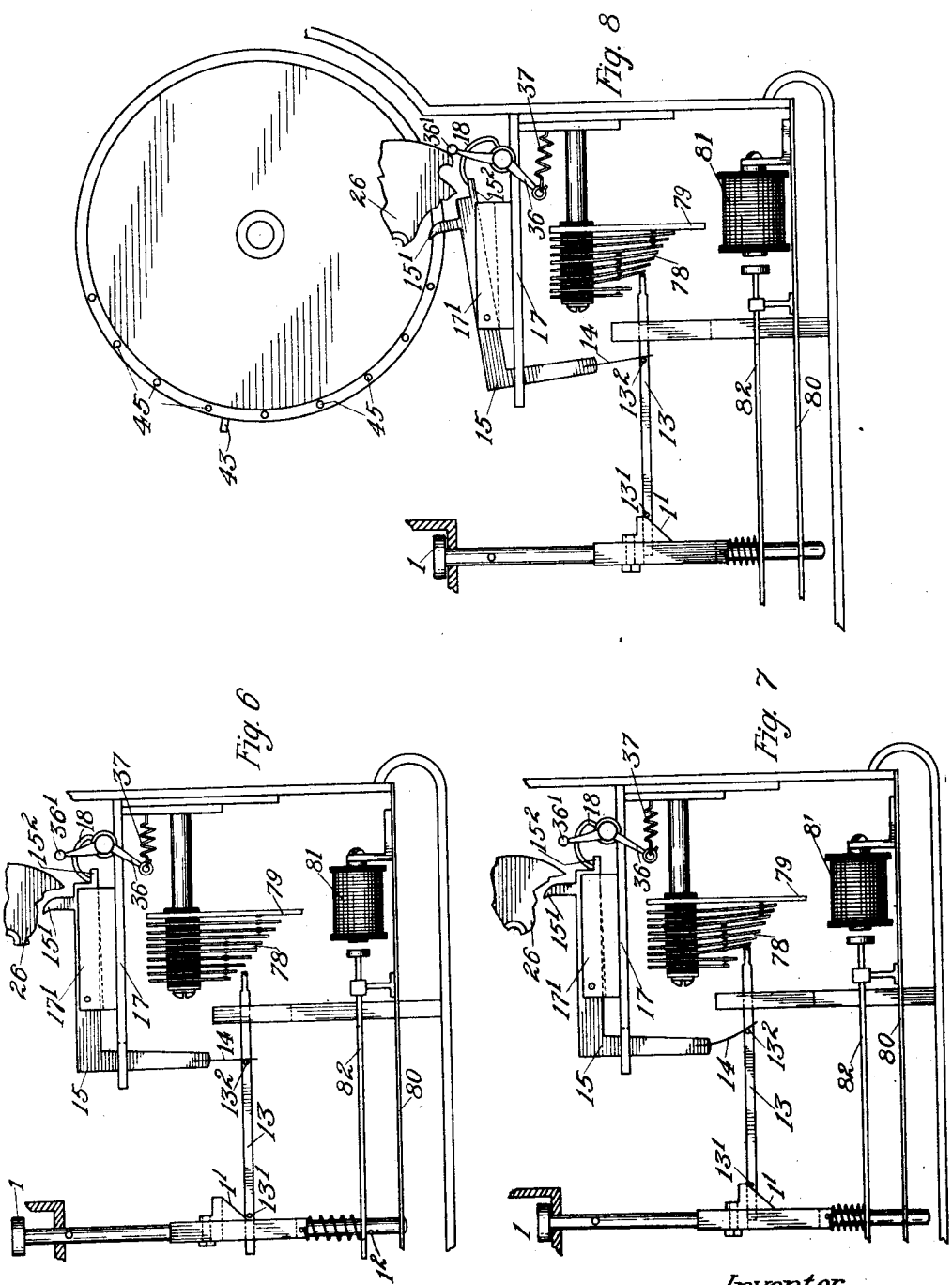

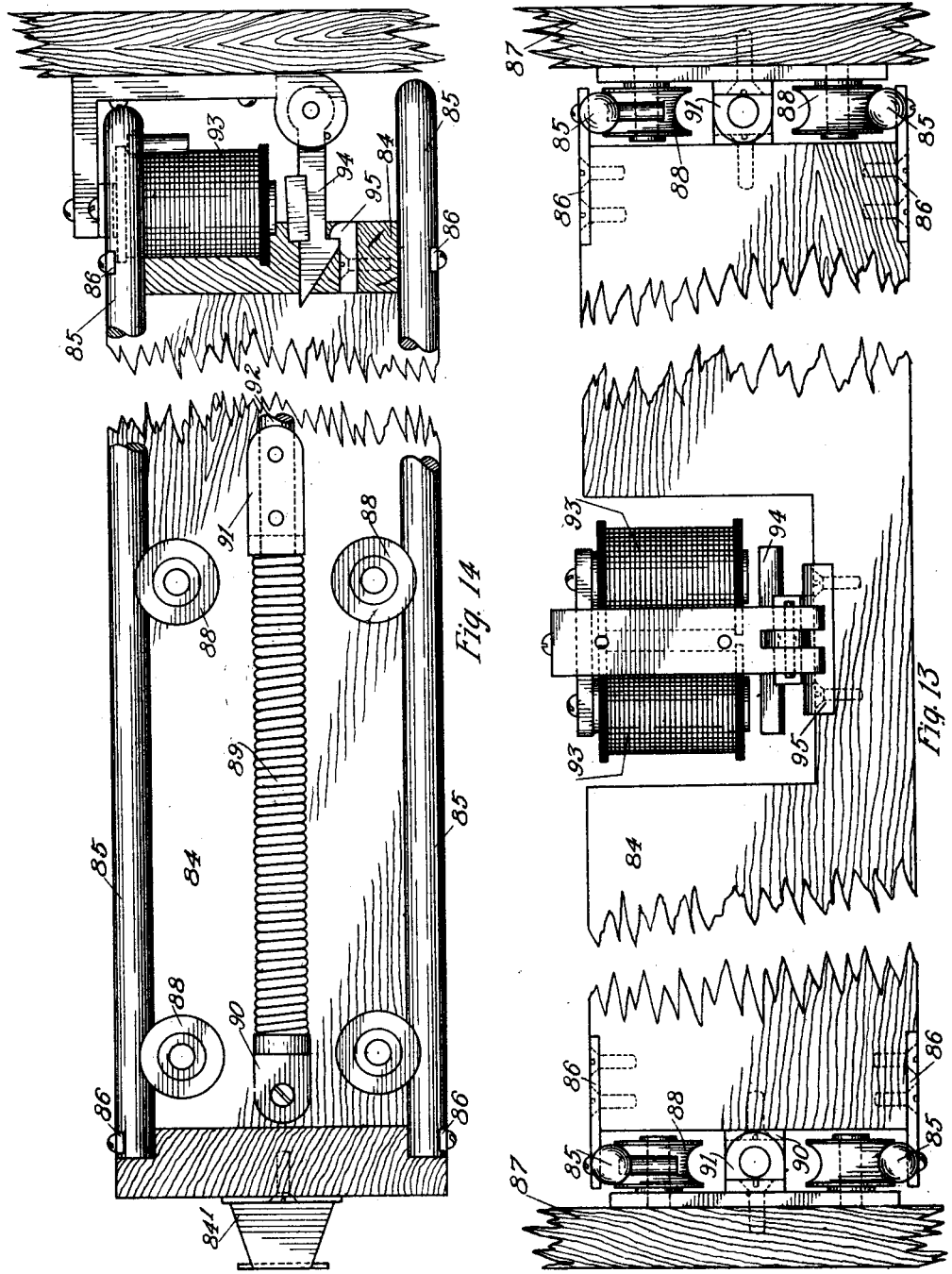

G. W. LORIMER.
REGISTERING, RECORDING, AND COMPUTING SYSTEM.
APPLICATION FILED JULY 12, 1912.
1,189,269.
Patented July 4, 1916
16 SHEETS—SHEET 8.
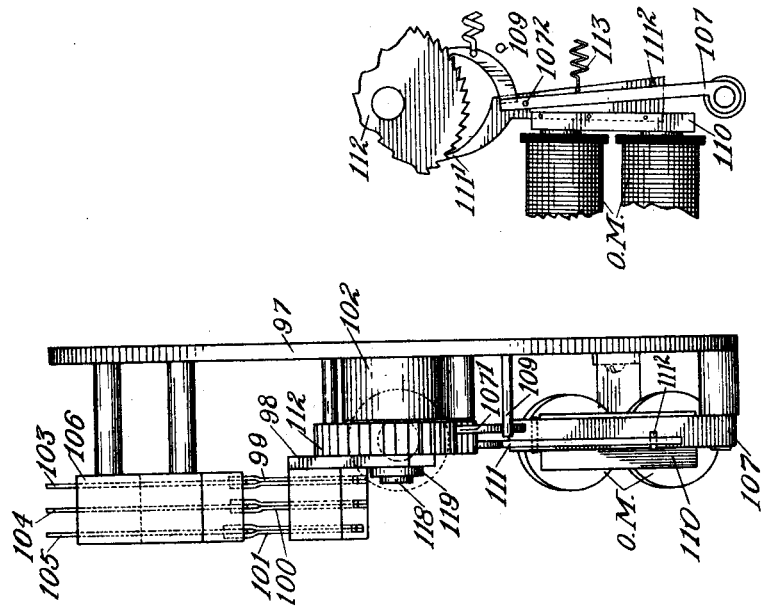
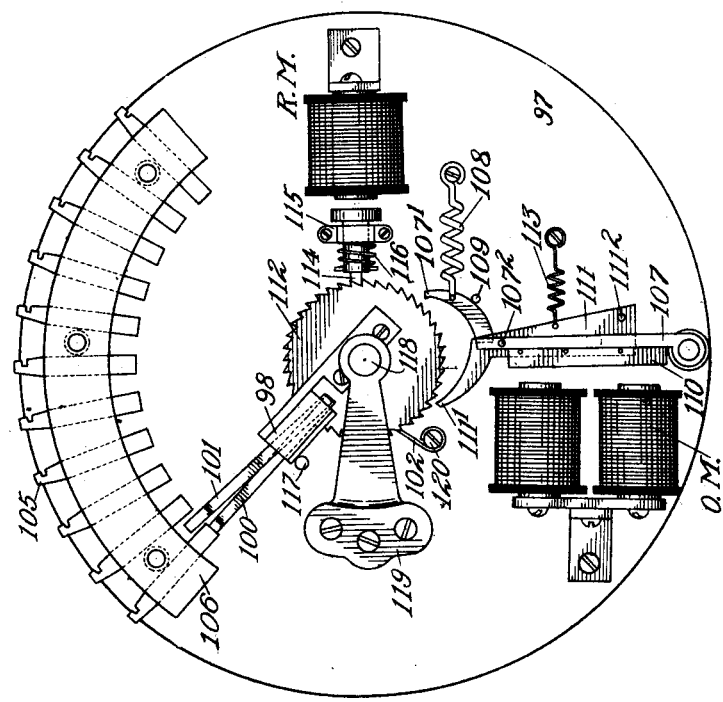
Witnesses
Leigh S. Keith
J. S. Baker
Inventor
George W. Lorimer
By McMeen & McMeen
Attys

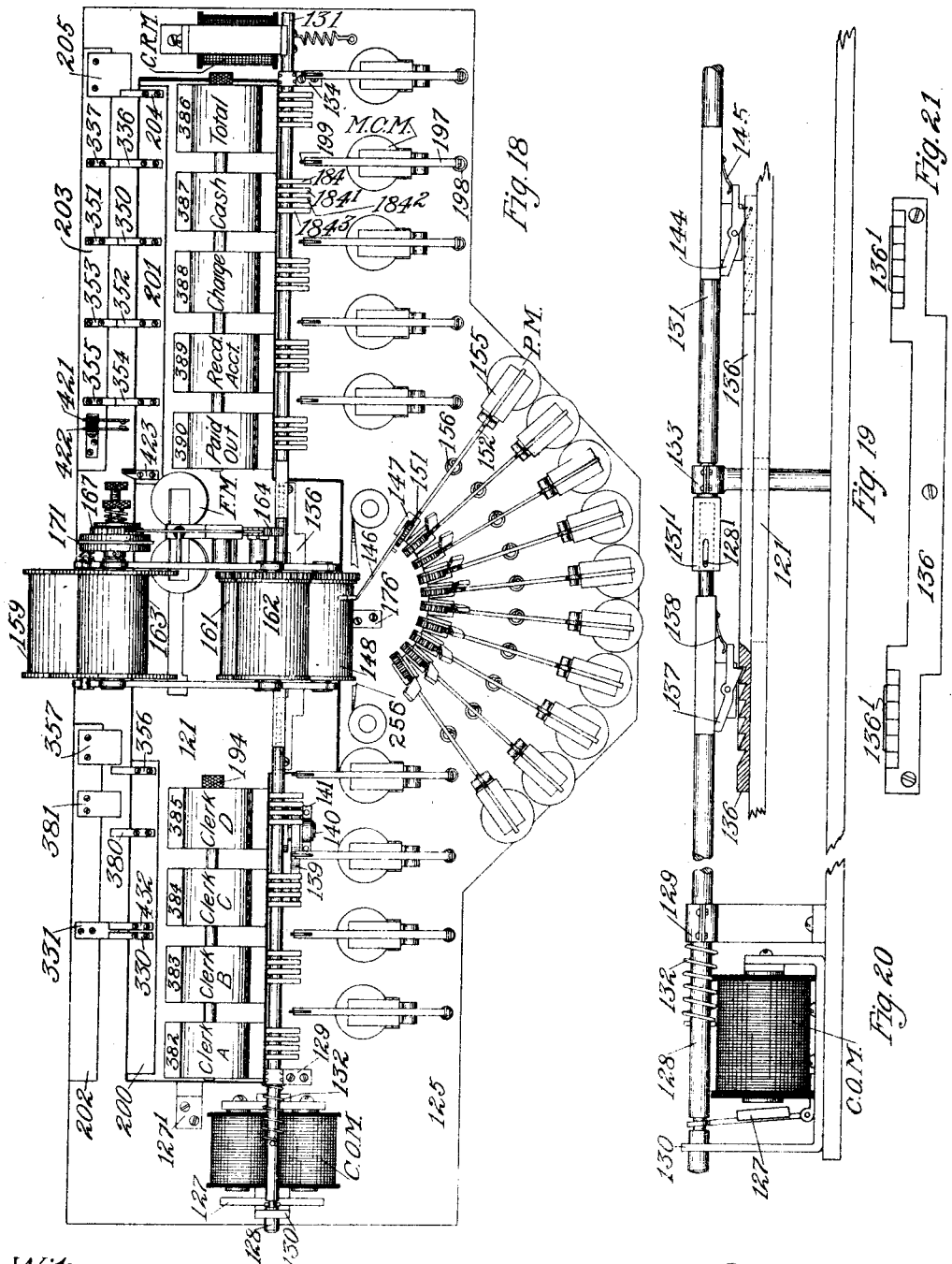

G. W. LORIMER.
REGISTERING, RECORDING, AND COMPUTING SYSTEM.
APPLICATION FILED JULY 12, 1912.

1,189,269. Patented July 4, 1916.
16 SHEETS—SHEET 10.

Witnesses
Inventor
George W. Lorimer
By McMeen & Miller
Attys

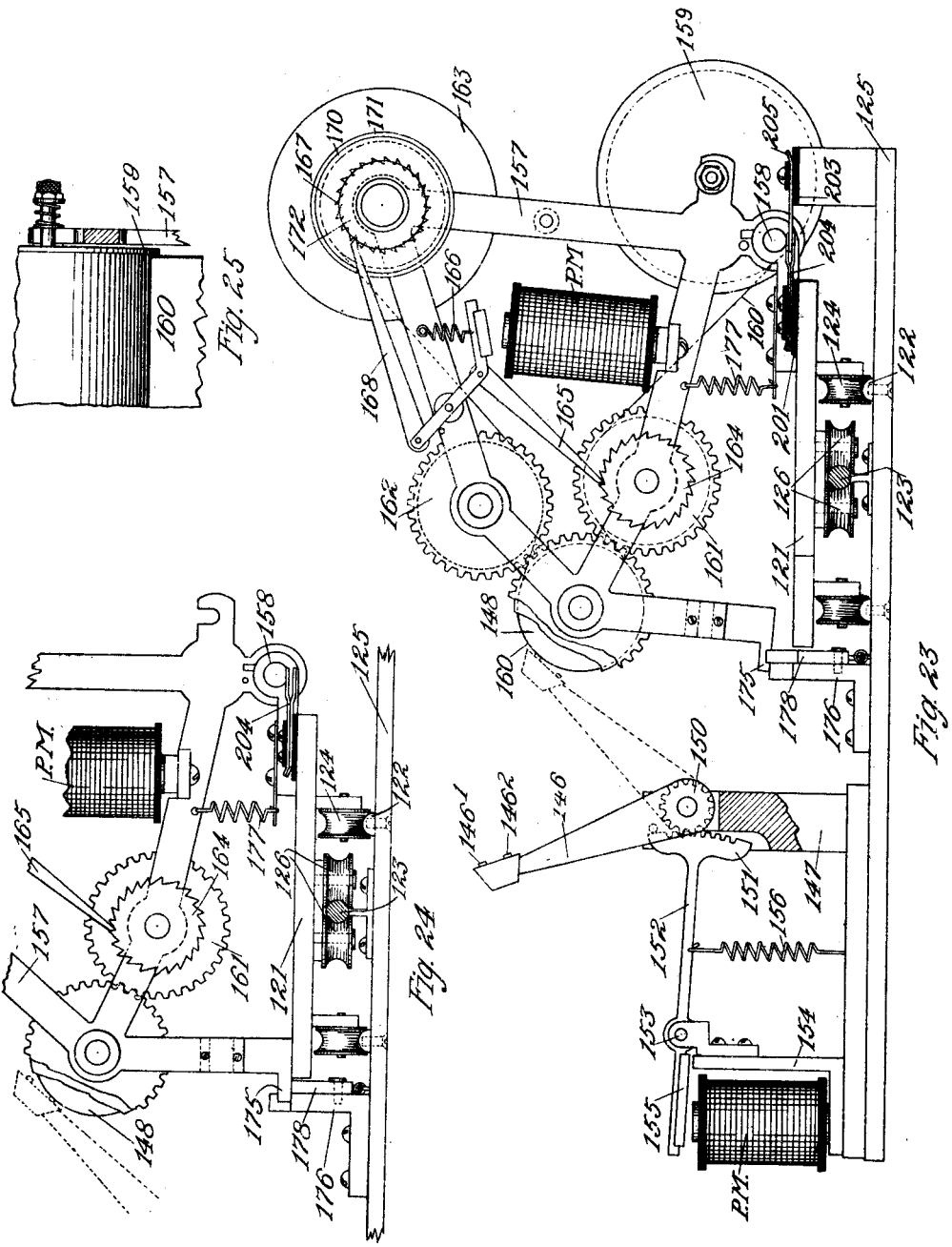

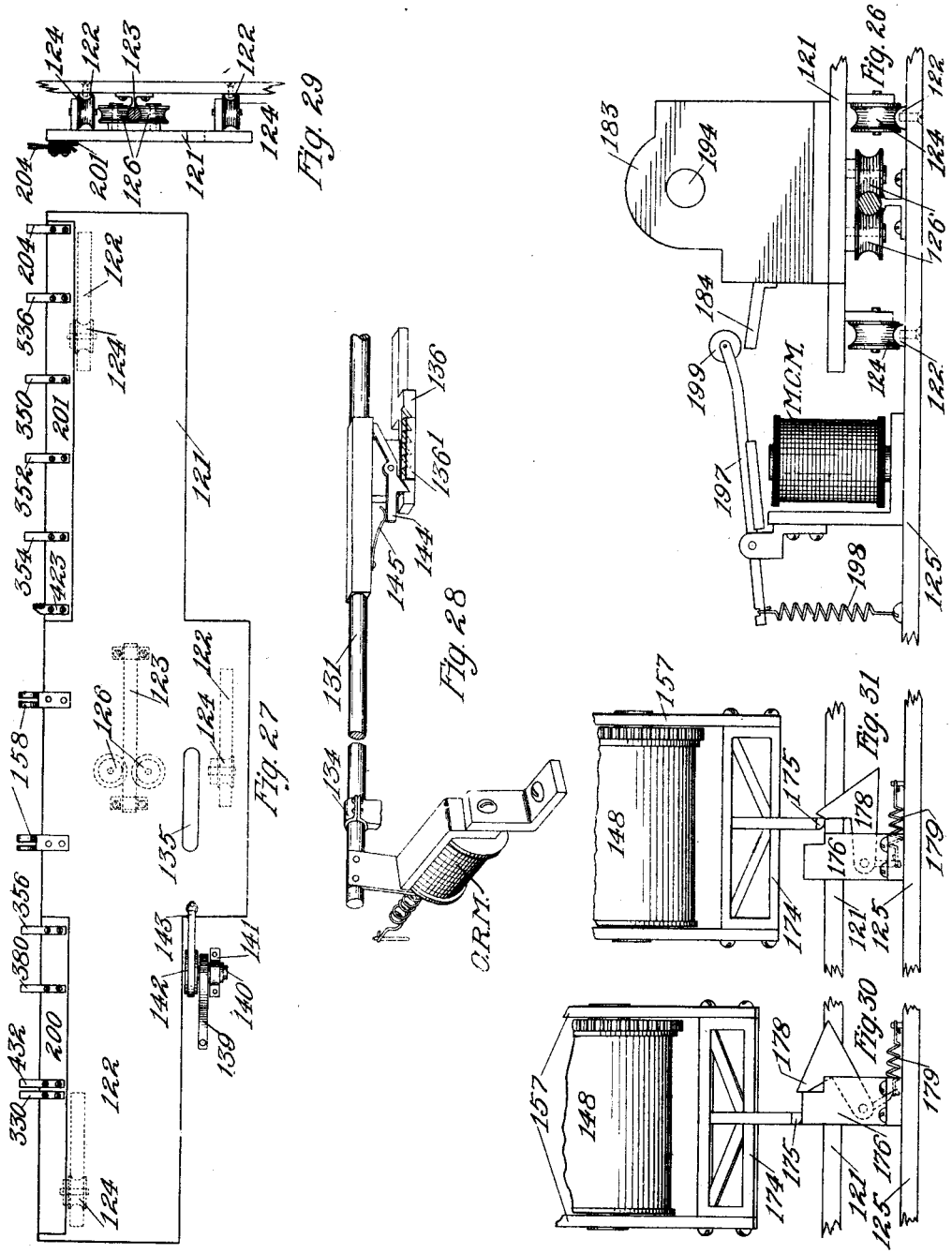

G. W. LORIMER.
REGISTERING, RECORDING, AND COMPUTING SYSTEM.
APPLICATION FILED JULY 12, 1912.

1,189,269.

Patented July 4, 1916
16 SHEETS—SHEET 13.

Witnesses
Leigh S. Keith
J. S. Baker

Inventor
George W. Lorimer
By McMeen Miller
Attys

G. W. LORIMER.
REGISTERING, RECORDING, AND COMPUTING SYSTEM.
APPLICATION FILED JULY 12, 1912.

1,189,269.

Patented July 4, 1916.
16 SHEETS—SHEET 16.

Witnesses
Leigh S. Keith
J. S. Baker

Inventor
George W. Lorimer
By McMeen & Miller
Attys

UNITED STATES PATENT OFFICE.

GEORGE W. LORIMER, OF PIQUA, OHIO, ASSIGNOR TO THE NATIONAL CASH REGISTER COMPANY, OF DAYTON, OHIO, A CORPORATION OF OHIO, (INCORPORATED IN 1906.)

REGISTERING, RECORDING, AND COMPUTING SYSTEM.

1,189,269.   Specification of Letters Patent.   Patented July 4, 1916.

Application filed July 12, 1912. Serial No. 709,042.

*To all whom it may concern:*

Be it known that I, GEORGE W. LORIMER, a citizen of the United States, and a resident of Piqua, county of Miami, and State of Ohio, have invented a new and useful Improvement in Registering, Recording, and Computing Systems, of which the following is a specification.

Broadly, the object of my invention is to produce an electromechanical registration and recording system which shall attain the advantage of simplicity, low cost of installation and maintenance, great flexibility of function, and maximum capability of not only indicating or registering business or other transactions, but of maintaining such a record of these transactions as will at all times afford the necessary data for a complete audit.

My invention, in the form particularly illustrated in this application, is adapted for indicating, registering and recording data concerning sales or other business transactions, the amounts of which are expressible in money values. I refer to it, therefore, particularly as a cash register system, but I desire it to be understood that my invention in its broader aspects is equally adaptable to the indication, registering and recording of other data than that expressible in money values, such, for instance, as data relating to time, as in cost accounting systems in shops or other commercial establishments; or such, for another instance, as data relating to weights and measures, or the counting of finished and unfinished articles in factory or other stock-room accounting systems. While, therefore, I have in the subsequent portion of this specification described my invention particularly as one for recording amounts expressible in dollars and cents, it is obvious that it lies within the spirit of my invention to indicate, register and record any other units than those of money. Thus, if applied to a time recording system in a factory, hours and minutes could be substituted for dollars and cents. Similarly, if applied to stock-room purposes, either the number of articles or the weight or other measure of such article could be registered and recorded as received or withdrawn.

My invention in the form particularly developed in this application is adapted for indicating, registering and recording data concerning sales or other transactions, the amounts of which are expressible in money values. I refer to it particularly, therefore, as a cash register system, following the usual parlance of the art, but I desire it to be understood that my invention, in its broad aspects, is equally adaptable to the indicating, registering and recording of other data than that relative to money and expressible in money values, such for instance as data relative to time, as in cost accounting systems in shops or other commercial establishments, or such, for another instance, as those relating to weights and measures as in factory or other stock-room accounting systems.

A feature of importance of my invention is that of remote control; that is, the control of the registering and recording or printing devices, which may be located at some central point, as in the manager's office, from the various clerks' or salesmen's stations located at remote points in the store or other establishment. This feature of remote control, while forming a principal advantage of my complete register system in its broadest application, is not a necessary feature, since many of the other advantages inherent in my invention may be utilized by its application to a register where the registering and printing or recording devices are at the same point as the point of control, as in the case of the ordinary mechanical cash register system.

In the present art, the cash register, on the one hand, and the various pneumatic tube and cash carrier systems, on the other hand, form two important adjuncts to facilitate the handling of business in stores and other establishments. The cash register has the advantage of enabling the salesman or clerk to make change for the customer with a minimum amount of time, and, in the more elaborate cash register systems, it has the further advantage of affording a check on the transactions of each salesman or clerk. The cash register system, however, particularly where employed in large establishments, has the disadvantage of not affording the best facilities for supervision from a central point. Where the various cash carrier systems are used, a loss of time on the part of both the customer and the clerk is entailed, due to the necessary mechanical transmission of the money received, to the cashier and the re-transmission of the receipt and change back to the clerk who made the sale. This is objectionable, not only in that it causes impatience on the part of the customer, but also, because it divides the attention of the clerk between a customer who is waiting for his change and a new customer to whom he may be making a sale. The cash carrier system has a further disadvantage. It requires the presence of one or more cashiers, in addition to the clerks or salesmen. The carrier system, however, has the advantage, not possessed by the ordinary cash register system, of permitting some supervision of the business from a central point as it is being transacted.

It is one of the principal objects of my electromechanical cash register system to combine the advantages of both the ordinary cash register system and the cash carrier system, by making it possible for each clerk or salesman to make change for the customer, thus avoiding the delay on the part of the customer and the division of attention on the part of the clerk, and at the same time to automatically transmit to the manager's office, or other point, the complete information concerning the amount and character of the sale, and to leave a permanent record of it, properly classified, there. The same act, by which the clerk or salesman opens his cash drawer and records the amount and character of the sale or transaction, results in the figures being displayed to the customer and also to the clerk or salesman in the same manner as in the ordinary cash register system.

While the ordinary cash register provides, in part, against the loss of time inherent to the pneumatic tube and carrier systems by permitting the clerk to make the proper change, so that the clerk and customer may both immediately attend to other duties, yet the great cost of a multiplicity of these machines in large stores, coupled with the inability of the management to know just what business is being done until the different registers are inspected, usually at the close of the day, often makes the universal adoption of cash registers in very large stores prohibitive. In my system, I not only save the time of the customer and allow the clerk or salesman to do more effective work and at the same time provide for the immediate and constant supervision from some central point, but I provide apparatus of such greatly simplified structure as to largely reduce the objectionable feature of first cost and subsequent cost of up-keep. In addition to these advantages, it is the object of my invention to attain an even more complete classification of the business transactions of an establishment, registering and recording of the amounts of business transacted in each class, and totalizing of all business in all classes, than has ever before been achieved by even the most complicated of the cash register systems known to me.

For the sake of clearness and brevity, I will refer to the station in the manager's or supervisor's office, at which the registering and recording or printing apparatus is located, as the "home station", and to those stations where the control and local indicating apparatus manipulated by the clerks or salesmen is located as the "remote stations" or "clerks' stations". It is to be understood, therefore, that the apparatus at the remote stations is provided with means whereby the clerk may set up, by keys or otherwise, the amount of the transaction, character of the transaction and the designation by which he himself is identified. The figures and characters so set up are displayed, preferably by mechanical means, to the customer and also to the clerk. The indication so set up is transmitted electrically to the home station, where by electro-magnetic means it is both registered and printed or otherwise recorded under the proper classification. A running total of the amount of business under each classification as to the amount of business and a running total of the amount of business transacted by each clerk is kept, as is also a running total of the entire volume of business. These running totals appear on registers, so as to be constantly available for inspection. In addition to the registration of the different items and their resultant total under each classification, a printing device, located preferably at the home station, produces a permanent detailed record, item by item, showing not only the amount, but the character of business and clerk by whom it was transacted.

Another object of my invention is to provide for the proper manipulation of the mechanism so as to prevent fraud or false registrations. In furthering this object, I so safeguard my apparatus as to make it impossible for the acts of one clerk to interfere with those of another, or for one clerk, by his own improper act, to cause a wrong registration through inadvertence or design. To further safeguard against fraud or mistake, I provide that no registration or recording shall occur until the clerk making it shall have set up, as a part of the matter to be recorded, such designation as will identify him with that transaction.

Different concerns have different requirements as to the conduct of their business. It is one object of my invention to provide great flexibility in the meeting of these varying requirements. Thus, I may cause my apparatus to classify the business transacted in various ways by merely changing electrical connections and without any changes of apparatus. Thus, I may classify according to kind of merchandise, such as cigars, soda water, drugs, prescriptions, etc.; or I may classify according to the nature of the transaction; thus, cash, received on account, charge, paid out, etc. In all cases, regardless of kind of business classification, the clerk performing the transaction is always identified on the record with the transaction. I also provide great flexibility in the matter of the totalization of items, in that any class of transactions may be carried through the totalizers or omitted therefrom by simply changing electrical connections. Thus, one concern might desire its "received on account" transactions to appear in the total business, and another might require that only the "cash" and "charge" items appear in the total. In all such respects as this my system is one of great flexibility, no mechanical changes but merely the changes of electrical circuits being necessary.

In carrying out my invention I have held to the purpose of registering and recording the transactions in such a way as to afford the basis at all times for a complete audit or checking up of the business. For example, at the home station there is a register individual to each clerk, and the registration on this should at all times afford a basis of check against the cash and charge slips in the corresponding clerk's drawer. To illustrate further, let it be assumed that at a certain establishment, operating under my invention, there was provided at the home station a total adder which shows the total of actual current business, a "cash" adder showing the amount of cash received, a "charge" adder showing the amount of charge transactions, a "received on account" adder, and a "cash paid out" adder. The total adder would ordinarily be arranged to show the total of the cash and charge adders, which is the total of the actual current business. In addition to this there would be an adder for showing the total of the cash, received on account, and charge items of each clerk. With the equipment thus outlined, the registration of the total adder should afford a check against the totals of the cash and charge adders. The total adder should also afford a check against the aggregate of all clerks' adders, minus the "received on account" slips in their cash drawers. The amount shown on the "received on account" adder would afford a check against the total of the "received on account" slips in the clerks' drawers.

I mention these examples as illustrative of the results toward which I have worked in the production of the system of my invention. Many other ways of checking or auditing the accounts from the registers at the close of the day or at any time during the day will suggest themselves to any one skilled in the auditing of books, in the light of the disclosure of my system which is to follow.

To avoid confusion in the following specification and in the drawings, I will refer to the side of the cash register which is toward the salesman as the front, and the side which is toward the customer as the rear, this being in accordance with the parlance of the art.

Figure 3:
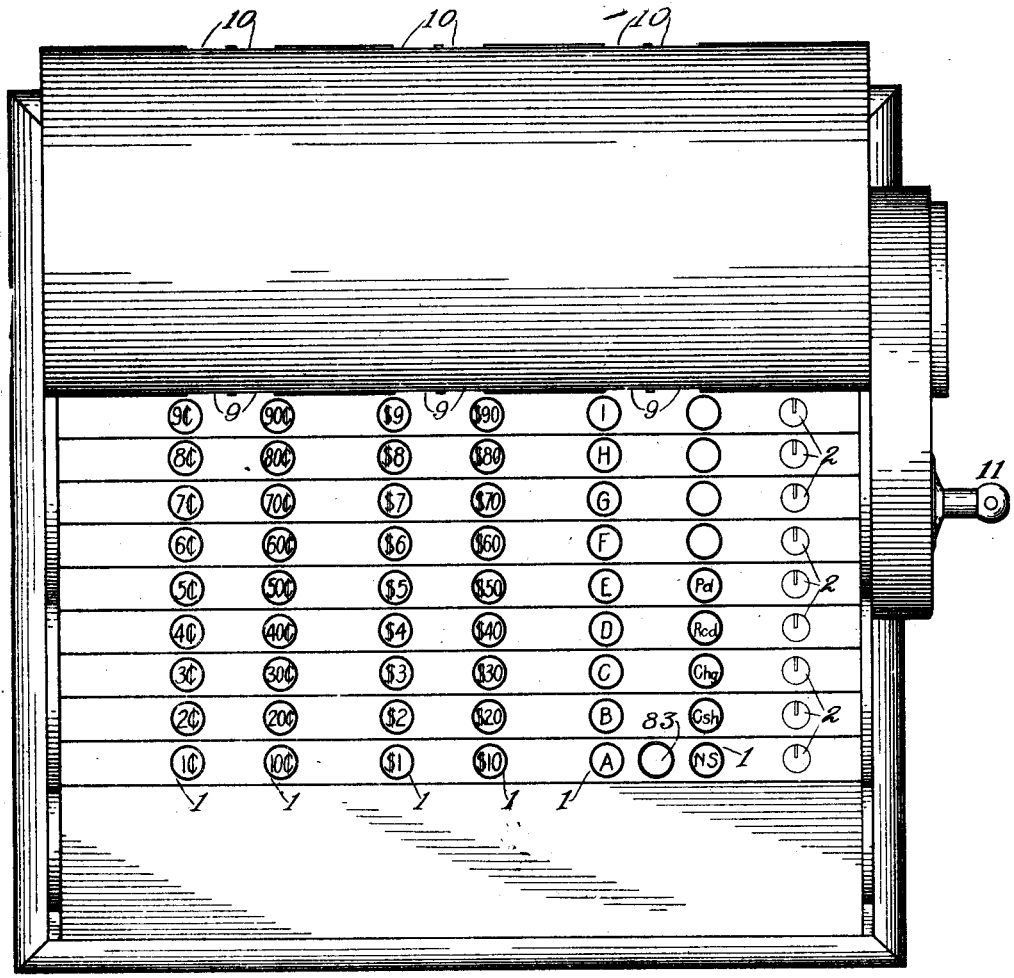
Figure 9:
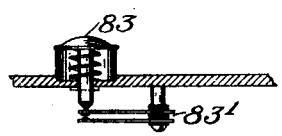
Figure 10:
Figures 22, 50:
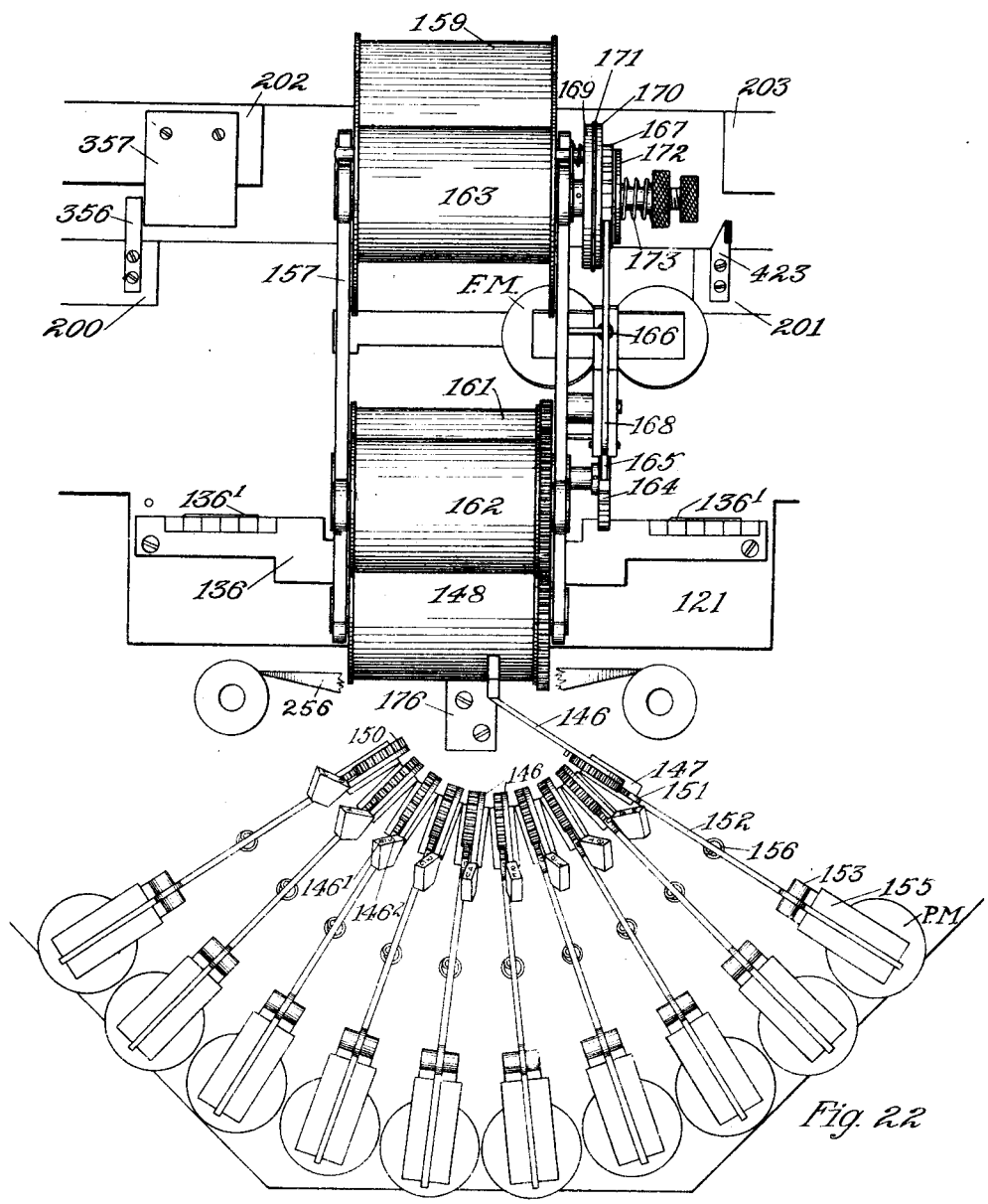
Figure 32:
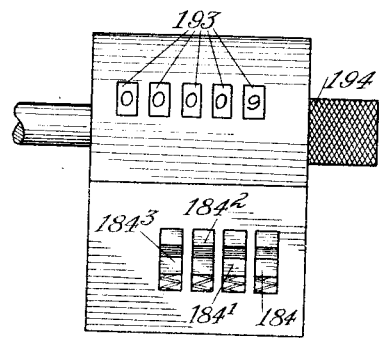
Figure 33:
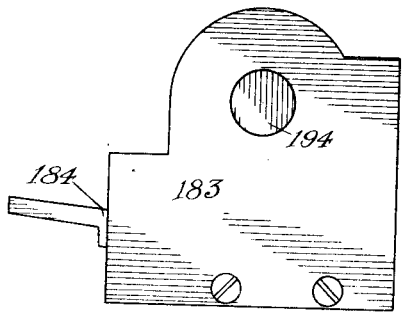
Figure 35:
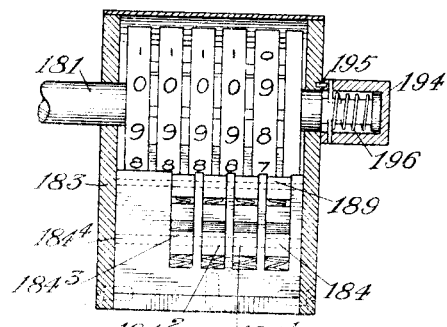
Figure 34:
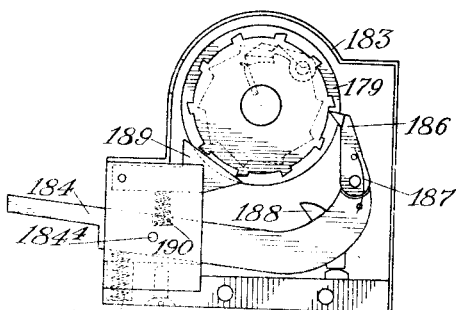
Figure 38:
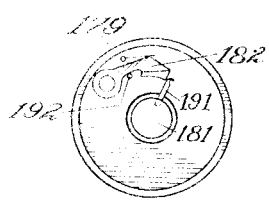
Figure 37:
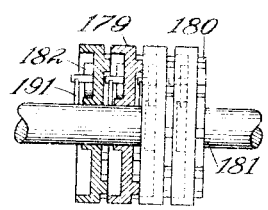
Figure 36:
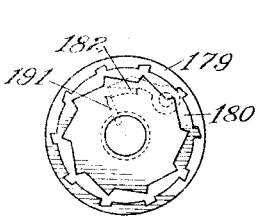
Figure 39:
Figure 40:
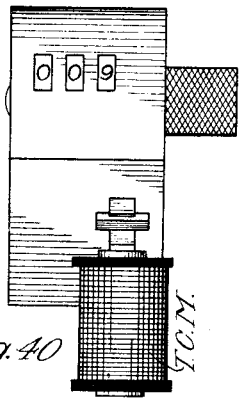
Figure 41:
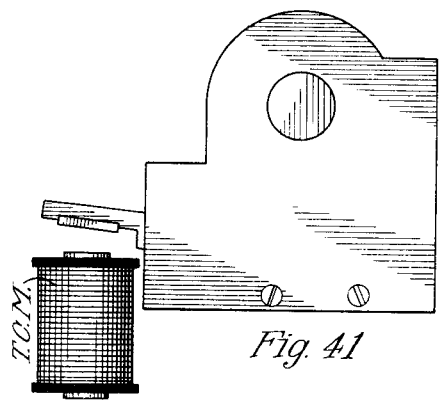
Figure 43:
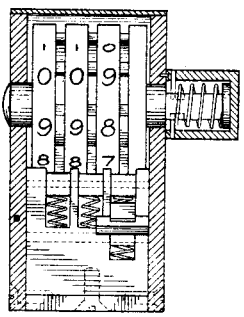
Figure 42:
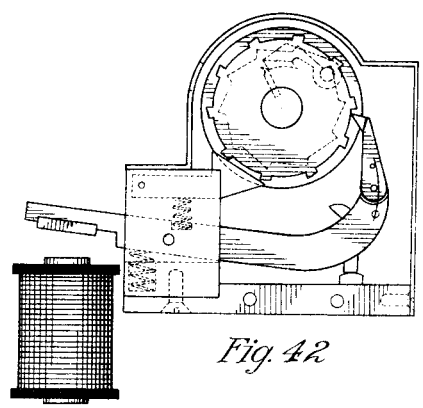
Figure 46:
Figure 45:
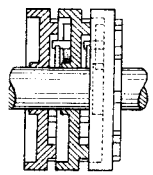
Figure 44:
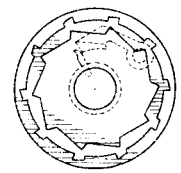
Figure 47:
Figure 48:
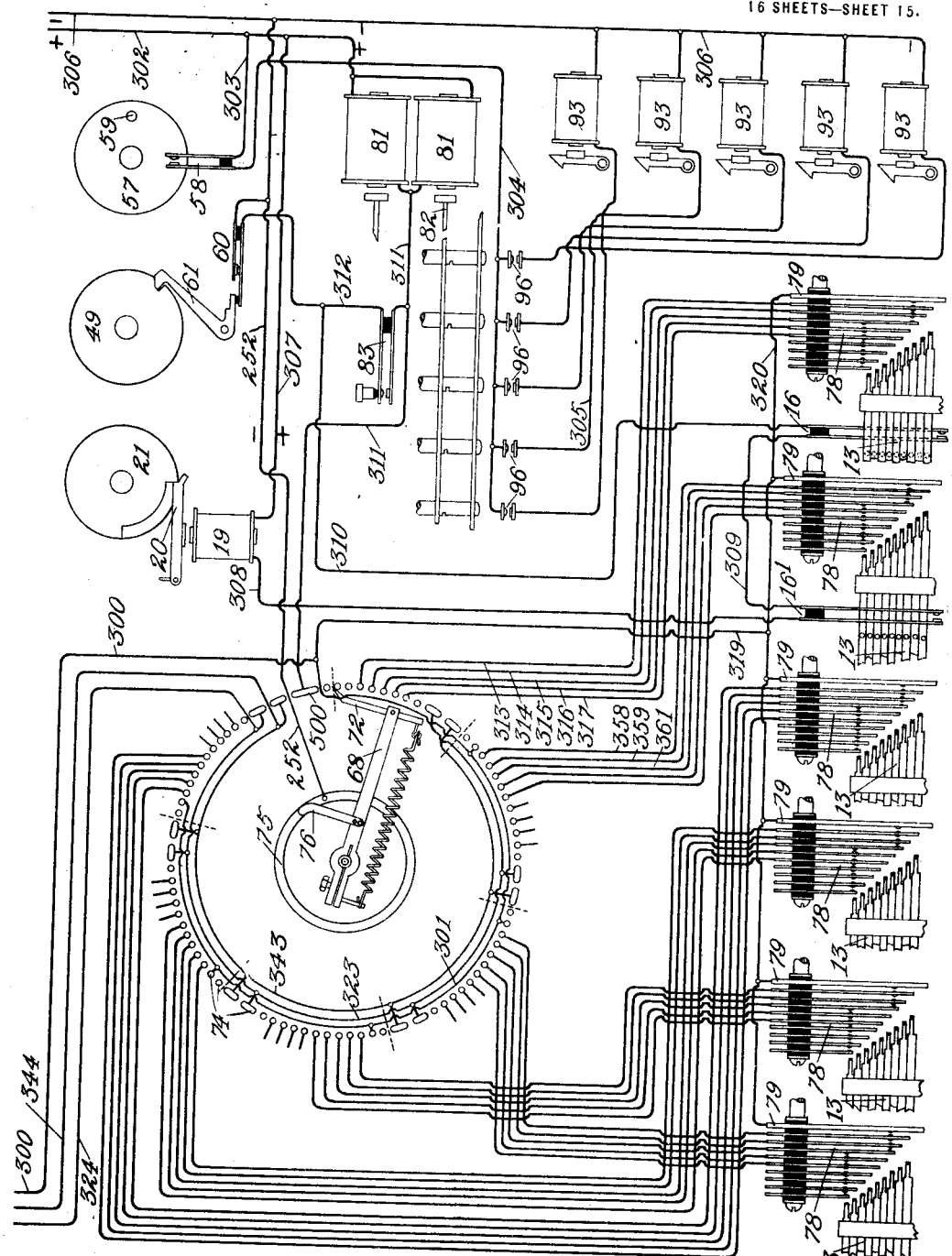
Figure 49:
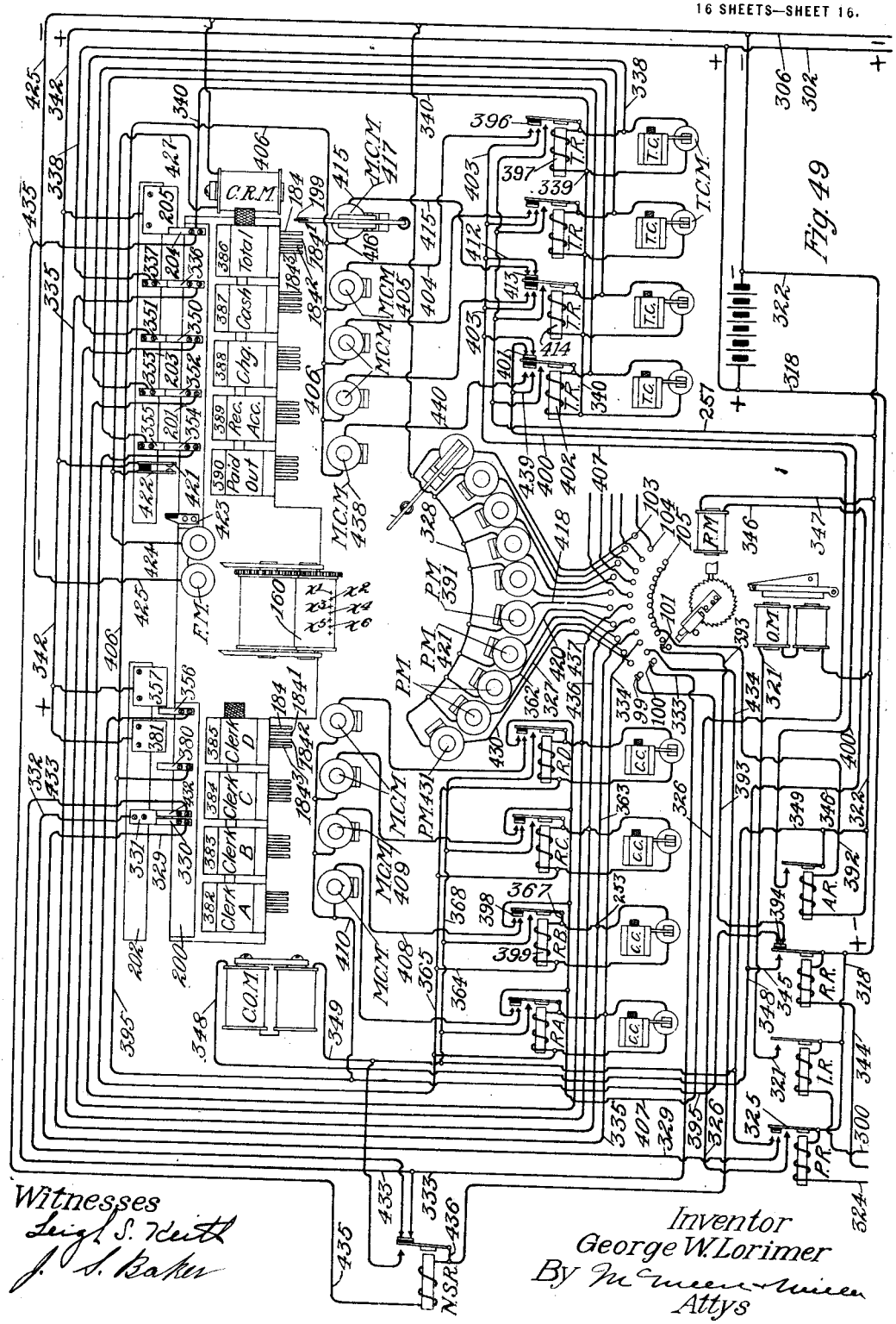

In the accompanying drawings which form a part of this specification Figure 1 is a rear view, partly in section, of the cash register apparatus located at the remote station. Fig. 2 shows a sectional side view through the broken line A—B of Fig. 1. Fig. 3 shows a plan view of the remote station apparatus, and particularly illustrates the arrangement of the keyboard and the designations carried by the different keys. Fig. 4 shows a plan view, partly in section, of the remote station apparatus. It illustrates particularly the arrangement of the impulse transmitter in its relation to the indicating drums. Fig. 5 shows the details of the impulse transmitter and its relation to the other principal parts of the remote station mechanism. Fig. 6 is a skeleton view illustrating the normal position of a key and its associated parts. Fig. 7 is a similar view of a key in its depressed position and illustrates the position assumed by the associated parts prior to the manipulation of the handle of the impulse transmitter. Fig. 8 shows a key in its depressed position, and the position assumed by the associated parts, including the indicating drum and stop mechanism, after the manipulation of the handle of the impulse transmitter. This figure, and also Figs. 5 and 6, illustrate the positions assumed by the bank of controlling contacts for the normal and depressed positions of the key. Fig. 9 (Sheet 3) shows a sectional view of the release push button. Fig. 10 (Sheet 3) shows a detail of the clerk's key and its locking mechanism. Fig. 11 (Sheet 5) shows the revolving brush and collector ring of the impulse transmitter. Fig. 12 (Sheet 4) shows a cross section of one of the designating or indicating drums and the frictional arrangement which connects it with the driving shaft. Fig. 13 shows a rear view of one of the cash drawers with its unlocking magnet. This also shows the means employed for allowing the drawers to open with a minimum amount of friction. Fig. 14 shows a side view of one of the cash drawers with its unlocking magnet and the associated spring employed to automatically open the drawer upon its release by the unlocking magnet. Fig. 15 shows a plan view of the impulse receiving apparatus at the home station. Fig. 16 is a side view of the same. Fig. 17 is a detail of the actuating pawl and ratchet of the impulse receiving apparatus. Fig. 18 is a plan view of the combined spacing and switching carriage and printing or recording mechanism associated therewith. Fig. 19 is a detail of the actuating mechanism for the combined spacing and switching carriage, by means of which motion in one direction is transmitted to the carriage. Fig. 20 is a detail of the electro-magnet which drives the carriage in one direction. Fig. 21 is a detail view of the ratchet rack carried by the combined spacing and switching carriage. Fig. 22 is an enlarged detail in plan view of the printing mechanism shown in Fig. 18. Fig. 23 shows a side view of the printing mechanism, the platen and associated parts carried on the carriage being in raised position in readiness to receive the imprint of upper case characters. This view also shows the end view of the spacing and switching carriage and the rails upon which it operates. Fig. 24 is a detail of the printing mechanism, showing the platen in its lowered position in readiness to receive imprints of the lower case. Fig. 25 shows the details of the friction arrangement in connection with the paper reel to prevent its overrunning. Another view of this detail is shown in Fig. 22. Fig. 26 shows an end view of the spacing and switching carriage with a registering apparatus mounted thereon, together with the actuating magnet for this register. Fig. 27 shows a plan view of the spacing and switching carriage with registering and printing mechanisms removed. This also shows the retractile spring for the carriage. Fig. 28 is a detailed view of the spacing and switching carriage release mechanism. Fig. 29 is a detail end view of the spacing and switching carriage, showing the tracks, wheels and contact brushes. Fig. 30 is a detail of the paper carrying cylinder, showing the platen in its elevated position in readiness to receive the imprint of upper case characters. Fig. 31 shows the platen in its lowered position. This figure and the preceding one shows the mechanism for raising and lowering the platen at a predetermined point in the travel of the carriage. Fig. 32 is a front view of one of the registering mechanisms dismounted from the carriage. Fig. 33 is a side view of same. Fig. 34 is a sectional end view of same, showing the pawl and stop arrangement. Fig. 35 is a front view of Fig. 32, partly in section, with the front of the case removed. Fig. 36 is a detail of one of the counter wheels of Fig. 32. Fig. 37 shows four counter wheels, mounted on a section of the shaft, two of these counter-wheels being in section. Fig. 38 shows the reverse of Fig. 36. Fig. 39 shows the details of one of the pawls for carrying over a unit movement to the next counter wheel at the end of each revolution. The relation of this pawl to its counter wheel is shown in Fig. 38. Fig. 40 shows a front view of a transaction counter. Fig. 41 is a side view of same. Fig. 42 is a sectional end view of same, showing the actuating mechanism. Fig. 43 shows a front view of same, partly in section, with cover removed. Fig. 44 shows a detail of a counter wheel of the transaction counter. Fig. 45 shows an assembly of three counter wheels on a section of the shaft, two of said counter wheels being in section. Fig. 46 shows the reverse of Fig. 44. Fig. 47 is a detail of the pawl for said counter wheels. Fig. 48 shows the electrical connections of the remote station. Fig. 49 shows the electrical connections of the home station. These two figures, 48 and 49, when placed together give a complete diagram of one arrangement of the circuits of my invention. Fig. 50 (Sheet 10) shows the type arrangement of the printing mechanism. For the purpose of clearness of illustration, the letters on these type bars are shown as they would print, rather than reversed as the actual type faces themselves would appear.

In these drawings like numerals refer to like parts.

In describing the invention, I will first explain the construction and method of operation of the apparatus at the remote station. This is shown on Sheets 1 to 6, inclusive, of the drawings. In general form this remote station apparatus resembles an ordinary cash register. The keyboard at the front of the machine consists of vertical rows of keys 1, the successive keys in each row being arranged at different levels, as most clearly shown in Figs. 2 and 5, for the purpose of facilitating their manipulation. The vertical rows or banks of keys in the device I have illustrated are six in number, but, of course, this number may be greater or less according to the requirements of the system. Each bank contains nine keys. The designation of the keys is shown in the plan view of Fig. 3. The keys in four of these banks are numbered from 1 to 9 or from 10 to 90, and represent in each case dollars and cents, as indicated. By depressing these keys in various combinations, a money value from 1c. to $99.99 may be set up. The fifth bank of keys from the left bears any suitable letters or designations, these letters referring to the various clerks who are to have access to the machine The first five keys of the sixth or right hand bank are marked, respectively, with suitable indications to designate "No sale", "Cash", "Charge", "Received on account", and "Paid out", and the remaining four keys in this row may bear any other desired designations to indicate the classification of transactions.

In describing the operation of the device, it will be assumed, for the purpose of simplicity, that only these five classification keys and four of the clerk keys are connected up, but it will be obvious from the description to follow that the entire number in each bank may be employed. If it is preferred to classify the business by the class of merchandise sold, such as "cigars", "candy", etc., rather than by the character of the transaction, the sixth bank of keys may be marked with suitable designations for that classification. In the following description, however, it will be assumed that the classification is according to the character of the transaction, such as cash, charge, received on account, etc., and the description of operation will be carried through on that basis.

At the right of the sixth bank of keys, as shown in Figs. 3 and 4, there is shown a row of locks 2. One of these is for the exclusive use of each clerk, and when operated by a suitable key the corresponding clerk's push-button key is made inoperative and the cash drawer is locked against intrusion during such time as the clerk may be absent from business.

Surmounting the casing which contains the mechanism is a cylindrical structure, which contains the indicator drums 3, 4, 5, 6, 7 and 8. There are six of these drums and each corresponds to one of the key banks. Each drum bears two series of indicating numerals or other indications, and each is adapted to be rotated through a different angle, as determined in each case by the depression of one of the nine keys in the corresponding bank. In the front and rear, respectively, of the cylindrical portion of the casing, opposite each drum, are windows 9 and 10, respectively, and the arrangement of the numerals or other designations on each indicator drum is such that the same number will always be shown through both the front and rear windows of that drum, this number or other designation always corresponding to the designation on the key that has been depressed to cause the actuation of that drum.

On the right hand side of the remote station apparatus there is a winding key or handle 11 associated with a contact making apparatus, which I call an impulse transmitter. The function of this winding handle 11 is to mechanically operate the indicator drums 3, 4, 5, 6, 7 and 8 through the chain 12 and intermediary gearing, and also to furnish power for the moving arm of the impulse transmitter, so that it will transmit the various sets of impulses in proper sequence to cause the desired operation of the registering and recording apparatus at the home station, as will be more fully set forth.

I will first describe the mechanism and its operation, by means of which the setting up of a combination on the keys 1 will cause the corresponding indication on both the front and rear of the remote station apparatus. This part of the function of the machine is wholly mechanical in the particular form of my invention that I have chosen to illustrate. Associated with each bank of keys 1, as shown, for instance, in Fig. 2, there is a row of horizontal, longitudinal movable push rods 13, there being one of these rods for each key 1. The cam surface $1^1$ on each key impinges, when the key is depressed, against a pin $13^1$ on each push rod, in such manner as to force the corresponding rod to the rear. The rearward movement of each of these push rods under the influence of the key has a triple function, the first of which is to place the spring 14 of the corresponding stop finger 15 under tension, so as later to furnish motive power to move that finger out of its normal position, as will be described. This function, performed by the rearward movement of the push rod 13, is well illustrated in Fig. 7, which shows these parts moved from the normal position which is shown in Fig. 6. The second function, performed by the rearward movement of the push rod 13, is the bending of a group of contact springs, shown at the extreme right of the rod as viewed in Figs. 6, 7 and 8; and the third function is the closing together of the unlocking contact springs 16 and $16^1$, best shown in Figs. 1, 2 and 4. The second and third functions of the push rods may be ignored for the present, and the first one, that of bending the spring 14 on the stop finger 15, alone considered. There is one stop finger 15 for each push rod 13, and therefore for each key 1. These stop fingers are pivoted in a slotted block $17^1$, arranged on a shelf 17 extending horizontally across the rear of the interior of the casing. Each stop finger has an upwardly projecting detent $15^1$, and a rearwardly projecting detent $15^2$, as shown in Figs. 2, 6, 7 and 8. Normally when the spring 14 of any stop finger is flexed by the depression of the key, the parts assume the position shown in Fig. 7, the finger not being allowed to move out of its normal position by virtue of the holding power of the lock bar 18 against the detent $15^2$. The finger 15, though subject to the stress of the spring 14, remains in its normal position, therefore, as shown in Fig. 7, until a train of other events has been completed, as will now be described.

Each key 1 has the power, when depressed, of placing its corresponding stop finger 15 under tension; but, as will be shown, none of the stop fingers can be moved from their normal position until the clerk has finished setting up the proper designation on the keys 1 and has started to turn the winding handle 11. In order to prevent the winding handle 11 being turned before the designation is properly set up on the keys, an unlocking magnet 19, (Fig. 5) is provided. This magnet, as will be shown when the circuits are considered, cannot be energized until the unlocking springs 16¹ and 16 on the fifth and sixth key banks, respectively, have been closed together, and this cannot occur until one key in each of these banks has been depressed. In other words, the clerk cannot start the registration of a transaction until he has designated the class of the transaction by pressing one of the keys in bank 6 and by giving his own signature, as it were, by pressing one of the keys in bank 5. Assuming, therefore, that the clerk has properly designated the amount of the transaction by pressing the proper money indicating keys in the first four banks and has pressed the proper keys in banks 5 and 6 for the purposes just described, the magnet 19 will become energized and will withdraw the stop arm 20 from the stop plate 21, which is attached rigidly to the shaft 22 of the winding handle. The plate 21, shown in Fig. 4 and indicated by the dotted numeral 21 in Fig. 5, lies just behind the plate 57, as shown in those figures. The clerk may now turn the winding handle to the extreme limit of its rotation, the direction of turning being clockwise as viewed from the right hand end of the machine as shown in Fig. 5. This rotation of the shaft 22 by the winding handle causes a corresponding rotation of the sprocket wheel 23 rigidly attached to the shaft, and this, through the chain 12, causes the sprocket 24 to rotate in the direction of the arrow. The sprocket 24 is rigidly attached to the cam plate 26, both of these being loose on the stud 25. The cam plate 26, therefore, partakes of the rotation of the sprocket 24, the direction of rotation being indicated by the arrow upon it. The first movement of the cam plate 26 causes the cam point 26¹ to engage the dog 27 and lift it out of the notch 28¹ in the plate 28, which is integral with the gear 29, this plate and gear being also loose on the stud 25. This plate 29 carries the notch 28¹, in which the dog 27 acts as a detent, and it also carries the stop lug 28², which by engaging the stationary pin 30 limits the counter-clockwise rotation of the plate 28 and its gear 29. The plate 28 and gear 29 are normally urged to rotate in a counter-clockwise direction by the gear 31, which in turn is driven in the direction indicated by the arrow upon it by the coil spring 32. The inner end of this coil spring is attached to the shaft 33, while its outer end is attached to the rigid post 34 carried on the frame plate 35. This gear 31 is fast on the shaft 33, which carries all of the indicating drums 3 to 8, inclusive, and drives them through the intermediate friction gearing, particularly shown in Fig. 12, as will be described.

The unlocking of the plate 28 and gear 29 by the dog 27 permits this plate and gear to revolve in a counter-clockwise direction, as viewed in Fig. 5, until the stop lug 28² impinges against the stationary pin 30. Meantime, under the influence of the turning of the winding handle to the right, the chain 12 is causing the gear 24 and the cam plate 26 to turn in a clockwise direction. The clockwise movement of this cam plate 26 results in the nose 26² engaging the upper arm 36¹ of the bell crank lever 36 and rocking the same clockwise (Fig. 8) against the tension of the spring 37. This bell crank lever 36 is fast on the shaft of the lock bar 18, and this engagement of the nose 26² results in lifting this lock bar 18 out of engagement with all of the detent lugs 15² on the stop finger 15. It will be remembered that certain of these fingers had been placed under tension, due to the flexing of the spring 14 caused by the movement of the depressed keys 1, and the movement of the lock bar 18 just described results in the freeing of these particular fingers under stress, so that they will move from the position shown in Fig. 7 to the position shown in Fig. 8. The detents 15¹ carried by these stop fingers now occupy such position that they will determine the extent of movement of the various indicating drums 3 to 8, inclusive, under the movement which is to follow, as will be explained.

It will be remembered that during the first part of the winding movement of the handle 11, the plate 28 and gear 29, being released by the dog 27, moved under the influence of the spring 32 to a quarter of a revolution, in which the stop lug 28² impinges against the stationary pin 30. This movement brought the pin 38 integral with the shroud or plate 28 and gear 29 to the position shown in dotted lines in Fig. 5. In this position it is engaged by the advancing clockwise movement of the cam plate 26, the notch 26³ engaging this pin. Under continued movement of the plate 26, as driven by the winding movement of the handle 11, the pin 38 is moved back in a right handed direction, carrying with it the shroud 28 and gear 29. This movement continues until the handle 11 reaches its extreme position, at which time the notch 28¹ is again brought under the dog 27 and again locking the shroud 28 and gear 29 in its normal position. It is thus seen that in the winding movement of the handle 11 the cam plate 26 moves clockwise, and in so doing unlocks the shroud 28 and gear 29, and also unlocks the lock bar 18, in turn unlocking the stop fingers. Also during the winding movement of the handle 11 the shroud 28 and gear 29 first move to the left a quarter of a turn under influence of the spring 32, and are then forced back into normal position by the clockwise movement of the cam plate 26, the notch 26³ impinging on the pin 38, this return movement of the shroud 28 and gear 29 serving to rewind the spring 32. The effect of this action on the shaft 33 and the indicating drums may now be considered.

During the unwinding movement of the spring 32, as permitted by the gear 29, the shaft 33 turns in a clockwise direction, as indicated by the arrow on gear 31 shown in Fig. 5. This movement of the shaft is in extent one-half of a revolution, and it occurs before the unlocking of the stop fingers 15 by the lock bar 18 occurs. The reason why the movement of the shaft is one-half of a revolution is that the counter clockwise movement of the gear 29, as limited by the stop pin 30, is 90 degrees in extent, and as the ratio between the gears 29 and 31 is that of 2 to 1, a corresponding movement of 180 degrees in the gear 31 results.

The indicator drums 3 to 8, inclusive, are mounted on the shaft 33 in a manner best shown in section view of Fig. 12 (Sheet 1). Keyed to the shaft 33 is a friction plate 39, which carries on its periphery a cylindrical shutter 39¹. There is one of these friction plates and shutters for each pair of indicator drums, as shown in Fig. 1. Each indicator drum, such as 3 and 4 in Fig. 12, has its web pressed against the friction plate 39 by means of an auxiliary friction plate 40. These auxiliary friction plates 40 are feathered or splined on the shaft 33, so as to permit of longitudinal, but not rotary, movement thereon, and each of them is urged against the web of the corresponding indicator drum by means of coil spring 41, the opposite end of which bears against an adjusting nut 42 threaded upon the shaft. As a result of this construction, an independent relative movement between each of the indicator drums and the shaft is permitted, but always is opposed by a considerable friction. Each of the indicator drums 3 to 8, inclusive, carries a stop pin 43, which plays between two stop pins 44 and 44¹ located opposite each other on the interior of the casing (Fig. 2).

When the clockwise movement of the shaft 33 begins, it finds the indicator drums 3 to 8, inclusive, occupying staggered positions on the shaft according to the last indication of the register. The movement of this shaft through 180 degrees brings all of the indicator drums into uniform position upon the shaft, since all the stop pins 43 are made to impinge against the stationary stop pins 44¹ on the casing. Any movement of the shaft beyond that required to bring the stop pin 43 against the stationary stop pins 44¹ is permitted without further rotation of the indicator drums through the friction plates. In this way, by the clockwise movement of the shaft, which occurs before the unlocking of the stop finger 15 by the lock bar 18, all of the indicator drums are brought into uniform position on the shaft 33, preparatory to the return movement of this shaft, which, through the mechanism now to be described, will cause a re-setting of these indicator drums to display numbers through the front and rear windows according to the designation set up on the keyboard.

Each of the indicator drums carries on its outer edge laterally projecting stop pins 45. These pins are of progressively varying length, as shown in Fig. 1. It will be remembered that the stop fingers 15 were mounted side by side in slots in their housing blocks 17¹, and the relative positions of each of the six groups of these stop fingers is clearly shown in Fig. 1. Each of the horizontal push rods 13 carries a laterally projecting pin 13², each of which projects laterally just far enough to engage the lower end of the spring 14 on the stop fingers. This relation is shown in Fig. 1 and reference is also made to Figs. 6 to 8, inclusive. The relative lateral positions of the stop fingers 15 in each group are such that each one of them is removed laterally from the outer edge of the corresponding indicator drum to engage one, and one only, of the stop pins 45 carried by those drums. As a result, when any one of the stop fingers in a group is raised, its detent 15¹ will occupy such a position as to form a stop for one of the pins 45. Thus, referring to the right hand indicator drum 3 in Fig. 1, the right hand group of stop fingers 15 are those which serve to limit the movement of this drum by the impingement of the pins 45. The left hand one of this group of stop fingers 15 corresponds to the key 9 in the corresponding bank. The raising of this finger will serve to engage the shortest one of the pins 45 on the indicating drum. Consequently, if key 9 in the last row has been depressed when the shaft 33 begins its rotation to the left, as viewed in Fig. 5, the pin 45 will move but a short distance until it engages the detent 15¹ on the stop finger 15 corresponding to the key 9, and will stop the drum in that position. In this position the figure 9 will be displayed through the front and rear windows. If, however, key 1 had been depressed, the right hand one of the stop fingers in the right hand group of Fig. 1 would have been raised, and this would have permitted all of the pins 45 to pass except the longest one, which would stop the drum 3 only after it had rotated almost through 180 degrees. When so stopped, the figure 1 would appear before each of the front and rear windows. In this manner all of the indicating drums are made to stop during the return or counter clockwise movement of the shaft 33 in positions which will indicate through their respective front and rear windows the numbers or other designations corresponding to the respective keys pressed. The further return movement of the shaft 33 is permitted, without causing any further rotation of the indicator drums, by the frictional engagement between the shaft and the drums.

The keys in each bank are nine in number, and those having a monetary significance are numbered from 1 to 9, there being no zero. Notwithstanding the absence of a zero key, it is necessary to present a zero indication, as in the case, for instance, of "no sale", or in in the case of an indication of even ten dollars ($10.00), for instance. The markings on the indicating drums, as before stated, are from 0 to 9, there being ten in this series as against nine in each corresponding bank of keys. The means of accomplishing a zero indication without a zero key may be explained by assuming that the key $10.00 is depressed, this being the lower one in the fourth row. This should show through the indicator windows a 1 followed by three zeros. The fact that no keys in the first, second and third columns are depressed will result in none of the stop fingers 15, corresponding to those banks, being raised, with the result that the indicator drum will be permitted to make its full return movement with the shaft, under which conditions a zero will be displayed through each of the windows. In case of "no sale", for corresponding reasons, only naughts would be shown in the four front and rear windows through which monetary indications are made. The shutter 39¹ forms an integral part of the friction plate 39, and as this is keyed to the shaft, it follows that the shutter always rotates with the shaft. This shutter has two windows or openings in its periphery, as shown in Fig. 5, and these are so disposed on the periphery of the shutter that when the shaft is in its normal position or position of rest, the two windows and the shutter are opposite or register with the front and rear windows 9 and 10 in the casing, so that the cylindrical portions of the drums 3 to 8, inclusive, may always be seen through these windows while the shaft is in its position of rest. During the time while the indicator drums are being set to any new position, the shaft is always out of its normal position, and therefore it follows that the windows 9 and 10 in the front and rear of the casing are obscured or blinded by the shutter 39¹ during the time while the indicator disks are being rotated to a new setting, thus avoiding any confusion on the part of the customer or clerk due to seeing the changing numbers.

It is to be borne in mind that the setting of the indicator drums, brought about by the clockwise and counter clockwise movement of the shaft, all occurs during the winding movement of the handle 11, that is, during the clockwise movement of the sprocket 24 and the cam plate 26 (Fig. 5). During this winding movement of the handle 11, the spring 32 has been partly unwound, and again rewound, so that it is left in its wound position. The clockwise movement of the winding handle 11 serves to wind the spring 46, one end of which is attached to the key shaft 22 and the other end to the post 250, stationary in the plate 251. This spring serves to rotate the shaft and sprocket 23 in the reverse direction; that is, in the direction opposite to the arrow shown on the front of 23, when the handle 11 is released. In this return movement the sprocket 24 is also driven in the reverse direction, and this accomplishes the function of resetting the cam plate 26, the cam point 26¹ passing back under the dog 27, a spring in this dog permitting the dog arm to allow the cam point 26¹ to pass by in that direction. This dog is a compound dog, its two arms having a possible relative movement with respect to each other in one direction but not in the other, as will be clear from the drawings.

So far the functions of the winding handle and its associated parts that have been described have been purely mechanical, and have accomplished the proper setting of the indicator drums. This winding handle also operates the impulse transmitter, the structure and operation of which will now be described.

The turning of the winding handle 11 clockwise (Fig. 5) causes the disk 21, which is fast on the shaft, to rotate the driving disk 47 through the pin 48. The rotation of this driving disk 47 transmits a rotary motion in the same direction and of equal extent to the disk 49 through the connecting rod 50. The rotation of this disk 49 in a clockwise direction, as indicated by the arrow above it in Fig. 5, imparts to the four tooth ratchet 51 a movement in the same direction and of similar extent. This ratchet has four teeth, 90 degrees apart, and is secured rigidly to the driving disk 49 through a hub common to both, which hub revolves on the stud 53. This movement of the ratchet 51 and disk 49 in the direction of the arrow winds the spring 52, the inner end of which is attached to the stud 53, and the outer end to the disk 49. As a result, this spring has a tendency to cause the ratchet 51 and disk 49 to revolve in a counter clockwise direction when pressure on the winding handle is released. As will be shown later, the disk 49 and ratchet 51 do not make their return rotation with the winding handle, but are retarded so as to come back at a uniform rate under the influence of the clock train, as will be explained. The spring 46 on the winding handle shaft 22 returns the winding handle and the driving disk 21 to its normal position, as soon as the handle 11 is released, this movement being permitted without the corresponding return movement of the disk 47, because of the notch in the disk 21, which permits a quarter turn play of the pin 48. As soon as the handle 11 and disk 21 return to normal, the stop lever 20, under the influence of its spring, drops into the notch in the disk, as shown in Fig. 5, and thus prevents any subsequent forward movement of the winding handle and associated mechanism until the unlocking magnet 19 is again operated by the depression of the two keys in the banks 5 and 6.

It is important that a movement of the handle 11 when once started shall be continued to completion; that is until it has been rotated a quarter turn, otherwise an improper action of the indicating drums might result. For this purpose, I provide the two interlocking bell crank levers 54 and 55, pivoted in a stationary portion of the frame. The upper ends of these are normally pulled together by the spring 56 or in any other suitable manner. The lower end of the bell crank lever 55 acts as a pawl to engage the teeth in the ratchet on a segment of the periphery of the disk 57, which is fast on the shaft 22, and, therefore, which rotates with the disk 21 and winding handle. The teeth in this ratchet segment on disk 57, when engaged by the pawl on 55, serve to prevent any return movement of the handle 11 and its associated disks. When, however, the handle has been rotated through a complete quarter turn, the pawl on 55 rides on the enlarged portion of the disk 57 and thus throws the upper end of the lever to the left, so as to permit the pin 55¹ to lie opposite the notch 54¹ in the upper end of the lever 54. This permits the upper end of this lever to move down and act as a stop for the pin 55¹, thus preventing the pawl on the lower end of the lever 55 from falling back into the teeth on the ratchet 57 during the return movement of that ratchet. At the end of the return movement of the ratchet 57 and of the handle, the pin 57¹ impinges against the lower arm of the lever 54, moving it to the left and thus releasing the pin 55¹ on the upper end of the lever 55 and allowing that lever to again act as a pawl for the next forward movement of the ratchet. In this way I assure the completion of any movement of the handle 11 that is begun, the pawl 55 and the ratchet wheel 57 always serving to prevent any movement toward normal until the whole movement has been completed.

The pair of springs 58 (Fig. 5) is mounted on a stationary portion of the frame and are normally electrically separated. They are, however, engaged by the pin 59 on the disk 21 at almost the extreme end of the winding movement of that disk, so that their circuit is completed only at the very completion of the winding movement. This pair of springs is the one which unlocks the cash drawer belonging to the clerk who is at the time operating the machine, the particular drawer so unlocked being predetermined by the previous pressure of the clerk's button in bank 5.

Another pair of springs 60, secured to the framework, is normally closed, but is opened by a downward movement of the lever 61 associated with the driving disk 49. The upper end of the lever 61 is provided with a nose 61¹, which normally rests in a notch in the periphery of the disk 49. As a result of this, the springs 60 are normally closed upon each other, but at the very outset of the movement of the disk 49, which occurs at the very outset of the movement of the winding handle, these springs are opened and are held open until the disk 49 has returned to its normal position. These springs 60, as will be shown when the circuits of my system are considered, serve to prevent any operation of the unlocking magnet 19 during the transmission of any set of impulses to the home station, and thus prevent the possible breaking up of any set of impulses or any interference whatever on the part of another clerk who might inadvertently or intentionally turn the handle while a set of impulses was being transmitted.

From the above statements concerning the functions of the springs 60 and of the unlocking magnet 19, which is in turn controlled by the keys of banks 5 and 6 of the keyboard, it will be understood that not only is it impossible for any one to start a new registration during a time while a set of signals is being sent to the home station, but also it will be impossible for any one to again start the device until certain definite acts have been performed on the keyboard, and which same acts will necessarily result in the recording of information necessary for the proper actuation of the registers and the identification of the person making the registration.

Referring again to the action of the driving disk 49 and the four tooth ratchet wheel 51 secured thereto, the movement transmitted to the parts, in the direction of the arrow shown in Fig. 5, permits the ratchet wheel 51 to ride under the pawl 62 without imparting any driving power to that pawl. This pawl 62 is mounted on the gear wheel 63. The movement of driving disk 49 and ratchet wheel 51 is a quarter of a turn, the same as handle 11, and this movement is just enough to carry the ratchet wheel 51 from a position where one of its notches will be engaged by the pawl 62 to a position where the next notch will be so engaged. In this movement no rotary motion is imparted to the wheel 63; but on the return movement of the disk 49 and the ratchet 51, under the influence of the spring 52, the gear wheel 63 will be rotated in a counter clockwise direction, or a direction opposite to that shown by the arrow adjacent to this wheel in Fig. 5, the amount of its movement in this direction being one quarter turn. The gear wheel 63 operates on a fan 64 through a train of intermediate gearing, consisting of a gear 65 and a pinion 66 mounted on a shaft 67, as is clearly shown. This fan serves the usual function of a governor to limit the speed of rotation of the wheel 63 and its associated parts under the influence of the spring 52. It is through this means that a uniform rate of rotation is given to the shaft 67 and through it to the brush arm 68 of the commutator of the impulse transmitter, shown in Figs. 5 and 11. It is well to note at this point that the quarter turn of the handle 11 results in a quarter turn of the disk 49, and the winding of the spring 52 through a quarter turn. The return movement caused by this winding causes a quarter turn of the gear 63 and one complete turn of the pinion 66, shaft 67 and contact arm 68, since the ratio of gearing between the gear 63 and pinion 66 is 4 to 1.

Briefly reviewing the action of the gearing in the impulse transmitter, it is seen that a quarter turn of the handle 11 results in a full turn of the brush arm 68, the power absorbed by the handle in the winding being transferred to the spring 52, which power is made latent until the handle has been brought to its normally locked position by the spring 46. At this time, and not until then, the pin 69 on the disk 21 raises the left hand end of the lever 70, pivoted at 71, and removes the obstructing influence of the upper end of the lever 70 from the fan 64, thus permitting the revolution of the clock train and its attendant brush arm 68. Disk 49 is prevented from making more than a quarter turn in its counter clockwise direction by the fact that its return movement is always definitely stopped by the pawl 61 falling into the notch in its periphery. It is by this means that the contact brush 72, carried by the contact arm 68 of the commutator, is always brought to rest at a definite normal point after making just one revolution.

Referring to Fig. 11, which shows the commutator of the impulse transmitter, 73 is a block of insulating material, such as hard rubber, into which the contact pins 74 are driven. In the embodiment of my invention which I disclose, there are ninety-five of these pins, but some of them are not used and others are connected together to prolong the length of certain impulses. The device is subject to wide variation in this respect. Fewer pins than these might be used in case the device were intended to register but $9.99 at one registration, or in case a smaller number than nine clerks or five classes of transactions were to be recorded; while, on the other hand, a slightly greater number of pins would provide for the registration of amounts of money up to $999.99 at one registration, and for an increased number of clerks and classes of transactions.

The brush arm 68, as stated, is secured to and revolves with the shaft 67, but is insulated therefrom. The brush arm 68 is in electrical connection with the collector ring 75, secured on the insulating block 73, this connection being maintained through a collector brush 76, secured to the arm 68 and always bearing on the ring 75 with frictional engagement. At the outer end of the brush arm 68 is carried the brush 72, the free end of which is made to engage the circle of pins by means of the spring 77. The function of this impulse transmitter electrically is very simple, the complete rotation of the brush arm 68 serving merely to cause the brush 72 to make one passing engagement with each of the pins 74. Broadly stated, the function of this commutator is to send a succession of sets or series of impulses to the home station, these impulses being predetermined, as to the number in each set, by the combination set up on the keyboard. As will be shown, the depression of any key serves to connect certain of the pins 74 with the battery or make them electrically alive. As a consequence, when the brush 72 makes contact with these pins, it finds some of them alive and some of them dead, and the contact with those which are alive results in the sending of impulses to the home station, the passage of the pin over dead contacts resulting in no such impulses.

The method by which the various combinations set up on the keyboard affect the connection of the pins 74 on the commutator with the battery may now be described. Referring particularly to Figs. 2, 6, 7 and 8, it will be seen that each key 1, through the movement which it imparts to its push rod 13, has the power of pressing a number of springs 78 into engagement with each other. There is a different group of these springs 78 for each bank or vertical row of keys, and, as is clearly shown in Fig. 2, each key has the power of moving a different number of springs. Thus, the lower key, as shown in Fig. 2, can move only the longest one of the springs 78 into engagement with the battery contact 79. The next key above this has the power of pressing two of the springs 78 together, at the same time causing the longest one of the springs to engage the contact 79, thus effectually connecting these two springs with that contact. Similarly, the top one of the keys, through the action of its push rod 13, may cause electrical engagement between all of the springs and the contact 79. As will be shown in connection with the circuits, the contacts 79 of each group of springs are connected together and to one terminal of the battery, while the springs 78 are connected with the pins 74 of the impulse transmitter commutator. Thus, the depression of any key will cause one or more of the commutator pins to be connected with the battery, and it is in this way that when the brush arm of the commutator makes its rotation the impulses predetermined by the keyboard are sent in the proper sequence to the home station.

Referring to Fig. 2, each of the vertical rods carrying the keys 1 is provided with a notch $1^2$, which, when the key is fully depressed, is caught by the stationary plate 80. All of these rods pass through holes in this plate, and as the cam action of each key tends to push the key rod toward the front of the machine, these notches $1^2$ are caused to be engaged by the metal at the front edge of each of the holes in the plate 80, thus retaining the key in its depressed position until subsequently released. The key release magnets 81 operate on a sliding plate 82, through which all of the key rods pass. The energization of these magnets 81, which always act together in multiple, will pull all of the plate 82 to the rear, thus causing all of the rods in all banks that are depressed and locked to be released and returned by their springs to their normal raised positions.

Referring particularly to Figs. 6 and 7, Fig. 6 shows a single key 1 in its normal position, and Fig. 7 in its depressed and locked position. The energization of the key unlocking magnets 81 for the release of all the keys that have been depressed on the keyboard may occur in two different ways. Sometimes a clerk in setting up a designation on the keyboard will make an error or will wish for other reasons to make a change. For this reason the push button 83 (Figs. 3, 4 and 9) is provided, the springs $83^1$ of which are adapted, when closed together, to complete the circuit through the key unlocking magnets 81. In order that a clerk may not through inadvertence or intent destroy or mutilate a key combination and its consequent record after its transmission to the home station has been started, the circuit to this key release push button 83 and magnet 81 is made to include also the contacts 60 (Fig. 5) already referred to as controlling the unlocking magnet 19 and as being closed together only at such times as the impulse transmitter device is in its normal position. By this safe-guard it is impossible for a clerk to falsify or obliterate a registration after its transmission has been started. He can make no changes on a keyboard combination that has been set up after its transmission has been started, and, as previously stated, it may not be started until he has properly identified himself with its starting on the record that is to be transmitted. The release button 83 is, therefore, made inoperative for any purpose except at such times as it may be legitimately used and when no recording is going on.

The second way in which the magnets 81 may be used to unlock the buttons is entirely automatic in its action and is brought about by the completion of a contact between the brush 72 and a contact completed by the brush 72 of the impulse transmitter commutator at the final stage of its revolution. A contact near the end of the travel of the brush 72 is so arranged in connection with the circuit of the magnet 81, that when the brush 72 at practically the end of its travel engages this contact, the magnets 81 will be energized and all of the keys electrically released, this occurring after all of the series of impulses have been sent to the home station for registration. This matter will be more fully pointed out in connection with the consideration of the circuits.

The cash drawer mechanism which I prefer to employ in connection with my invention is shown in Figs. 13 and 14 (Sheet 7). In these the drawer proper is indicated at 84 and is provided with a handle $84^1$ on its face. On the top and bottom of each side member of each drawer is secured a rail 85, which may be in the form of a round rod, as shown. These are secured to the drawer by means of metal straps 86, or in any other suitable manner. Secured to the side members 87 of the cabinet in which the drawers act are grooved wheels 88, which coöperate with the rails to permit a free and easy opening of the drawers. A coil spring, secured at one end to a bracket 90 attached to the drawer and at the other end to a bracket 91 attached to the side of the cabinet, is provided on each side of each drawer and affords the necessary power for opening the drawers when released by the unlocking magnet; these springs being placed under tension when the drawer is closed by the clerk. This spring is one of compression, and is shown in its compressed condition in Fig. 14, a rod 92, integral with the bracket 90, passing through the coils of the spring and bracket 91 and slidable thereon to hold its alinement.

A locking magnet 93 is provided for each drawer and is mounted, as shown at the right hand portion of Fig. 14, on the rear of the cabinet. This magnet has an armature 94 which serves as a latch, coöperating with a catch 95 secured to the rear of the drawer, in an obvious manner.

The magnet 93 for each drawer is controlled by a pair of springs 96 (Figs. 1 and 2) under the key rods of the clerk's bank. When the clerk presses his key, he completes, by means of the springs 96, one point of the circuit adapted to energize his unlocking magnet 93 and opens his own drawer. This circuit also includes the contacts 58 (Fig. 5), previously referred to, associated with the impulse transmitter winding handle, which are closed by pin 59 when the winding handle has been moved almost to its extreme position and beyond the point where the clerk has any control over its action. This pair of contacts 58 acts as the master contact for the drawer unlocking circuit, and the drawer is only unlocked after the winding handle has been moved far enough to insure the operation of the impulse transmitter, and the closure of this pair of contacts 58 completes the circuit of the unlocking magnet of the drum as predetermined by the pressure of the clerk's key. This drawer is unlocked, therefore, only at a time which is too late to permit the clerk to make any alterations in his key designations by working push button 83.

I will now describe the apparatus at the home station. The apparatus at this station, which is directly responsive to all of the impulses sent from the remote station, is comprised of three relays, which I term the impulse, the printing and the release relays, respectively. As these are substantially like each other and also like other relays in the systems, and therefore easily confused with each other in the circuit drawing, I will depart from the plan heretofore followed of designating the different parts by reference numerals, and will mark each of these relays by initial letters suggestive of their function. Thus, I call the impulse relay IR, the printing relay PR, and the release relay RR. This scheme of relay designation will be followed throughout.

I have not thought it necessary to illustrate the mechanical features of these relays other than as they are suggested in the circuit drawings. Any standard type of relay will answer the purpose, and the only variation in the relays is in the arrangement of their contacts, all of which are indicated on the circuit drawings in the usual diagrammatic way. The windings of these relays may vary in resistance and number of turns in accordance with the well known principles of relay operation, so that each may derive its proper amount of current from the circuit in which it is designed to operate.

The impulse receiving device of my invention is shown in Figs. 15, 16 and 17. This device is controlled entirely by impulses received over local circuits from the impulse and release relays. Broadly speaking, this impulse receiving device is a step by step circuit selecting and circuit changing switch. It consists essentially in a base 97, a rotating switch arm 98, carrying three brushes 99, 100 and 101. This rotary switch arm is actuated in one direction, a clockwise direction as viewed in Fig. 15, by the pawl and ratchet mechanism under the control of the operating magnet OM, and in the other or counter-clockwise direction by the coil spring 102, this being allowed to come into play by the action of the release magnet RM. In designating the various motor magnets, as distinguished from relay magnets, I will follow the same scheme of designation as in the case of the relays, using initial letters in some degree suggestive of the function performed. For this reason I have called the two magnets of the impulse receiving device OM, indicating operating magnet, and RM, indicating release magnet.

Another essential part of the impulse receiving device is the bank of stationary contacts arranged in three layers or rows concentrically about the axis of rotation of the switch arm 98 and embedded in insulating material 106. I designate each of these layers or rows of contacts by the numerals 103, 104, and 105, respectively, as shown in Fig. 16. The contacts in these rows are adapted to be engaged respectively by the wiper contacts 99, 100 and 101, when propelled by the operating magnet OM.

Referring particularly to the driving mechanism associated with the magnet OM, 107 is the armature lever pivoted on a fixed support. This lever carries at its free end a pawl 107$^1$, and it is actuated in a direction opposite to the pole of the magnet by a retractile spring 108. It normally rests against the stop 109, as shown in Fig. 15. Pivotally supported on the lever 107 is the armature proper 110. This is of soft iron and is rigidly attached to a blade 111 pivoted to the lever 107 at 107$^2$. The free end of this blade is formed as a pawl 111$^1$ which engages the ratchet wheel 112 to drive the wheel under the impulses received by the magnet OM. The action of this driving pawl mechanism may be understood by considering Fig. 15 in conjunction with Fig.

17, the former showing the position of the parts when the magnet is deënergized and the latter when it is energized. The blade 111 projects through a slot in the lever 107 and is normally pulled back by the retractile spring 113, so that the armature proper rests immediately against the lever 107 throughout its entire length.

In the deënergized position of the magnet, both the springs 108 and 113 act as retractile springs to hold both pawls out of engagement with the ratchet teeth. When the magnet OM is energized, the lower end of the armature 110 is first attracted toward it, this swinging on the pivot $107^2$ in the lever 107. This occurs first because the spring 113 is weaker than the spring 108. In this way the driving pawl $111^1$ is first thrown into position for engagement with the teeth of the ratchet wheel 112. When the pin $111^2$ is brought by this movement into engagement with the lever 107, the continued pull of the magnet OM draws the entire armature toward the left, as shown in Fig. 15, and thus moving the pawl $111^1$ to the left and carrying the ratchet wheel 112 with it. This same movement brings the pawl $107^1$ into engagement with the ratchet wheel 112, this engagement being on the face of one of the teeth and this prevents any tendency on the part of the wheel 112 to overstep, due to inertia it receives from its driving impulse. The apparatus is now in the position shown in detail of Fig. 17. The deënergizing of the magnet OM will allow both retractile springs 108 and 113 to pull the parts back into the position shown in Fig. 15. By the peculiar and novel arrangement which I employ in connection with this driving mechanism, I am enabled by the very simple means shown to clear both the driving and overstepping pawls from the teeth of the ratchet wheel, so as to leave that wheel free to return to its normal position when finally released by the action of the magnet RM. This not only prevents wear on the pawls and teeth, but is of further advantage in that it prevents any possibility of these pawls holding the ratchet wheel on its return movement, due to excessive friction.

Any backward movement of the ratchet wheel 112, under the influence of the spring 102, is prevented by the release pawl 114, which is carried on the end of a sliding stud mounted in a bracket 115 and adapted to be impelled away from the ratchet wheel by the attraction of the magnet RM and in the opposite direction by the tension of the spring 116. The return movement of the switch arm 98 with its wiper contacts is arrested by the stationary pin 117, this position being such that two of the wiper contacts 99 and 100 will rest on the first contacts of their respective rows 103 and 104, while the upper contact 101 will rest just between the first and second contacts of its row. The spacing of the ratchet teeth on the wheel 112 is such that each forward movement of the wheel under the influence of the magnet OM will move the wiper contacts from one of the stationary contacts to the next, the wiper springs 99 and 100 always being brought to rest on their respective contacts, while the wiper spring 101 always passes one of its contacts during the movement and always comes to rest between two contacts without coming to rest on either. The arm 98 is rigidly secured to the ratchet wheel 112 and revolves with it always. This wheel and arm are carried on the shaft 118, journaled in the base plate 97 and in the outboard bearing 119. The coil spring 102 is secured at its inner end to the shaft 118 and on its outer end to the stationary post 120, so that the rotation of the ratchet wheel and shaft by the magnet OM tends to wind the spring, while the unwinding of the spring is relied upon to produce the rotation in the reverse direction.

I employ for the purpose of registering and recording and for the purpose of accomplishing various important switching functions at the home station, a device which I term a combined switching and spacing carriage. Broadly speaking it accomplishes a three-fold function: First, it operates as a switching and circuit changing mechanism for progressively moving certain circuits into operative relationship with various pieces of the apparatus, holding such circuits operative until their function has been performed, and afterward rendering such circuits inoperative during times while the pieces of apparatus controlled by such circuits require to be inert. Second, it accomplishes the spacing of the figures, letters or other characters as printed or otherwise recorded by the recording mechanism. Third, it brings the various operating levers of the several registering mechanisms, such as adding devices, successively into and out of operative relation with their corresponding motor magnets; these operating levers being selectively brought into operative relationship with their magnets at times when they are required to be under the control of such magnets, and out of such relationship at such times when these devices should remain inert.

My combined switching and spacing carriage is shown in various aspects and details in Figs. 18 to 31, inclusive, which figures also show the relations of the printing, registering and switching parts to the carriage, and to each other. This carriage consists in a plate or other body which is adapted to be moved step by step in one direction under the influence of a motor magnet, and to be moved in the opposite direction tion by a suitable spring or by any other well known means. The specific embodiment of my combined switching and spacing carriage shown in the drawings consists in a carriage plate 121. The general form of this plate, from which the apparatus has been dismounted, is shown in Fig. 27, and it is mounted for a limited longitudinal travel by means of tracks or rails 122, on which run supporting wheels 124, journaled on the carriage as shown. A stationary guide rail 123, coöperating with two guide rolls or wheels 126, serves to hold the carriage on its supporting rails as against lateral or upward displacing forces. The horizontal arrangement of these rails and wheels is shown in Fig. 27 in dotted lines, and they are shown in elevation in Figs. 23, 24, 26 and 29.

The motor mechanism for advancing the carriage is best shown in Figs. 19, 20 and 21. The carriage operating magnet, marked COM, is rigidly mounted at one end of the base plate 125, which supports the rails on which the carriage travels. This magnet has an armature 127 adapted to impart longitudinal motion to the push rod 128, slidably supported in the bearings 129 and 130, and in the sleeve 131¹ of the rod 131. The coil spring 132 serves to impart the return movement to the push rod 128 after it has been moved by the motor magnet. The rod 131 is journaled to turn in the bearings 133 and 134. This rod has no possible longitudinal motion and the nature of its connection with the push rod 128 by means of the sleeve 131¹ and the pin 128¹ is such that the push rod 128 may slide back and forth with respect to the rod 131 without moving the rod 131 longitudinally. Any turning movement of the rod 131, however, is imparted to the push rod 128 through the pin 128¹ and slot in the sleeve 131¹, this push rod 128 being allowed to turn as well as slide in its bearings 129 and 130. The bearing 133, supporting the rod 131, projects through the slot 135 in the carriage plate 121, so as to permit of the required longitudinal movement of the carriage and its attached part.

Referring particularly to Figs. 19 and 20, a ratchet rack 136 is carried on the carriage plate 121 just below the rods 128 and 131. Mounted on the lower side of the push rod 128 is a pawl 137 held by a spring 138 in such position that its driving tooth is pressed into engagement with the ratchet teeth on the left hand end of rack 136. As the push rod 128 is moved forward and back by the alternate influences of the magnet COM and the spring 132, the pawl 137, engaging the teeth of the left hand ratchet on the rack 136, serves to drive the carriage forward a step at a time against the pull of its restoring spring mechanism. This restoring spring mechanism is best shown in Fig. 27, and consists of a coil spring 139, one end of which is stationary on the base plate 125, and the other end of which is attached to the short shaft 140 mounted in journal 141. This shaft carries a drum 142, around which is wound a metal tape or chain 143, the free end of which is attached to the carriage 121.

On the lower side of the release rod 131 is mounted a pawl 144 which is depressed by a spring 145 into engagement with the teeth on the right hand end of the ratchet rack 136. This pawl 144 serves as a holding pawl to prevent the recession of the carriage after each forward movement received from the push rod 128. In the particular embodiment of my invention disclosed, the combined switching and spacing carriage has six possible working positions as determined by the six notches in the left hand end of the rack 136. In other words, the carriage may be moved by five successive full steps beyond its normal position. The sixth movement of the carriage, under the influence of the magnet COM when the pawl 137 rests in the left hand notch of the rack 136, is made use of to complete a switch contact, as will be referred to later, to bring into play the carriage release magnet CRM. This carriage release magnet, shown in Figs. 18 and 28, is secured to the base plate 125 and has an armature rigidly secured to the rocker shaft 131. This release magnet is set sufficiently low to allow the right hand end of the carriage 121 to ride over it when the carriage is moved to the right from its normal position. The energizing of this magnet causes a rotary movement of the shaft 131 and also of the push rod 128. This rotary movement of these two shafts 128 and 131 moves the driving pawl 137 and the holding pawl 144 laterally with respect to the ratchet rack 136 and out of engagement with its teeth, allowing the carriage 121 to be returned to its normal position by the spring 139, so as to be ready for another forward progressive movement. A guide plate or shroud 136¹ is provided for each of the ratchets on the ratchet rack 136, extending over, but not beyond, the second to fifth teeth, inclusive. The function of this is to permit the lateral exit of the pawls 137 and 144 from their respective ratchets under the influence of the carriage release magnet at the end of the advance movement of the carriage, and to permit a lateral entrance of these pawls into their respective ratchets after the carriage has returned to its normal position. As the impulse to the magnet CRM is only momentary, the pawls slide along the outer faces of the shrouds 136¹ in the return movement of the carriage, and only enter their respective ratchets at the end of the return movement. This prevents any possibility of the pawl catching those teeth of the ratchet that are intermediate of the first and last teeth.

On the central portion of the carriage plate 121 is mounted the printing or recording device shown in whole or in part in Figs. 18, 22, 23, 24, 25, 30 and 31. This printing or recording mechanism consists in a plurality of pivoted type bars and their actuating magnets, all mounted on the base 125. It consists also in a suitable platen and rollers for maintaining the paper in proper printing position with respect to the type bars, this platen and rollers, with their associated feeding device, being mounted on the movable carriage plate 121. This platen and paper feed mechanism is mounted on a framework pivoted on the rear side of the carriage so as to allow the platen to be elevated or depressed, according to whether upper case or lower case characters are to be received on the printing surface from the type bars.

In describing the type actuating mechanism of my printer, I will refer particularly to Figs. 22 and 23. The type bars in the particular form of printer I have illustrated are ten in number and are shown at 146. These are journaled in supporting posts 147, arranged in the arc of a circle as shown in Fig. 22, the center of this arc being so disposed with respect to the printing platen 148 that the printing character on each type bar will impinge on the same place on the platen for any given position of the carriage. Each type bar carries two type faces 146¹ and 146², which I designate as upper and lower case in accordance with the ordinary typewriter nomenclature, although strictly speaking they do not represent capitals and small letters. Rotary movement is imparted to each type bar by means of a pinion 150, coöperating with a segment 151. This segment 151 is carried at the outer end of a lever 152, pivoted at 153 to the return core 154 of the printing magnet PM. An armature 155 is carried by the lever 152, so that a downward pull of the armature by the magnet will cause the type bar to rotate into striking position, as shown by the dotted lines in Fig. 23, and also as shown on the tenth or upper type bar in Fig. 22. A retractile spring 156 serves to impart the return movement to the operating lever 152 and the type bar 146 when the magnet is de-energized.

The type face may cause its imprint, without the use of ink or ribbon, by merely striking against the paper which, if of soft texture, will receive a legible imprint by this means alone. In Figs. 18 and 22, however, I have shown an inked ribbon 256 which may be mounted and caused to feed in any well known manner, so as always to receive the impact of the type face, and cause the corresponding imprint on the paper.

Mounted upon and forming a part of the combined switching and spacing carriage, is the paper feed mechanism, best shown in Fig. 23. This mechanism is mounted on a framework consisting of two upright members 157, this framework being hinged to the carriage plate 121 at 158. The stationary portion of these hinged members is shown in Fig. 27.

I prefer to print on a paper tape and have illustrated my apparatus as being adapted for such purposes. The supply reel from which the tape is drawn is shown at 159, and may be of any of the well known types. This has a frictional device, best shown in Fig. 25, the purpose of which is to keep the reel from overrunning under the influence of a sharp drawing off impulse of the feed mechanism. The paper tape 160, forming the recording surface, is drawn off of the reel 159 around the roller 161, thence around the platen 148 under the roller 162, and thence around the take-up reel 163. The feed rollers 161 and 162 are geared to the platen 148 by a spur gearing, as clearly shown in the drawing. Rotary motion is imparted to the feed roller 161 by means of the ratchet 164 and the pawl 165, this latter being reciprocated by the combined action of the feed magnet FM and the retractile spring 166. The rotation thus received by the feed roller 161 is imparted to the platen 160 and the other feed roller 162, in an obvious manner, the object of the gearing together of these rolls being to prevent an undue strain upon any part of the tape and to secure sufficient combined friction on the three rolls to give the necessary pull to the paper. Rotary motion is also imparted to the take-up reel 163 by means of the ratchet wheel 167 and a pawl 168, this pawl also receiving its necessary reciprocatory motion from the feed magnet FM. From the nature of this feed mechanism, it will be seen that the feed motion of the paper will be intermittent and this is intended, since it is desired that the line of printed characters across the paper shall be devoted to the record of a single transaction, and consequently there is no motion of the feed mechanism required until a transaction is completed. At the end of a transaction, as will be described, the feed magnet FM is energized, which advances the paper one step so as to present a clear surface for the record of the next transaction.

It is obvious that the diameter of the roll of paper on the supply reel gradually diminishes, while that on the take-up reel increases. In order to provide for the varying diameter of the roll on the take-up reel, so as to prevent slack or undue tension, I provide a frictional connection between the driving ratchet 167 and the reel 163, this being shown in detail in Fig. 22. In this, 169 is a friction plate keyed to the shaft of the reel 163. 170 is another friction plate secured to the ratchet 167, and 171 is a piece of fiber or other material between the two friction plates. On the outer side of the ratchet 167 is another friction plate 172, slidable on the shaft of the reel, and all of these parts are pressed together on the shaft by the springs 173 and their adjusting nuts. The ratchet 167, with its attached friction plate 170, is loose on the shaft, while the friction plates 169 and 172 are keyed thereto to prevent rotation. All the driving force which the ratchet 167 may exert in turning the take-up drum is, therefore, that due to the friction between it and the friction plates, and the amount of this friction is adjusted to allow the proper slippage without breaking the paper.

In order that both the upper and lower case characters on the type bars may be made available at the proper times, I provide that the front of the paper feed mechanism may be elevated or depressed the proper amount by the mechanism which is shown principally in Figs. 23, 24, 30 and 31.

Secured to the front lower portion of the paper feed framework 157 is a bracket 174, from which a shoe 175 projects so as to rest upon the carriage plate 121 or the top surface of the post 176, according to the longitudinal position of the carriage. When the shoe 175 rests on the post 176, the printing platen is elevated, as shown in Figs. 23 and 30, this representing the position in which the upper case characters will be printed, which occurs only in the first two positions of the carriage. When the carriage progresses beyond the second position, the shoe rides off of the post 176 under the influence of the spring 177 and gravity, thus bringing the platen into position for receiving lower case characters, which only are applied in the third, fourth, fifth and sixth positions, in which position it is shown in Figs. 24 and 31.

In order that the shoe 175 may be able to surmount the post and thus return to its normal or raised position when the carriage returns to normal, the dog 178 is provided, this being pivoted in the post 176, as shown, and is normally kept in its raised position, shown in Fig. 30, by the spring 179. When the carriage is being driven forward—to the right as shown in Figs. 30 and 31—the shoe 175 pushes the dog 178 aside and drops down on to the carriage plate 121, as shown in Fig. 31. As the carriage progresses further in its movement, the shoe 175 rides past the dog, which then returns to its normal or raised position, as shown in Fig. 30. When the carriage is returned by the action of its retractile spring to its normal position, this dog acts as an incline upon which the shoe 175 may ride to elevate the paper feed mechanism to its normal position.

I will now describe the money counters which are mounted upon the combined switching and spacing carriage. The details of this apparatus without reference to the mounting are shown in Figs. 32 to 39, inclusive. I distinguish between money counters and transaction counters by the fact that the money counters may be added to by increments having values of $10, $1, 10¢ and 1¢, respectively, while the transaction counters may be added to only by single units, the one counting money values and the other merely transactions. In the money counter shown in Figs. 32 to 39, inclusive, there are five counting wheels, each carrying numbers from 0 to 9. The total registration capacity of one of these counters is, therefore, $999.99. It is obvious that this range may be increased to any desired extent by merely adding additional number wheels of the same type as those indicated. In Figs. 36, 37 and 38, are shown the details of the number wheels. Each number wheel is composed of a cup shaped, cylindrical member 179, to the face of which is secured a double ratchet member 180, this having an internal and an external set of ratchet teeth. On the reverse side of each number wheel, and within the cup thereof, is mounted a pawl 182, as shown in Fig. 38. This pawl has a projecting lip, extending beyond the plane of the rim of the cup, and its function is to engage the internal ratchet of the next adjacent number wheel, this arrangement being clearly indicated in Fig. 37. The desired number of number wheels are strung together on the shaft 181, and the whole is mounted within a casing 183, as shown in Figs. 34 and 35.

The number wheels representing tens of dollars, dollars, tens of cents and cents are each provided with an actuating lever 184, 184¹, 184², 184³. Each of these levers is mounted in the casing, as shown in Fig. 34, the levers being pivoted at 184⁴, and held in their elevated or normal position by means of the springs 185. At the inner end of each lever there is a pawl 186 adapted to engage the outer ratchet on the corresponding number wheel, this pawl being held or pressed toward the ratchet wheel by means of the leaf spring 187, as shown. A downward pressure on the outer end of the operating lever 184 will cause a corresponding raising of the pawl and the moving of the number wheel one notch, as clearly indicated. A dog or finger 188, carried on the operating lever 184, engages the ratchet wheel at the extreme upper limit of the movement of the lever and serves to prevent the possible overthrow of the ratchet wheel due to its inertia. As an additional safeguard against overthrow and also for the purpose of securing the proper alinement of the number wheels when they are released by the pawl, an alinement lever 189 is provided. This is pivoted in the frame, as shown, and is urged upward by the springs 190 at all times, the tension on it being increased as the lever 184 is operated. A further function of this alinement lever 189 is to prevent the number wheels being dragged back by the return movement of the actuating pawl. As shown in Fig. 35, the lever 184 lies in such position as to actuate the cents wheel. One downward pressure on this lever increases the registration by one cent. In like manner the lever 184$^1$ lies in such position as to actuate the tens of cents wheel, and one pressure upon it increases the registration of that wheel by ten cents. In similar manner the levers 184$^2$ and 184$^3$ lie in such manner as to act on the dollars and tens of dollars wheels, and one downward pressure on these levers increases the registration of the instrument by one dollar or ten dollars, respectively.

Obviously, arrangement must be made whereby when any one of the wheels has been rotated so as to register 9, the next movement, which will bring up zero on that wheel, must carry over so as to indicate an increase of one on the wheel of the next higher denomination. This I accomplish by means of the pawl 182. This pawl is normally depressed by the small leaf springs shown in Fig. 38, so as to lie against the pin 192 carried on the interior of each number wheel. In this position the face of the pawl just clears the internal ratchet of the number wheel of the next higher denomination. Carried on the shaft 181 there is pin 191 for each number wheel. These pins are all in the same line on the shaft, and are so disposed that when any wheel reaches the point where it registers 9, through the window 193 in the face of the casing, the pawl within the wheel will ride upon that pin, in moving from 9 to 0, and will thus be thrown outwardly sufficiently for its projecting face to engage the internal ratchet of the number wheel of the next higher denomination and thus increase the registration of that wheel by one, at the same time carrying its own designation from 9 to 0. By this means I provide that each of the first four number wheels may be operated independently by its own lever, each increasing its registration by 1, in the unit registered by that wheel. I also provide that each wheel, when it reaches a registration equal to one unit in the next higher denomination, will carry over that registration. From this it follows that when the wheel representing tens of dollars has been made to register nine units, representing $90, its next move to zero will produce a corresponding movement of one unit on the wheel representing hundreds of dollars, and the same would be true if succeeding wheels were provided representing, successively, thousands and tens of thousands of dollars, if the total registration in one day or other unit of time was likely to be equal to that amount for the particular installation provided for.

The pins 191 on the shaft have still another function. They provide an easy method of resetting the money counters back to zero registration, as will now be described.

Attached to the end of the shaft, as shown in Fig. 35, there is a knurled turning head 194. This is so pinned to the shaft as to permit its longitudinal motion thereon, but no turning motion thereon. Normally this knurled head is prevented from turning by the pin 195 which it carries on its inner face, and which extends into a corresponding hole in the casing 183. The knurled head is normally pressed toward the casing by the spring 196, thus holding the pin 195 within the casing and preventing the turning of the shaft. This spring is one of compression, its outer end resting against a small collar or head on the end of the shaft, and its inner end resting against the pins which prevent the knurled head from turning on the shaft. To reset the money counter to zero from any registration previously attained, the knurled head 194 is pulled out against the compression of the spring, and turned in a counter-clockwise direction, as viewed from Fig. 36. The entire shaft is thus turned and the pins 191 all turn together, each picking up its corresponding number wheel and rotating it with the shaft, this picking up being caused by the pin on the shaft engaging behind the lip or face of the pawl within the wheel. The position of the pin 195, which determines the normal position of the knurled head 194, is such that when all the pawls have been picked up and rotated by their corresponding pins in the manner just described, all of the wheels will have been brought to such a position that they display their zero marking through each of their respective windows. At this time the pin 195 on the inner face of the knurled head will have been brought opposite its hole in the casing 183 and will drop into that hole when released, thus maintaining all of the pins in the proper relation to the number wheel to insure the proper carrying over of numbers from each wheel to the one of higher denomination upon the completion of a registration of ten.

I will now describe the relation of these money counters to the combined switching and spacing carriage and to the electromagnet by which they are operated. The money counters, it will be understood, are mounted directly upon the carriage plate 121, as shown in Fig. 26; the actuating magnet for these money counters being mounted on the base plate 125, and therefore in a movable relation with the money counters. The plan view of these money counters and their operating magnets is shown in Fig. 18. For convenience I have designated the money counters in Fig. 18 by such words as indicate the character of their use. Thus, the money counter marked "Clerk A" is used to count the money received by the clerk designated by the letter "A." Likewise, the money counter marked "Clerk B" is used to indicate the total business transactions made by that clerk during the day. Similarly, the money counter marked "Total" is used to indicate the total business transactions during the time, and the counters marked "Cash" and "Charge" and by other designations, are used to register the total of the transactions under those headings. I have designated the magnets, which operate the money counters by the initial letters MCM, this being suggestive of money counter magnets. Referring to Fig. 26, the relation between the money counter magnet MCM and the money counters proper will be clear. The money counter magnet has an armature lever 197, pivoted in the frame of the magnet, and normally acted on by a retractile spring 198. The forward end of this lever carries a roller 199, which, when the magnet is energized, is pressed down on the money counter lever 184 so as to register one unit on the corresponding number wheel. It is obvious that if, say, seven impulses are received by the money counter magnet, seven impulses will be given to the actuating lever of the corresponding number wheel and as many digits recorded on that wheel.

Referring again to Fig. 18, it will be seen that the levers 197 of the money counter magnet are normally not in engagement with any of the actuating levers of the money counters. It is to be borne in mind that the money counter magnets are on the base plate 125 of the combined switching and spacing carriage, while the money counters themselves are on the carriage plate 121. As shown in Fig. 18, the carriage is in its normal position; that is, in the position which it occupies at the beginning of any registration. It is to be remembered at this point also that the first set of impulses transmitted from the remote station to the home station is that which designates the character of the transaction. These are delivered to the combined switching and spacing carriage while in its normal position and affect only the printing device of that carriage. Likewise, the second set of impulses transmitted from the remote station is that used to designate the clerk performing the transaction. These are delivered in the second position of the carriage, and likewise affect only the printing or recording element. Obviously neither the designation as to the kind of transaction nor the designation of the clerk performing the transaction should be registered on any of the money counters, since in themselves they do not involve any amount of money. The third set of impulses which is received, however, is the one which corresponds to the number of cents in the transaction. This occurs when the carriage has been moved into its third position. In this position; that is, the third position, the carriage will have moved so that all of the operating levers 184 of all of the money counters will lie under corresponding levers 197 of the motor counter magnets, and in readiness to designate the corresponding cents. When the next set of impulses is sent from the remote station, corresponding to the number of tens of cents in the money transaction, the carriage will have been moved to its fourth position, in which all of the money counter levers 184¹ will lie immediately under the corresponding magnet levers 197, and the money counters are thus all receptive to the number of impulses corresponding to tens of cents in the transaction. Similarly for the fourth and fifth movements, the carriage will have been moved so that the money counter actuating levers 184² and 184³ will lie respectively under their corresponding magnet levers 197, with the result that the numbers of dollars and tens of dollars, respectively, will in each case be recorded.

It will be shown when the circuits of my invention are considered that not all of the money counters will be actuated at each position of the carriage. To illustrate this point, if clerk "A" made the transaction, his counter alone would be actuated in the clerk's group when the carriage was in its third, fourth, fifth and sixth positions. All of the other clerks' counters would remain idle. Likewise, if the transaction had been for cash, only the "cash" and "total" money counters of the transaction's group would be actuated for the transaction, those for "charge", "received on account", and "paid out" being idle. This idleness of the counters not involved in a transaction is accomplished by changes automatically effected in the circuits, as will be described when the complete operation of the system is discussed in connection with the circuit diagrams.

I have now described how the combined switching and spacing carriage performs the function of printing or recording, and of registering amounts according to proper classification as to clerk and character of transaction. A third function, lying at the very root of my invention, is performed by this combined switching and spacing carriage; that is, the circuit changing function, by which the various circuits are progressively changed to govern the successive operativeness and idleness of the various parts of the system at different predetermined times.

The means which I employ to accomplish this result consists in what may be termed a progressive switch. This consists in certain movable contacts carried on the movable plate 121 of the carriage, and in certain coöperating stationary contacts supported by the base plate of the frame 125. Such contacts are shown in elevation in Fig. 23, the movable brush 204 being mounted on insulating block 201 on the extreme rear edge of the carriage plate 121. One of these stationary contacts is shown at 205, this being mounted on an insulating block 202 carried on the extreme rear edge of the base plate 125. I prefer to make the movable contacts such as 204, of bifurcated form, so that they will straddle the stationary contacts, such as 205, as they engage them.

Referring to Fig. 18, the disposition of these movable brushes and stationary contacts will be made clear. It being seen that certain of the movable brushes on the rear of the carriage plate 121 are normally in engagement with the corresponding stationary contacts mounted on the base plate, and further, that certain others of these movable brushes do not engage the corresponding stationary contacts until after the carriage has been moved to some of its successive positions. It is by the relative engagement and disengagement of these movable brushes with the corresponding stationary contacts, that the progressive succession of the switching operations which forms an important feature in the carrying out of my invention is accomplished. These will be referred to in detail in the description of the circuits.

The transaction counter mechanism of my system is shown in assembly and detail in Figs. 40 to 47, inclusive. This apparatus needs little description, since it differs in little respect from the money counter mechanism already described. Since these transaction counters are employed to count transactions, it is obvious that the increment by which their registration is increased is always one unit, this unit always having the same value. For this reason but one operating lever is needed, this being on the unit wheel, the tens and hundreds wheel being moved one step to add one unit to their respective registrations for each complete revolution of the wheel of next lower denomination.

These transaction counters are actuated by electromagnets which I have indicated on the drawings by the letters TCM, indicating transaction counter magnets. Since each of these magnets always operates upon one lever, and one only, there is no necessity of providing any spacing mechanism by which the relation of the transaction counters will be shifted with respect to their corresponding operating magnets. These transaction counters are, therefore, mounted apart from the combined switching and spacing carriage, and form no part thereof.

In Fig. 48, the circuit connections of the remote station are shown, and in Fig. 49 those of the home station. By placing these two figures together, Fig. 48 on the bottom and Fig. 49 on the top, the continuity of the circuits between the two stations is brought out and a diagram of the complete system thus afforded. In designating the several parts on these diagrams, I have used the same reference letters and numerals as were employed for the corresponding parts on the mechanical drawings already discussed.

I will describe the circuits themselves and the operation of the system as a whole at the same time. A casual inspection of these drawings shows that nearly all of the wiring is local either to the remote station or to the home station, and that only three signaling wires and two battery wires extend between the home and the remote stations. Of course, a greater or a less number of wires might be used between these stations, and I have found it possible, if desirable, to considerably reduce the number shown, but since the home station and remote station are usually within the same building or group of buildings, the requirement as to reducing the wires to a minimum does not seem to be important, as is the case in telegraphy and telephony.

In Fig. 48, the six banks of contact springs 78 are shown, together with a portion of their push rods 13, at the bottom of the figure. In the lower right hand portion of the figure are shown the drawer unlocking magnets 93 with their associated latches. In the upper left hand portion of this figure the impulse transmitting commutator with its brush arm 68, brush 72 and groups of contact pins 74, are shown. It is to be borne in mind that each bank of contact springs 78 represents one of the banks of keys 1 on the keyboard, and these banks are arranged in Fig. 48 in the same order as the corresponding banks of keys in the plan view of Fig. 4; that is, reading from right to left, the first bank corresponds to the set of keys for registering the class of transaction; the second bank the bank of keys for registering the designation of the clerk; the third bank those for registering tens of dollars; the fourth those for registering dollars; the fifth those for registering tens of cents, and the sixth those for registering cents. As before stated, the various springs of these banks of contacts are wired individually to corresponding pins 74 in the various groups of pins in the impulse transmitter commutator. The commutator contacts may be considered as divided into groups, as indicated by the dotted radial lines on the commutator. Each of these groups of contact pins represents in a general way one of the key banks and its associated bank of contact springs 78, and as will be seen, there are groups of wires extending from each bank of springs 78 to each group of pins 74, these wires connecting individually one spring to one pin. For the purpose of avoiding unnecessary complication in the drawing, I have shown but five wires leading from each of the banks of springs to the corresponding division of the commutator, it being clear, however, how the remaining springs would be connected to the remaining commutator pins were the full scheme of wiring shown. The present embodiment of my invention which I illustrate shows apparatus capable of registering tens of dollars as the highest single denomination on the keyboard. It will be obvious that if hundreds and thousands of dollars were to be added additional banks of keys and contact springs would be added to the keyboard, and additional groups of commutator pins to the commutator.

I preferably provide a single battery or other source of direct current for operating my entire system, though, if desired for any reason, it is easily within the skill of one skilled in the art to sub-divide the batteries in any desired way. A single battery is shown in the drawings, from which all current is supplied, and the principal feed wires leading to the positive and negative poles of this battery are marked at frequent intervals with the signs plus and minus, respectively. The long contact members 79, back of each bank of springs 78, are as already stated, all connected together and to the positive battery through the impulse relay IR. Consequently when any of the springs of a group 78 is pressed against this back contact 79, the commutator pins 74 are connected for the time being with the positive pole of the battery, the impulse relay winding being included in this common path. As the commutator ring 75 is permanently connected to the negative pole of the battery, it follows that as the brush arm 68 revolves, its brush 72 will sweep over the individual pins 74 of the successive groups, and complete a circuit whenever it touches a pin that has been made alive by the springs of the key banks. As it leaves each contact, it will consequently break the circuit, making another when it strikes the next pin that is alive. As the winding of the impulse relay IR is in a portion of the circuit common to all of the circuits so completed, it follows that this relay will receive an impulse for every contact spring 78 that has been made alive by the pressure of one of the keys. It is further evident that these impulses of the impulse relay will be received in groups, and it may be stated at this point that between these successive groups of impulses other impulses are sent to other relays by the action of the commutator for the purpose of accomplishing other changes to be described.

The circuits of the system may be best understood by following through in detail a supposed transaction. Let it be assumed, therefore, that clerk B makes a cash sale, the amount of which is $41.34. He will, therefore, depress in any order he chooses, the corresponding keys to set up this combination on his keyboard, which would be the second key of the sixth bank; the second key of the fifth; the fourth key in the fourth; the first key in the third; the third key in the second, and the fourth key in the first. As a result of this setting of the keys, when the brush 72 begins its travel, around the commutator, it will find two of the pins 74 in the first or character of transactions group connected to the positive pole of battery through the impulse relay. It will also find two of the pins in the clerk's group made alive by the fifth bank of contacts; four of the contacts in the cents groups made alive by the cents contact bank, and so on. It is to be noted at this point, however, that in the case of all of the groups of contact pins in the commutator, except the first, one more live pin exists than the number actually made alive by the corresponding bank of springs, this being due to the fact that the pin in each group preceding those corresponding to the bank contact springs is permanently connected with the positive pole of the battery through the impulse relay. This is accomplished by the wire 301, which connects a contact in every group, except the first, with the wire 300, which leads through the impulse relay winding to the positive pole of the battery.

The reason for providing one more impulse in the third, fourth, fifth and sixth groups; that is, the groups corresponding to monetary registrations, than there are live contact springs in the key banks, is as follows: The type of keyboard for numerical work that has been found most convenient for rapid operation employs banks of nine keys, each representing the digits from 1 to 9 without a zero, zero registration being made by not depressing any key. I use such a key bank. Notwithstanding the fact that there is no key corresponding to zero in any of the denominations of digits, it is necessary to provide for the recording of the zero in the recording devices. This is not true, however, of the registering devices, which do not record, and a differentiation has to be made in the operation of these devices in this respect. This is an important part of my invention and will be made clearer as this description progresses.

In the recording device of my invention, in order to provide for the proper recording of naughts, as well as the nine digits having numerical value, I accomplish the printing of naught by one impulse; of the digit 1 by two impulses, and so on, the digit 9 being represented by ten impulses. It is by means of this additional contact in each group, except the first and second on the impulse commutator; that is, by means of the contacts in the third, fourth, fifth and sixth groups that are connected with the wire 301, that I accomplish this translation from a system of numerical indication having nine active digits for each denomination to a system of recording which necessarily employs ten active digits. It will be noted that I also provide an additional contact connected with the wire 301 in the clerk's group of the impulse transmitter commutator. This also gives an added impulse to the series of impulses sent by this group of contact pins, the reason for which will be made clear in considering the action of the impulse receiving device and is particularly involved in the handling of "no sale" transactions.

The clerk B, having set up the money value $41.34 on the first four key banks and also pressed the button B on the fifth bank to give his signature as it were, and pressed the "cash" button on the sixth bank to show the character of the transaction, proceeds to turn the handle 11 to its extreme limit of travel, one quarter of a turn, and releases it. He is permitted to turn the handle only after pressing one button in each of the fifth and sixth rows, giving his signature and indicating the character of the transaction, by the following means. The depression of these two keys closes contacts 16 and 16¹, as clearly described. The impulse transmitter mechanism being in its normal position, this results in the energizing of the magnet 19 over the following path: from the positive pole of battery over wires 302 and 307 to the coil of the magnet 19, thence by the wire 308 to the pair of contacts 16¹, by the wire 309 to pair of contacts 16, thence by wire 310 to the pair of contacts 60, these being closed when the transmitter is in its normal position, thence to the negative battery wire 306. This results in the unlocking of the transmitter handle, but as soon as it is moved from its normal position the pair of contacts 60 is opened, thus deënergizing the magnet 19 and allowing the pawl 20 to fall back. The pawl 20, however, rides on the periphery of the disk 21 until that has returned to its normal position, when it falls into the depressed portion of that disk and thus prevents the disk and handle from being again moved until the impulse transmitter has gone through its operation, thus bringing the contacts 60 again together, and also until keys in banks 5 and 6 have been depressed for a subsequent operation. In this way I provide positively against any interference with the action of the impulse transmitter during its operation and also against any subsequent starting of the device without the depression of the proper keys.

The pressure of the B clerk's button in the fifth bank resulted in the closure of the springs 96, lying under the key rod of the button pressed, in this case the second key in this bank. These contacts have been referred to in connection with Figs. 1 and 2 and are also shown in Fig. 48. At the end of the winding travel of the handle 11, the pair of master contacts 58 also close, thus resulting in the closure of the circuit of the second drawer unlocking magnet 93 from the top, as shown in Fig. 48. This circuit may be traced from the positive pole of the battery, through wires 302 and 303 to the pair of contacts 58 associated with the winding handle, thence through wire 304, thence through the pair of contacts 96 lying under the second key rod in the fifth bank, and by wire 305 to the second magnet 93 and back to the negative pole of the battery by wire 306. This unlocks the cash drawer and allows its springs to open it.

If at any time prior to the turning of the winding handle 11, the clerk wishes on account of error or for other reasons to correct a key setting, he depresses the restoring button 83, shown in Figs. 3, 9, and 48, this act resulting in the energizing of the key restoring magnets 81, operating on bar 82, as already described. The circuit over which this magnet is energized may be traced from the positive pole of the battery through wire 302, through the two magnets 81 in multiple, through the wire 311, thence through contacts of key 83 to wire 312, thence through contacts 60, closed at the time, to wire 306, and back to the negative pole of the battery. This operation obviously cannot be accomplished after any part of the impulse transmitter has been moved from its normal position, since then the circuit through the contacts 60 will be broken.

The operation by which the indicator drums at the remote station are mechanically set by the forward and winding movement of the handle 11 has already been fully described. It is, therefore, now pertinent to consider the action of the impulse transmitting device in sending impulses to the home station.

The handle 11 is now to be considered returned to its normal position and locked in that position, it being impossible for any impulses to be transmitted until it has returned to normal and become automatically locked in that position. Upon its return to normal the arm 70, shown in Fig. 5, is raised by the pin 69 so as to permit the gear train which drives the commutator brush arm to begin its travel over the different groups of contact pins 74, this travel being continued until one revolution is made, at which time the brush 72 is automatically stopped on the contact from which it started. The pin upon which the brush 72 normally rests is dead, as is also the second one which it engages in the particular embodiment of the invention shown. The first connected pin in the first group is permanently connected by the wire 313 to the longest contact in the sixth bank 78, and this, under the keyboard combination that has been set up, is connected to the back contact 79. In like manner the second connected pin in this group is connected by the wire 314 to the second longest spring in the sixth bank of springs 78, and this also, under the keyboard combination set up, is electrically connected to the back contact 79. The other connected pins in this first group are in like manner connected by the wires 315, 316 and 317 to the next three springs in the sixth bank 78, but these springs are not connected to the back contact 79 because the push rod 13 of the cash key which was depressed lies so low down as to pass under all of these latter springs.

Before describing in detail the circuits of the home station, I will explain briefly the general features of its operation. All impulses from the remote station are received primarily on the three relays, which I call the impulse relay, the printing relay and the release relay. The impulse receiving device operates successively to choose a different set of circuits for each set of impulses sent out by the impulse transmitter, and after its operation corresponding to each set of impulses, it is released and returned to its normal position to again make a selection for the following set of impulses. This impulse receiving device has several functions. Through its lower movable brush 99 and the corresponding row of contacts 103 it selects any one of the printing magnets PM and causes the operation of the selected magnet. Through its second brush 100 and its corresponding row of contacts 104 it selects on its first movement one of a group of transaction counters and money counters. On its second movement it selects one of another group of transaction counters and money counters, ignoring the group from which selection was first made. On movements subsequent to the second, the second brush and second row of contacts have no function. The determination of which group of transaction counters and money counters shall be operated upon by the first movement of the impulse receiving device, as distinguished from the second, is dependent upon the position of the combined switching and spacing carriage, the brushes operated by that carriage placing one group of transaction counters and money counters under the control of the impulse receiving device when the carriage is in its first or normal position, and another set of transaction and money counters under the control of the impulse receiving device when the combined switching and spacing carriage is in its second position. The third or top brush 101 and the corresponding row of contacts 105 of the impulse receiving device has no function on the first and second movements of the impulse receiving device, but on subsequent movements it serves to determine the number of impulses that shall be sent to the various money counters which have been selected by the first two movements of the impulse receiving device in conjunction with the switching carriage.

To return to the more specific statement of operation: When the brush 72 reaches the first live contact in the first group; that is, the one in connection with wire 313, it closes a circuit which may be traced as follows: from the positive pole of battery through the wire 318, coil of impulse relay IR, thence over wires 300 and 319 to wire 320, thence to the back contact 79 of the sixth bank, thence to the spring in the sixth bank which is connected to the wire 313, thence to the pin 74 connected with the wire 313, brush 72, commutator arm 68, brush 76, collector ring 75, and to the negative pole of the battery by wires 252 and 306. This gives one impulse to the impulse relay IR. The next live contact engaged by the brush 72 will close a similar circuit and give another impulse to the impulse relay IR, the only difference between these two circuits being that the wire 314 with its connected pin and spring, is employed instead of the wire 313 with its connected pin and spring. The brush 72, in passing over the third and following contacts in the first group which are connected with the springs in the sixth key bank, finds these contacts electrically dead, and therefore produces no result on the impulse relay. Before discussing the effect of the subsequent contacts made by brush 72, the effect of the two impulses already received by the impulse relay will be described.

The function of the impulse relay is purely that of relaying the impulses from the impulse transmitter to the operating magnets OM of the impulse receiver device. The armature of the impulse relay is permanently connected to the positive pole of the battery by wire 318. When this relay armature is closed against its front contact, connection is made with the wire 321, which leads to the winding of the operating magnet OM of the impulse receiving device, the other terminal of this winding being connected to wire 322, which leads to the negative pole of the battery. From this it follows that each forward movement of the armature of the impulse relay IR results in the energizing of the operating magnet OM of the impulse receiving device. As has been shown in the discussion of the impulse receiving device, each impulse of the operating magnet moves the brush arm and brushes forward one step, and therefore the passage of the brush 72 of the impulse transmitting device at the remote station over the two live contacts in the first group has resulted in the brushes 99, 100 and 101 being moved two steps from their normal positions, so that the brushes 99 and 100 will rest on the third contacts of their respective rows 103 and 104, while the brush 101 will have moved over the second and third contacts in its row 105 and to a point midway between the third and fourth contacts in that row.

The impulse receiving device having been set in this position, nothing further happens until the brush 72 of the impulse transmitter in its continued movement reaches the first one of the double contacts in the first group, this being connected with the wire 323. This double contact is formed by merely joining two of the pins 74 electrically together, the purpose of making it double being to insure a prolonged contact and consequently a prolonged impulse. This wire 323, which is connected to similar double contacts in all succeeding groups, is connected also to the printing wire 324 leading to the coil of the printing relay PR, the other terminal of which is connected to the positive battery wire 318. The passage of the current through this magnet, due to the impulse thus transmitted over the printing wire, results in the attraction of the armature of that relay, which closes two circuits. The first of these circuits may be traced from the positive battery wire 318 to the armature lever 325 of the printing relay, thence over the wire 326 to the brush 99. This brush at the time rests on the third contact of the row 103 and the circuit is therefore continued over the wire 327 through the second printing magnet PM, through the winding of such magnet, to the common wire 328, back to the negative pole of the battery. The printing magnets and printing type bars will be referred to as the first, second, third, etc., counting from the left hand end of the row, as shown in Fig. 49.

The platen 160 is at this time in its elevated position, and therefore adapted to receive an upper case impression from the second type bar 146. Furthermore, as the carriage is in its normal or first position at this time, the imprint from this type bar will be received on the right hand side of the tape as viewed in Figs. 18 and 49, at the point marked $x^1$ in Fig. 49.

The characters carried by each of the ten type faces are shown diagrammatically in Fig. 50. While this view represents in general appearance a face view of the type, the type have not been reversed as they would actually appear, but are shown as they will print to facilitate disclosure.

As the second type bar was caused to imprint its upper case character, it is seen that the letter "A" has been printed at the extreme right hand of the tape, in the position marked $x^1$. This letter "A", when occurring in the right hand column of the printed tape, will be the designation for a cash transaction.

The printing relay, besides directly closing the path to the printing magnet through the path chosen for it by the impulse receiving device, as just described, closes another contact, which results in connecting the wire 329 with the negative battery wire 322 at that relay. This circuit may then be traced from the negative pole of the battery, through wires 322 to wire 329, to the brush 330 on the carriage plate 121. This brush in the first or normal position of the carriage rests on contact plate 331, which is stationary on the strip 202 supported by the base 125. From this contact the circuit is continued by wire 332, thence to the back contact of the "no sale" relay NSR. As this relay is deënergized its back contact is closed and the circuit is continued by wire 333 to the brush 100, which at this time rests on the third contact in row 104 of the impulse receiving device. From this contact the circuit is continued by wires 334 and 335 to brush 336 on insulating block 201, mounted on carriage plate 121. This brush in this normal position of the carriage engages the stationary contact 337 mounted on the block 203 on the stationary base plate 125, thus continuing the circuit to wire 338, and thence to the coils of the cash transaction relay TR 397, and the cash transaction counter TC in multiple. The paths through the windings of these two coils re-unite at the point 339, and the circuit is continued through the wire 340 to the carriage brush 204 resting on the contact plate 205, and thence to the positive side of the battery by wire 342.

This action results in the energizing of the transaction counter TC and the cash transaction relay TR 397.

The energizing of the transaction relay TR 397 results first in the closing of a locking circuit by the armature of this relay. This circuit may be traced from the negative pole of battery by wire 322, wire 257 to the lower one of the three contacts on the relay 397 thence through the armature and coil of this relay to the point 339, by wire 340 to brush 204, thence to plate 205, with which this brush is at the time in contact, and to positive battery wire 342. This locking circuit includes the coil of the transaction relay and this relay, once operated, will therefore remain energized until the brush 204 rides off of the plate 205 which it does only when the final step is given to the carriage, that is until the carriage takes the step which results in the release and return to its normal position.

The object of operating the cash transaction counter at this time was to cause it to add one transaction to its registration. The object of operating and locking the cash relay TR 397 was, first, to prepare a path over which subsequent impulses may be sent through the cash money counter magnet; and, second, to prevent any false registration or operation on the cash transaction counter. As will be shown, the other transaction counters of this group will be thrown out of commission so as to be beyond the possibility of operation when the carriage moves to its second position.

As the brush 72 of the impulse transmitting device passes on to the last contact of the first group; that is, on to the double contact which is connected with the wire 343, an impulse is sent over a circuit which may be traced from the brush 72, which is in contact with the negative pole of the battery, to the contact mentioned, thence over wire 343 to the release wire 344, thence to the release relay RR, and thence to the positive pole of the battery. This relay is thus operated on, and upon the consequent pulling up of its armature it closes a circuit from the positive battery wire 318 through the armature lever to the front contact, thence to wire 345. This circuit branches two ways, the first branch leading through wire 346 to the release magnet RM of the impulse receiving device, and thence to the negative pole of the battery by wire 347 and wire 322. The current flowing through this branch results in the release of the brushes of the impulse receiving device and their restoration to normal position, ready for a subsequent set of impulses. The other branch closed by the release relay may be traced through the magnet COM, which operated the combined switching and spacing carriage, and thence to negative battery through the wire 349. This results in the movement of the carriage 121 one step, as already described. In this position the platen 160 is in proper position to receive the imprint of the clerk's designation on the point $x^2$. It has also cut off all possible access to the group of transaction counters TC, and money counters other than the one previously selected and locked up by moving of the contact brushes 350, 352 and 354 from the corresponding stationary contacts 351, 353 and 355. This movement of the carriage has also prepared the way for access to the clerk's group of money counters and transaction counters, by causing the brush 356 to ride upon the stationary plate 357. It will be noticed also that in this second position of the carriage, and also in all of its subsequent positions up to the last, the brush 204 will remain in contact with the contact plate 205, thus maintaining the circuit through the chosen cash transaction relay magnets and keeping the cash relay in a locked up position, regardless of the braking of the circuit over which it was originally energized.

The brush 72 of the impulse transmitter in its further travel passes over the contacts in the second group, that is, the contacts contained within the group in which some are connected to the contact bank of the 5th or clerk's bank of keys. In passing over this group, momentary circuit is made through each pin or contact in the group that has been connected to the positive pole of battery through a circuit containing the winding of impulse relay IR and the contacts pressed together in the fifth contact bank 78 by the action of pressing and locking the desired key in this bank. In this particular case, and as before stated, the clerk "B" has pressed his key, which has resulted in pressing the next to the longest and the longest spring of the bank 78 into connection with back contact 79. This has made alive by connection to positive battery the two contacts in the second group which are connected permanently by wires 358 and 359 to the longest and next to the longest contact springs in contact bank 78. Before, however, the brush 72 reaches these contacts connected to the wires 358 and 359, it passes over and makes contact with a contact pin connected to wire 301, and which is permanently connected to positive battery through the wires 301, 300, and the winding of impulse relay IR. The brush 72 then in passing over this pin makes a circuit as follows: from negative battery over wires 306 and 252 to collector ring 75 of the impulse transmitter, to and through brush 72, contact pin, wire 301, wire 300, to and through the winding of impulse relay IR to positive battery, and moving the armature lever of IR once into connection with its front contact.

The brush 72 in its progression then passes over the contact pins in the circular row 74, which are connected to wires 358 and 359. As the brush 72 passes over these pins it makes circuit first over contact connected to wire 358 and then with contact connected to wire 359. From these two contacts the circuit continues to the contacts in bank 78, closed against the back spring, then by wires 320, 319 and 300 to and through the winding of relay IR to battery, and bringing the armature lever of this relay twice in connection with its front contact. In passing over succeeding single pins in this group no circuit is made through the impulse relay IR, as the wire 361 and succeeding ones in the group are not connected in this case to wire 320. Had the clerk "E" operated his key, it would have resulted in the making live of all the connected contacts shown in this group and the result would have been that six impulses would have been sent instead of three, as in the present case.

It may be noted here that there have been three impulses sent over the wire 300, but two of them resulted from the contacts connected to wires 358 and 359. The other or first impulse resulted from the brush 72 passing over the first contact of the group which is connected to wire 301. The reason for the sending of this extra impulse will be given when a transaction involving "no sale" is considered.

The relay IR thus having been operated three times by the brush 72 passing over the live contacts in the second group, a relayed circuit is established whereby the magnet OM of the impulse receiver is stepped forward three steps, and with its brushes resting on the fourth or third from normal set of contacts. This circuit is the same as described in the setting of the impulse receiver brushes, due to the first set of impulses, and is from positive battery over wire 318 to pivot of relay IR, and from there to the front contact of said relay and by wire 321 to and through the operating magnet OM, and by wire 322 to negative battery.

The brush 72 in its further progression reaches the double contact in the group under consideration, which same is connected with wire 323, and a circuit is made to operate the printing magnet PM of the printing mechanism. This circuit may be traced from the negative battery wire 306, wire 252, collector ring 75, brush arm 68, brush 72, double contact connected to wire 323, wire 324, winding of printing relay PR, to wire 318 and positive battery. This results in the momentary energization of the magnet of printing relay PR and causes its armature lever to be brought against its front contact, thus completing the relayed circuit. This relayed circuit is from positive battery wire 318 to pivot of relay PR, front contact, and by wire 326 to brush 99 of the impulse receiver now resting on the third from normal contact, wire 362, to and through the third printing magnet PM, to common feed wire 328, to negative battery. This operation of the magnet PM results in the third type bar striking the paper on the platen of the printing mechanism at the point $x^2$, and the printing of the letter "B". The arrangement of the type faces will be found in Fig. 50, where it will be seen that the third type bar prints the letter "B" when printing in upper case. Simultaneously with the establishment of the printing circuit thus described, another circuit is made whereby lock relay RB, which governs the action of clerk B's money counter, is locked up in readiness to be used on succeeding sets of impulses in the same manner in which lock relay TR of the transactions group was locked up through the action of the first set of impulses. This circuit is from negative battery, wire 322, wire 349, upper pair of contacts of printing relay PR, wire 329 to brush 330, carried on rear of spacing and switching carriage plate 121, thence to stationary contact plate 331 carried by insulating block 202, and by wires 332 to and through back contacts of relay NSR, then by wire 333 to brush 100 of impulse receiver now resting on the fourth set of contacts, to fourth contact in row 104 of same, by wire 363 to and through winding of clerks' relay RB, wire 364, wire 365, to movable brush 356, to contact plate 357, on which the brush 356 is now resting, as the carriage is now in its first from normal position, and by wire 342 to positive battery. The above circuit has energized RB of the group of clerks' relays, and upon its armature lever being brought into connection with its front contact, an independent circuit is completed whereby the armature lever is locked in connection with its associated front contact. This lock up circuit is traced as follows: positive battery, wire 342, stationary contact plate 357, movable brush 356 resting thereon, wire 365, wire 364, winding of relay RB, wire 367, pivot of relay RB, front contact of same, and by wire 368 and wire 322 to negative battery. The above described circuit will result in the continued energization of relay RB after the circuit over which it was originally energized is broken, and it will remain energized until the movable brush 356 leaves, in its progression, the stationary contact 357.

It is well to state here that the branch circuit, running from wire 363 and branching at the point 253, is at this position of the carriage open at movable brush 350 and contact 351, as are all feeds to the transaction group of relays marked TR. Had the above described circuit, which same has selected RB, been made when the carriage was in its first or normal position, the second relay marked TR, in the transaction group of relays would have been selected and locked up, and this over the branch circuit starting at the point 368, brush 350 and contact 351. In such a case, RB or any of the group of clerks' relays could not have been selected, as the circuit through brush 356 and contact 357 is open in the first or normal position of the carriage.

Of the relays comprising the transaction group and clerks' group, but one relay, and that one of the transaction group, may be selected on the first position of the carriage, and only one and that in the clerks' group, may be selected on the second or first from normal position of the carriage. This results from the energizing circuits to all clerks' relays being open in the first position of the carriage through brush 356 and contact 357 not being in connection, while brushes 336, 350, 352 and 354, and contacts 337, 351, 353 and 355, governing the group of transaction relays, are in contact, thus allowing of a selecting circuit to be made, as has been described in conjunction with the first set of impulses, and on the second or first from normal position this condition is reversed, as then the brushes and contacts governing the transaction group of relays are not in connection with each other, but brush 356 and contact 357 of the clerks' group are thus allowing of a selection as described in connection with the second set of impulses.

The brush 72 of the impulse transmitter in its further progression makes circuit with the double contact of the group connected to wires 343, and a circuit is made in the same manner and over the same wires as was described in conjunction with the release of the impulse receiver and the advancing of the carriage from normal to first position after the first set of impulses. This circuit, established over wire 344, energizes the release relay, which in turn energizes the magnet RM of the impulse receiver and magnet COM of the spacing and switching carriage. This results in the returning of the brushes of the impulse receiver to their normal position and the advancing of the spacing and switching carriage with its attached printing mechanism another step or to third position. At this position, a type bar of the printing mechanism will strike at the point marked $x^3$ on the platen. At this third position the printing mechanism will print the cents digit in the value of the purchase. In the first two movements of the carriage it will be remembered that the printing mechanism was printing "upper case" characters, by reason of the printing frame which carries the platen being in an elevated position on post 176, as shown in Figs. 30 and 31, and as has already been described.

As the carriage advances from its second to its third position the shoe 175 pushes the cam 178 aside, and drops off of the post 176, so that the shoe now rests upon the carriage plate 121. This moves the platen into such position that it will receive lower case figures from the type bars. The reason for this change at this time is that the designations for the clerk and for the kind of transaction have now been given, and these are for convenience represented by letters or characters other than numerical figures. The only remaining designations now to be given are those of monetary values, and these are best represented by the Arabic figures, all of which are found in the lower case, as in Fig. 50.

Other changes brought about by the movement of the carriage into its third position are as follows: The most important of these is the movement of the hitherto unused movable brush 380 into engagement with stationary contact 381. This completes the battery feed for the money counting apparatus, which up to this time has not been brought into play. In this position of the carriage also, the movable brush 330 has moved out of engagement with the stationary contact 331, thus breaking the feed to the brush 100 of the impulse receiver as reached by the wire 333. This means that for all operations of the impulse receiver, after the second operation, the brush 100 and its middle row of contacts on the impulse receiver will be inoperative. This row of contacts of the impulse receiver was the one which on the first set of impulses was instrumental in operating one of the transaction group of relays, and also on the second set of impulses operated one of the relays in the clerk's group. Having operated one of these relays in each group, and caused it to lock up, thus preparing a circuit for the counting impulses to the appropriate money counting apparatus, this middle row of contacts on the impulse receiving device has no further function, and is, therefore, put out of service for all subsequent operations; that is, for all subsequent sets of impulses received from the impulse transmitter at the remote station for this particular transaction.

Another important result accomplished by the movement of the carriage into its third position is that it brings all of the operating levers of the money counters into operative relation with the operating arms of the money counter magnets. In Fig. 49 but one of the money counter magnets MCM is shown with its operating arm 197 and its roller 199, but it is to be understood that all of the money counter magnets are equipped with such arms, as shown in Fig. 26. All of the money counters shown carry legends such as "Cash", "Total", "Clerk A", etc., to indicate the general class of transactions which they are adapted to register. It is to be remembered that each of the money counters has an operating lever for each denomination of digits up to tens of dollars, that is, one lever 184 for cents, one lever 184¹ for tens of cents, one lever 184² for dollars, and one lever 184³ for tens of dollars. In the third position of the carriage, it is to be understood that the first operating lever 184 of all the money counters has been brought directly under the corresponding money counter magnet armature lever 197, so as to be engaged by its roller 199 when operated. The reason for designating this carriage and its associated apparatus as a combined switching and spacing carriage will now be apparent. It accomplishes important switching functions, as have already been pointed out, and it accomplishes the spacing function just referred to. This spacing function consists in bringing the various operating levers of the money counters into the proper association with the levers of the corresponding money counter magnets at the proper times to receive the impulses employed in transmitting to these money counters the respective cents, tens of cents, dollars and tens of dollars impulses. Another spacing function is that already referred to, in the moving of the recording platen of the printing mechanism into corresponding proper operative relations with the type bars. The difference between the printing spacing and the money counter spacing is that there are six operative positions for the platen in which it may receive an imprint from the type faces, while, in case of the money counters, there are four operative positions, the first two positions of the carriage being such that there will be no operative relation between the money counter magnets and the corresponding money counters, the reason for this being, of course, that in these first two positions there is no money designation involved.

As the money counters are now about to come into play under impulses received from the remote station, it will be well at this point to discuss the arrangement of these with respect to the circuits in the embodiment of my invention as I prefer to use it, but it will be understood that this arrangement is subject to wide modification according to the requirements of any particular business; and that these modifications may be brought about at the will of the user by making very simple changes in the electrical connections.

In the embodiment of my invention which I illustrate in this specification, I divide the money counters into two general classes. Those shown at the left of the combined switching and spacing carriage, as shown in Fig. 49, and numbered from 382 to 385, inclusive, are those which correspond to the different clerks and designated by letters A, B, C and D. Those shown at the right of the combined switching and spacing carriage, and numbered from 386 to 390, inclusive, are those which classify the total amounts of money by the character of the transaction. Thus, counter 387 is the one which shows the running total of all cash received, counter 388 is the one which shows the running total of all charge accounts, and this total should balance with the total of all the charge account slips placed in each of the operators' drawers during the time involved in making up this total. Money counter 389 is the one which shows the running total of all money received on account, and should tally with all the received on account slips in the various drawers. Money counter 390 registers the running total of the amounts paid out, and likewise should register with the "paid out" slips.

Money counter 386, which in Fig. 49 is marked "Total", is the total money counter. This total money counter I prefer to make register the total amount of the charge and cash transactions; that is, the total amount registered on counters 387 and 388. I prefer that the total money counter shall not register the amounts registered on the "received on account" register, because that register is recording transactions that are not strictly current. In other words, they are transactions that have been recorded on previous days and registered previously on charge accounts. If desired, however, the "received on account" total may be carried into the total money counter by obvious changes in the circuit. Obviously the money paid out, as registered on the money counter 390, has no place in the total money counter registration. In many stores the clerks are under no circumstances allowed to pay out money, and where this is the case the money counter 390 for that purpose may be omitted or it may be devoted to some other character of transaction.

I wish it to be understood that I do not limit myself in any way to the classification of transactions, and to the particular utility for each of the money counters which I have herein described, as obviously these may be made to employ any character of transaction and may be arranged so as to throw their totals into the total money counter or not, as may be desired.

The reason why I prefer to make only the registration of cash and charge money counters show in the registration of the total money counter is in order that the manager of an establishment may see at a glance just how much current business has been done at the time when he inspects the counters.

In the clerks' money counters, shown at the left hand end of the combined switching and spacing carriage, I classify the business transactions in a totally different way from that accomplished on the money counters just referred to; that is, instead of classifying by character of transaction, I classify as to the persons who make the transactions. I prefer that each of the clerks' money counters 382 to 385, inclusive, shall show the running total of the cash sales, plus the amounts received on account, plus the amounts of charged sales made by each clerk. It is to be noted that by this certain duplication of registration additional facilities for auditing are afforded. To illustrate, a cash transaction is registered on the cash money counter 387 and also on the total money counter 386. At the same time, it is registered in like amount on the particular one of the clerks' money counters to show that the sale was made by that clerk. In the same way, a charge transaction is registered by the charge money counter 388, by the total money counter, and on the money counter of the clerk making the transaction. The "received on account" transaction is somewhat different. This is registered on the "received on account" money counter 389 and on the counter of the clerk who made the transaction. The running registration on each of the clerks' money counters affords the management at all times an index of the amount of work that each of the clerks is doing.

In conjunction with the money counters an additional check is afforded by the various transaction counters. These also classify the business according to two different classifications; first, as to character of transaction, and, second, as to the clerk who performed the transaction. Instead of counting amounts in money, these count transactions only, and, as is shown, each one of them is operated once for each transaction and is locked up by means of the associated relay so that it cannot again operate until the end of a cycle of a complete registration, that is, until the initiation of another registration. As an example of the utility of these transaction counters, it may be stated that the charge transaction counter registers the total number of charge transactions, and it should tally with the total number of charge slips in all of the clerks' drawers.

It is one of the principal objects of my invention to have my system register and record such information and data as will afford a basis for the most complete possible audit of the business, in any given time. The completeness of this auditing information, and the facility with which the system may be changed to meet different requirements in different businesses, or changed requirements in the same business, is one of the important factors which I accomplish.

I will now describe the operations which follow the movement of the carriage into its third position, under the influence of the third set of impulses sent out from the remote station.

Under the transaction assumed, as before stated, $41.34 is to be recorded. The registration and recording of the cents only will be performed by this third series of impulses. The pressure of the fourth button in the first bank of keys, to record four cents, the final digit in the number to be transmitted, resulted in the pressing together of the four longest springs in the group 78, and the connection of these with the back spring 79, as already described. This resulted in the making alive, by connection with the positive pole of the battery, of the first four contacts in the third group of contact pins 74 in the manner already pointed out in connection with the first and second groups of contacts. The brush 72 in its progression first comes in contact with the pin permanently connected with the wire 301, and thus sends a positive impulse over the wire 300. Immediately after this the brush comes in contact successively with the four pins that are made alive by the action of the fourth key, as just described, and thus sends four more positive impulses over the wire 300. Thus, although we are to record four cents, five impulses are sent. The reason for this is, as before stated, that it is necessary at times to print naught on the recording tape. It requires one impulse to accomplish the printing of naught, and one impulse more to accomplish the printing of one, and so on. It, therefore, requires one more impulse than there are units in the digit to be printed to accomplish the printing of any digit. The sending of these five impulses over the wire 300 results in the operation of the impulse relay IR five times, and this in turn results in the stepping forward of the brush arm of the impulse receiving device five steps, in exactly the same manner and over the same circuits as have already been described in connection with the first and second set of impulses and the first and second operations of the impulse receiving device.

The movement of the brush 101 over its corresponding row of contacts 105 is first to be considered. After passing over the first two contacts 105 in this row, these first two contacts being dead, the brush 101, in passing over the next four succeeding contacts, causes the operation of the adding relay four times. This adding relay is marked AR in the drawings, Fig. 49, and the circuit which causes its operation may be traced from the negative pole of the battery, through the winding of the relay AR, and thence to contacts 105. As the brush 101 makes circuit with each of the contacts 105, except the first two, the circuit may be traced from the negative pole of the battery, through wire 322 to the magnet of the relay AR, thence by wire 392 to row of contacts 105, except the first two which are dead, thence to the brush 101, by wire 393 to the back contact 394 of the release relay RR. These back contacts of this relay are, of course, closed during this operation, since this relay is not energized at the time. Continuing from the back contact of this relay, the circuit may be traced by wire 395 to movable brush 380 on the carriage 121. This brush is now in engagement with the stationary contact plate 381, and from this the circuit continues by wire 342 to the positive pole of the battery.

Each time the brush 101 passes over one of the contacts 105, to which the wire 392 is connected, this circuit just traced is made, and, as the brush, in the operation of the impulse register now under discussion, passes over six of these contacts, two of which are dead and comes to rest between the sixth and seventh, it follows that four such impulses will be sent over this circuit, operating the adding relay AR as many times. It being remembered that the pair of contacts 396 of the cash transaction relay 397, and the pair of contacts 398 of the clerks' relay 399 have already been closed by previous action brought about by the impulse receiving device in the first and second operations thereof, the circuits controlled by the four impulses and consequent operations of the adding relay AR may now be understood. The circuit controlled by this adding relay may be traced from the negative pole of the battery, through wire 347 to the armature lever and front contact of relay AR. From this point the circuit continues by wire 400 to the back contact 401 of the "paid out" transaction relay 402, this relay being deënergized at the time, thence by wire 403 to the forward contact 396 of the transaction counter relay 397, thence by wire 404 to and through the money counter magnet MCM 405, and by wire 406 to movable brush 380, which is now in contact with the stationary plate 381, from which the circuit continues by wire 342 back to the positive pole of the battery. The establishment and dis-establishment of the circuit as just described has resulted in the sending of four impulses through money counter magnet MCM 405, and the cents or first lever 184 of money counter 387 will be operated four times, moving its associated counter wheel forward four steps, showing the numeral "4" through the first of the windows 193.

At the same time as the circuit through MCM 405 was made, other circuits were also established, whereby the amount as registered on the money counter MC 387 of the transaction group will also be registered on the previously selected one of the money counters of the clerks' group, and also on the total money counter 386.

As has been previously stated, the cash and charge transactions are registered on the cash transaction money counter in the transactions group, on a money counter in the clerks' group, and on the total money counter. Had the transaction been a "received on account" one, then only the "received on account" money counter and the clerks' money counter would have been affected; and, again, in the case of a "paid out" transaction, only the "paid out" money counter would have been affected. The arrangement of circuits by which this is accomplished will be described after the present cash transaction has been fully described.

The circuit by which the selected clerk's money counter is operated is as follows: From negative pole of battery, wire 322, to pivot of adding relay AR, front contact, by wire 400 to pair of contacts 401 closed at relay TR 402, by wire 407 to pair of contacts 398 closed at relay RB 399, wire 408 to and through winding of magnet MCM 409, wire 410, wire 395 to movable brush 380, stationary contact 381, wire 342 to positive side of battery.

The circuit by which the total money counter is operated is as follows: from negative battery, wire 322 to pivot of relay AR, front contact of same, wire 400, closed pair of contacts 401 of relay TR 402, wire 403, wire 412 to pair of contacts 413 closed at relay TR 414, wire 415, to and through money counter magnet MCM 417, wire 416 to wire 406 to movable brush 380, stationary contact plate 381 and by wire 342 to positive battery. The closure of the two circuits, as just described, has resulted in the energization four times of magnet MCM 409 and total money counter magnet MCM 417, and the consequent movement of lever 184 of money counter 383 and of the lever 184 of total money counter 386, and the numeral "4" will be shown through the first or cents window of the windows 193 in the money counter cases.

The brush 72 of the impulse transmitter in its continued movement makes contact with the first of the double contacts in this cents group, which same is connected to wire 323, and a circuit is made by which the printing magnet PM 391 is operated. This is over the same circuit which was employed to operate the printing relay PR in the transaction's and clerk's sets of impulses. This circuit is from negative battery, wire 306, wire 252 to collector ring 75, brush arm brush 72, double contact in "cents" groups connected to wire 323, wire 324 to and through winding of printing relay PR, to the positive pole of battery. The relayed circuit is from positive battery, pivot of relay PR, wire 326, brush of impulse receiver 99, which at this time, it will be remembered, is resting on the fifth contact from normal in row 103, then by wire 418 to and through magnet PM 391 to common wire 328, to negative battery. The operation of the magnet PM 391 results in the numeral "4" being printed at the point $x^3$ on the platen, as will be seen from an inspection of the type faces shown in Fig. 50.

The brush 72 of the impulse transmitter in its progression then makes contact with the second double contact of the cents groups of contacts, and a circuit is made which restores the brushes of the impulse receiver to their normal position and also advances the spacing and switching carriage another step, where it will be in position to print the tens of cents value of the purchase, at the point marked $x^4$ on the platen, and it will also bring the money counter levers $184^1$ into operative position in respect to their controlling magnets. This release circuit is from negative battery to collector ring and brush 72 of the impulse transmitter, double contact in tens of cents or fourth group of the contacts 74, which is connected to wire 343, then by wire 344 to and through the winding of release relay RR and to positive battery. The relayed circuit is from positive battery, pivot of relay RR, front contact of this relay, wires 345 and 346 to and through release magnet RM of the impulse receiver and wire 322 to wire 347, to negative battery. The circuit, which is instrumental in stepping the carriage to the next position, is from positive battery, pivot of relay RR, front contact of same, wire 345, wire 348 to and through carriage operating magnet COM to wire 349, to wire 322, to negative battery.

When the brushes of the impulse receiver are returning to normal, it will be noticed that the brush 101 cannot transmit any impulses to the adding relay AR over the top row of contacts 105, and the wire 392, because the circuit over the feed wire 393 to brush 101 is open at the back contacts 394 of release relay RR.

The brush 72 of the impulse transmitter now passes over the fourth or tens of cents group of contacts and makes circuit with the contact pins in this group, which have been made alive through the clerk pressing, in this case, the third key in the second or tens of cents bank of the keyboard. As in the case of the preceding sets of impulses, the brush 72, in passing over the live contacts, in this case four, as the first contact in each group after the transactions group is permanently alive, a circuit is made in the same manner as for the first three groups, whereby four impulses are sent from negative battery over wire 300, through the winding of impulse I relay R, to positive battery. As this circuit has been described previous to this, it will be unnecessary to go into details of it wire by wire. The relayed circuit is also the same as that described in considering the first three groups, and is from the positive pole of battery, through the contacts of the impulse relay, and then through the winding of the impulse receiver operating magnet OM to the negative battery pole. The operation of this relayed circuit results in the four impulses being sent through magnet OM and the consequent stepping of the brushes 99, 100 and 101 to the fourth position from normal. In stepping to this position, the brush 101 of the impulse receiver passes over three connected contacts of the upper row 105, and three impulses are sent through the adding relay AR, which in turn makes a relayed circuit through the transaction money counter magnet MCM 405, the clerk's money counter magnet MCM 409, and through total money counter magnet MCM 417, in exactly the same manner and over the same circuits as over which the cents impulses in the third group were sent. As these circuits were minutely described in connection with the cents set of impulses, it will be unnecessary again to designate them in detail.

The circuit which operates the relay AR is from negative battery, winding of relay, wire 392, row of contacts 105, brush 101, wire 393, contacts 394 on relay RR, wire 395 to brush 380, contact 381 and positive battery. The relayed circuit governing the money counter magnets is from negative battery to pivot and front contact of relay AR, over wire 400 to and through contacts 401 of relay TR 402, where it divides, one circuit running to contacts 398 of clerks' relay 399, and from thence to magnet MCM 409, and to positive battery by way of brush 380 and contact 381. The other branch, after leaving contacts 401 of relay TR 402, is through contacts 396, closed at relay TR 397, to and through magnet MCM 405, to positive battery. This circuit also sends off a branch over wire 412, through contacts 413, closed at relay TR 414, to and through magnet MCM 417, to positive battery by way of brush and contact 380 and 381.

The energization of the money counter magnets, as just described, has resulted in the second or tens of cents counter wheels of clerk B's money counter, cash money counter and total money counter moved forward three steps so that the numeral "3" will show through the second of the windows 193 of the case of all these counters.

The brush 72 of the impulse transmitter, after passing the contacts made live by the pressing of the third key in the second bank passes over the double contact connected to wire 323, and a circuit is made by which the printing relay is operated. This circuit is the same as has already been described in connection with previous printing operations, and it will be unnecessary to describe it further.

The relayed circuit of this relay is from positive battery, pivot and front contact of relay PR, brush 99 of impulse receiver, now resting on its fourth from normal contact in row 103, wire 420, to and through fourth printing magnet PM 421 to negative battery over wire 328. The energization of this printing magnet results in the printing of the numeral "3," as will be seen by an inspection of the drawing shown in Fig. 50.

The brush 72 of the impulse transmitter in its further progression coming in contact with double contact connected to wire 343, a release circuit is again made over wire 344, which release circuit restores the brushes of the impulse receiver to normal, and advances the spacing and switching carriage another step, where the printing mechanism will print the numeral for the proper number of dollars at the point marked $x^5$ on the platen of the printing mechanism. At this position, the previously selected money counters will be in position to receive the impulses which govern the amount of dollars to be registered, as the levers 184² are at this position in operative relation with the controlling magnets MCM. As the above mentioned release circuit has been described fully in connection with the previous groups of impulses, it will be unnecessary to give it any discussion either in this or subsequent operations.

The brush 72 of the impulse transmitter now passes over the series of contacts representing the dollars group, and impulses are again transmitted over wire 300, by which the signal relay is operated the proper number of times as required to give the necessary position of the brushes on the impulse receiver. In this case, the amount to be registered and recorded is, as was before stated, $11.31, so that the digit one, which represents the dollars numeral place, is to be considered. The first key of the third or "dollars" bank has been depressed and this results in the sending of two impulses over wire 300, in the same manner as has already been explained. The impulse receiver brush 101, in moving two steps, passes over one connected contact, and through the action of the adding relay and in the same manner and over the same circuits as described in connection with the tens of cents and cents group, the dollar wheel of the clerk's money counter MCM 409 will be advanced one step, and in like manner the dollar wheels of money counters MCM 405 and total money counter MCM 417 will be advanced one step.

The brush 72 in its further progression makes contact with the first double contact in this group, and a circuit is made over wire 324 by which the printing relay PR is operated. This circuit is the same as that used in the description of preceding groups. This printing relay being energized, a circuit is made whereby the printing mechanism is caused to print the numeral 1. This circuit is from positive battery, pivot and front contact of relay PR, wire 326, to brush 99 of impulse receiver, now resting on the second from normal contact, and by wire 327 to and through the second printing magnet PM, to wire 328 and negative battery. This circuit is the same over which the designation of "cash" was printed in the first set of impulses, but as the printing platen has now been dropped to print lower case, it will be understood that the numeral 1 will be printed instead of the letter A, which was used to designate cash. After the printing impulse, the release impulse will follow, as in the case of the preceding groups. This circuit is the same as has already been described, and is through release magnet RM of the impulse receiver and the operating magnet COM of the spacing and switching carriage. The brushes of the impulse receiver now being restored to normal and the carriage being advanced to a position where the printing mechanism will print at the point marked $x^6$ and the money counters levers being brought to a position where their actuating levers 184³ will be in operative relation with their controlling magnets, the apparatus is in position to receive the final or tens of dollars set of impulses. In this case the key 4 in the fourth or tens of dollars bank was pressed which resulted in making alive four contacts in the tens of dollars group of contacts in the row of contacts 74. In passing over these live contacts and the preceding one connected to wire 301, five impulses are sent over line wire 300, to and through impulse relay IR, the same as for the previous groups. The operation of the impulse relay causes the impulse receiver brushes to advance five steps from normal, and in so doing, brush 101 of the upper row passes over four connected contacts and, as a result, four impulses are transmitted to each of the money counters in the same manner as in the action described in connection with the cents, tens of cents, and dollars groups, the result being that the tens of dollars counter wheels of the money counters above mentioned have been moved to show the numeral 4, and assuming that prior to the operations as described the counter wheels were all at zero, the reading on these wheels will now be $41.34.

After passing over the contacts made alive by the four brushes being pressed against the back spring in the fourth key bank, the brush 72 passes over the printing contact of this group, and a circuit is made as in the other groups, by which the printing mechanism is caused to print the required indication, which in this case is the numeral 4.

The tape of the printing mechanism will now show the following combination of numerals and letters, 4—1—3—4—B—A, which signifies that the amount of the transaction was $41.34, and that it was made by clerk B, and that it was cash, as the letter A is the second letter shown in the upper case (Fig. 50), and corresponds to cash as shown on the second key in the sixth or transaction bank of keys. If the "no sale" key had been pressed instead of cash, the designation N. S. would have been printed instead of A, and in like manner, had the charge key been pressed, the letter B would have been printed, and if "received on account" key, the letter C.

In continuing toward its normal position over the contacts 74, the brush 72 engages with a release contact connected to wire 343, as in the other groups, and a release impulse is sent through the release relay. In turn the release magnet RM of the impulse receiver is energized and the brushes 99, 100 and 101 are restored to normal over the same circuit, as described in previous restorations to normal discussed in connection with the preceding groups.

Simultaneously, as in the case of the release of the impulse receiver after the first, second, third and fourth signal and printing impulses are sent, the spacing and switching carriage operating magnet COM is energized, and it advances the carriage by means of its armature 127 and push rod 128, but before reaching the full extent of its movement a circuit is made, by which the operating pawl 137 and catch or stop pawl 144 are thrown out of engagement with the rack 136, and when this occurs the spacing and switching carriage is returned to its initial or normal position in readiness to be again operated by succeeding manipulations of the keyboard and impulse transmitter. The return to normal of the carriage is accomplished through the action of the magnet CRM (Figs. 28 and 49) acting on the rods 128 and 131 to release the pawls 137 and 144 from engagement with the rack 136, and as these pawls are disengaged, the spring 139, acting on the shaft 140, drum 142 and tape or chain 143 (Fig. 27), which is attached to the plate 121, operates in an obvious manner to bring the carriage to rest against the stop 127¹ (Fig. 18). The circuit which energizes the carriage release magnet CRM may be traced as follows: from positive battery, wire 342, to stationary contacts 421 and 422, which are forced together by the projection 423 attached to the movable carriage, and then by wire 427, to and through carriage release magnet CRM to negative battery. At the same time the above circuit is made another circuit is established, whereby the feed magnet FM of the printing mechanism (Fig. 23) is energized to provide for the paper tape to be moved one space in readiness to receive a subsequent series of characters. This is accomplished by the armature of the magnet FM acting through the pawls 165 and 168 and ratchet 164 to operate the roll 161, the platen 160 and roll 162, through the medium of the gears attached thereto. The circuit through the magnets FM may be traced as follows: from positive battery, wire 342, stationary contacts 421 and 422 forced together by the projection 423 when the carriage approaches the limit of its last movement, to wire 427, to and through printing mechanism feed magnet FM, wire 426, to negative battery. When the carriage, in its last step or movement, approaches the limit of its stroke, the circuits which have up to this time been holding the selected clerk's relay RB 399 in the clerks' group and the relay TR 397 in the transactions group in a locked up position are broken. Their armatures are thus allowed to come to their normal position against their back contacts, breaking the previously closed circuits at their respective pairs of contacts 398 and 396. This unlocking of these relays is accomplished by the brush 356, which controls the clerk's group of relays, running past and breaking circuit with stationary contact 357, and the brush 204, controlling the transactions group of relays TR, running past and breaking circuit with stationary plate 205.

The brush 72 of the impulse transmitter after passing over the release contact pin, as described, makes connection with still another contact before completing its cycle and arriving at its normal position of rest. This contact is shown as 500 in the circle of contacts 74 (Fig. 48), and is connected by wire 311 to and through key restoring magnets 81, wire 302 to positive battery. This circuit results in the momentary energization of the restoring magnets 81 and the armature of the release plate 82 being moved, so that all keys that are depressed are drawn from their locked position in connection with stationary plate 80, and, under the influence of the restoring springs shown at the end of each key post, are restored to their normal or raised positions.

The brush 72 after passing the contact 500 arrives at normal position and is arrested at this point by the end 61¹ of the lever 61 dropping into the notch in the periphery of the disk 49. As this lever 61 drops into the notch, the contacts 60 are allowed to make connection in readiness to complete a circuit through unlocking magnet 19 when keys in the clerks' and transactions banks are pressed, or through restoring magnets 81 when the button 83 is pressed, as when the cash transaction was considered. The spacing and switching carriage is now in its normal position, and before proceeding with a description of the action of the apparatus under a "no sale" transaction, it will be well to give a brief description of the acts performed up to this time and without regard to reference letters and figures.

The transmitter handle having been unlocked through pressing a key in each of the "clerks" and "transactions" banks, and the handle being turned to its extreme and returned to its normal position and locked at that position, the character and amount of the transaction will show through the windows. At the same time the brush of the impulse transmitter will, under the influence of the clock train, which same has been started by the returning to normal of the transmitter handle, commence its revolution over and in contact with the circle of contact pins. These pins are arranged in groups, as has already been described, and the brush passes over these in the following order; the transactions group, clerks group, cents group, tens of cents group, dollars group and tens of dollars group, and back to normal. In passing over the transactions group, circuits were made over the line wires whereby the impulse receiver device was stepped to its second position, and in this position, due to an impulse sent by the impulse transmitter through the printing relay, a transaction relay of the group of transactions relays was selected and locked up, this selection being due to the position at which the impulse receiver brushes were at the time the impulse was sent through the printing relay. At the same time as the selection of a transaction relay took place, a printing magnet was operated whereby the proper character was printed on the tape record. The character printed is determined by the position of the brush of the impulse receiver and the spacing and switching carriage at the time the impulse was sent. The spacing and switching carriage is at its normal position when the transactions impulses are sent, and the printing mechanism is in condition to print in the upper case.

After passing over the contact pin, which circuit energized the printing relay, the impulse transmitter brush passes over the release pin of the first group and a circuit is made which operates the release relay. The relayed circuit of this release relay energizes the release magnet of the impulse receiver and returning its brushes to normal, and at the same time a circuit is made through the operating magnet of the spacing and switching carriage, and by the operation of this magnet the carriage is advanced one step, moving the printing frame and platen with it and also the movable brushes. In moving this first step, the brushes controlling the circuits to the magnets of the transactions group of relays are moved from their contacts and access to the relays comprising this group is denied on all positions of the carriage subsequent to the normal position, but as the circuit which has locked up the selected relay is through a brush that is in circuit until the last movement of the carriage, it follows that the selected relay of this group will remain locked up until the last movement of the carriage. The object of selecting and locking up a relay is to prepare and hold in readiness a circuit over which impulses representing the value of the purchase are to be sent. This latent setting or locking of one of a group of relays is an important feature of my invention. The impulses from the transactions and clerks groups of contact pins are used as pilot impulses and point out and prepare the path for the impulses which indicate value. As these transactions and clerks impulses precede the sets of impulses that indicate value, it follows that the paths prepared must be held in latent control until the time they are intended to be used.

In moving from its normal to first position, the spacing and switching carriage isolates the group of transactions relays, so that no other relay except the one already selected can be operated during a registration, and also brings into circuit brushes and contacts over which a relay of the clerks' group may be selected by impulses sent by the brush of the impulse transmitter passing over the clerks' group of contacts. This is accomplished in the same way as the selection of a relay of the transactions group was made by impulses from the transaction group of contacts, and is governed by the position of the brushes on the contacts of the impulse receiver. In the present case, the brushes of the impulse receiver were stepped to contacts governing clerk B, or second of the group of clerks' relays, and when the printing relay is operated by an impulse through the printing relay at the same time the relay B of the clerks' group is locked up and its contacts prepare a path by which subsequent impulses are registered on clerk B's money counter. At the same time the character B is printed by the printing mechanism.

After passing the printing contact the brush of the impulse transmitter makes circuit with the release contact of this group, and a circuit is made whereby the impulse receiver is again restored to normal and the spacing and switching carriage is advanced another step. In advancing to this position, brushes carried by the spacing and switching carriage are moved out of connection with contacts which control circuits over which one of the group of clerks' relays may be selected, and consequently the group is isolated, as far as further selection is concerned, until a subsequent operation of the remote station apparatus. In moving to this third position, the printing mechanism is automatically adjusted so as to print the succeeding characters in lower case, and, in addition, a brush and contact are brought together by the spacing and switching carriage, by which circuits are made which control the adding relay, which up to this time has been dormant.

As the brush of the impulse transmitter passes over the third or cents group of contacts, impulses are sent according to the value of the cents set up on the keyboard, and impulses are transmitted to the impulse receiver in the same manner as for the transactions and clerks' groups. However, this and subsequent sets of impulses are not used for a selecting function as were the first two sets, but are used to designate or indicate the value of the money counters of the amount as set up or indicated at the remote stations and on registers or counters selected by the first sets of impulses, in this case, the cash money counter in the transactions group and clerk B's money counter in the clerks' group. This is accomplished by the impulse receiver being brought into action at this position of the carriage as an impulse generator and impulses are transmitted so as to act over circuits leading to the proper money counters, and which circuits have been prepared by the locking up of selected relays in the transactions and clerks' groups. In this particular case the number of cents (4) is registered on the clerk's money counter, the cash money counter and the total money counter.

In passing over the remaining contacts in the group, circuits are made whereby the printing relay is energized, as is also the release relay. Upon the energization of the printing relay a circuit is made through the fifth printing magnet and the numeral 4 is printed on the tape. The release impulse which follows the printing impulse advances the carriage to the next position, and in this position the printing mechanism is in position to print the tens of cents value, and the registers or money counters are in a position where the next or tens of cents impulses will move the counter wheels to a corresponding position. The release relay on being operated breaks the circuit through its back contact, and in consequence the impulse generating brush of the signal receiver cannot transmit impulses to the money counter on its return movement to normal.

The brush of the impulse transmitter in its further progression passes over the contacts in the groups of contacts in the tens of cents, dollars, and tens of dollars groups, and impulses are transmitted to the impulse receiver in the same manner as for the cents groups and the corresponding values are printed and registered in their proper order through the movement of the spacing and switching carriage which is advanced one step after each set of impulses. After the last set, or the one representing the tens of dollars value is received, the spacing and switching carriage is returned to normal through the action of its release magnet, and the relays which have been locked up are unlocked and the apparatus is in readiness to receive another set of impulses from the distant station.

In the previous description I have shown the action of the remote and home station apparatus under conditions arising when a cash transaction is involved. A "no sale" transaction will now be described as the action of some parts of the apparatus is somewhat different, in that, in a case of a "no sale" transaction there is no registering of amounts on the money counters, and the only record that is made is through the action of the printing apparatus, which prints characters denoting that the apparatus was operated by a certain clerk and that this clerk was responsible for the operating of the mechanism under these conditions. The "no sale" key is usually operated when it is desired to make change, and when no transaction is involved, and although that being the case, it is yet desirable to make a record of such so that a check may be kept on the number of times each clerk opens his cash drawer. As it is impossible, as has been shown, to open a cash drawer until the impulse transmitter has been unlocked by the pressing of a key in the clerks' bank and in the transactions bank, and the impulse transmitter operated, it follows, therefore, that to open a drawer for the purpose of making change that a clerk will press the "no sale" key and his own key to allow of the operation of the transmitter before he can open his drawer, and in doing this the clerk's designation and a character denoting "no sale" are printed on the tape at the home station. In case of "no sale", the printing mechanism will first print a character designating no sale, which in this case are the letters NS, then will follow the clerk's designation and after that four zeros.

In the case of no sale, none of the money counters will be operated, and the arrangement by which this is effected will be described hereafter.

The clerk who has occasion to make change, or for any other reason other than that of a regular transaction wishes to open his drawer, presses the "no sale" key in the sixth or transaction bank keyboard, as well as his own key in the fifth bank, which we will in this case assume to be clerk A. These keys being depressed, the transmitter is unlocked through the action of transmitter unlocking magnet 19, and over the same circuit as was used in describing the action of the apparatus in the preceding cash transaction. The transmitter being unlocked, the clerk turns the handle 11 to its limit and the cash drawer controlled by clerk A's key will be opened through a circuit through one of the magnets 93, as was described in the former operation. While the transmitter handle is being turned, the several indications which represent a "no sale" will show through the windows 9 and 10 of the case at the remote station. The characters shown will be "no sale" on indicating drum 8, the letter "A" on the clerk's indicating drum marked 7, and the character O on the succeeding drums marked 6, 5, 4, and 3. It will be remembered here that no keys in the cents, tens of cents, dollars and tens of dollars banks have been pressed, and consequently no stop fingers in the banks of stop fingers will be placed in position to stop the revolution of an indicating drum, but will occupy the position as shown in Fig. 6. The stop fingers of the transactions bank and the clerk's bank have, however, been raised to an operative position through the manipulation of the keys, as mentioned, and the turning of the handle, and they will occupy the position as shown in Fig. 8. In this position they are in position to arrest the movement of their respective indicating drums as the handle 11 of the transmitter is turned. As the indicating drums revolve under the frictional connection with the shaft 33, the longest of the series of pins in the side of the two drums marked 8 and 7 engage with the stop fingers, and the drums are brought to rest with the designation "No sale" showing through the first window, and the designation "A" showing through the second window. As was stated previously no stop fingers were raised in the rest of the banks, consequently there will be no arresting of the movement of the drums, and they will make a half revolution or until they come to rest with the projection 43 against the stop 44, and at this position they will show the designation 0 through the tens of dollars, dollars, tens of cents and cents windows.

It may be stated here that the indications remain set until the next manipulation of the handle 11 of the impulse transmitter, and that as soon as the transmitter handle is moved far enough, the point $26^1$ of the cam plate 6 (Fig. 5) throws the dog out of engagement with the notch in the edge of the disk or shroud 28, and the indicating drums on the shaft 33 are, under the influence of the spring 32, revolved to a position whereby the stops 43 in the drums strike against the projections $44^1$. In this position they are in position to be revolved in an opposite direction by the further movement of the handle 11 of the impulse transmitter, and through their frictional engagement with the shaft 33 and will revolve until the stop 43 strikes projection 44, unless stopped before reaching this projection by a set finger lever engaging with its particular stop pin on the side of the drum. The indications being given, as above stated, the handle 11 is allowed to return to normal and it is here locked by the lock lever 20 dropping into the notch in the disk 21, where it will remain until again withdrawn by the action of magnet 19 (Fig. 5), being energized by the subsequent operation of a key in each of the fifth and sixth banks of the keyboard.

When the handle 11 is returned to normal position, the clock train, which is instrumental in moving the brush 72, is started through the action of lever 70, as previously described. In pressing the "no sale" key and clerk A's key, the first or longest contacts of the fifth and sixth contact banks 78 were pressed against the back springs 79, and this results in the making alive of the contact pin in row of contacts 74 which is connected to wire 313 in the first group, and also of the contact pin which is connected to wire 358 in the second group.

The brush 72, in passing over the contact pins connected to the sixth bank of contacts 78, finds but one of these contacts alive, and as it passes over this contact a single impulse is sent over wire 300 and through impulse relay IR, the same way in which the impulses were sent when the cash transaction was described. As the circuits from the impulse transmitter to the home station are practically the same as described in the former transaction, it will be unnecessary to go into details regarding them. The impulse relay IR being energized, a circuit is made whereby the operating magnet OM is operated. This circuit is from positive battery, pivot and front contact of relay IR, to and through magnet OM of the impulse receiver to negative battery. This circuit causes the brushes 99, 100 and 101 of the impulse receiver to be moved forward one step.

The brush 72 of the impulse transmitter in its further travel makes contact with the contact connected to wire 323, and a circuit is made and the printing relay PR is operated. This circuit is the same as heretofore described in connection with the previous transaction, and is from negative battery, brush 72, wires 323 and 324, to and through relay PR, to positive battery. The relayed circuit of relay PR is from positive battery, front contact, wire 326, brush of impulse receiver 99, now resting on first from normal contact, row 103, wire 430, to and through printing magnet PM 431, to common wire 328, and to negative battery. As the platen of the printing mechanism at the normal position of the spacing and switching carriage is in its elevated position, the operation of magnet PM 431 will print upper case, which in this instance is the characters NS (Fig. 50).

At the same time the above circuit was made, another circuit was made through the front contacts of relay PR, by which the "no sale" relay NSR is operated. The function of this "no sale" relay is to prevent access to all relays both in the transactions and clerks' groups when the apparatus is operated for "no sale". As will be described, this relay prevents the locking up of any relay in either of the above mentioned groups and prevents the consequent energization of any of the magnets which govern the transaction counters TC, or clerks counters CC.

It will be remembered that a transaction counter is operated simultaneously with the locking up of a relay and over the same circuit, hence it obtains that if one of the clerk's relays be allowed to be energized a consequent energization of the associated transaction counter would result and the clerk operating the apparatus would, in case of "no sale", be credited with a transaction which he was not entitled to. The operation of this "no sale" relay ruptures the feed circuit to brush 100, over which the relays are in every instance locked up.

The energizing circuit of this relay NSR is from negative battery, wire 322 to front contacts of relay PR, wire 329, movable brush 330 on spacing and switching carriage (normal position) stationary contact 331, brush 432, wire 333, brush 100 of impulse receiver now on first contact from normal, wire 434, to and through winding of relays NSR, wire 435, to brush 204 on spacing and switching carriage, stationary contact 205, to positive battery. This circuit energizes the magnet of relay NSR and its armature lever is brought against its front contact, where it remains until brush 204 in the progression of the carriage and at its last step moves from the stationary contact plate 205. The circuit by which relay NSR is locked is from positive battery, stationary contact plate 205, brush 204, wire 435, winding of relay NSR, wire 436, armature lever of relay, front contact, wire 349 to negative battery.

The spacing and switching carriage in its next step, which is caused by the brush 72 passing over the release contact connected to wire 343, energizing release relay RR as previously described, moved the brush 432, which is connected to wire 433, out of connection with stationary contact plate 331. It follows that the brush 100 will be cut out of all connection on this first and succeeding steps of the carriage as the wire 332, which is connected to contact plate 331, is disconnected from the brush 100 at the back contact of relay NSR as first described. If this feed wire to brush 100 is not disconnected on the second position of the carriage, the result of the printing relay being operated immediately after the second set of selecting impulses would result in a clerk's relay being locked up over one of the wires 334, 363, 436 or 437, and a consequent operation of a transaction counter associated with these relays. The brush 72 now passes over the clerks' group of contacts in the row 74, and two impulses are sent over the wire 300, to and through impulse relay IR. One of these impulses results from the brush 72 passing over the contact pin connected permanently to line 301, and the other from passing over the first pin connected to the contact bank 78 and made alive by the operation of clerk's key A.

Two impulses being given to impulse relay IR, as above described, the operating magnet OM of the impulse receiver receives a corresponding two impulses, and the brushes 99, 100 and 101 are moved to a position two steps from normal. This operating circuit through operating magnet OM is the same as described in other movements of the brushes of the impulse receiver.

The brush 72 of the impulse transmitter passes over the remainder of the contacts in the clerks' group and arrives at the printing contact connected to wire 323, and a circuit is made over wire 324, whereby the relay PR is energized. A relayed circuit operates a printing magnet PM over the following circuit: from positive battery, pivot and front contact of relay PR, wire 326, brush 99 of the impulse receiver, which is now resting on second contact from normal, wire 327, to and through the second printing magnet to common wire 328, to negative battery. This circuit energizes the printing magnet and the character A is printed, as will be seen from an inspection of Fig. 50.

described operations of the apparatus in considering a cash transaction, that at this time a clerk's relay of the clerks' group was locked up, so as to prepare a path to the clerk's money counter and also to operate the clerk's transaction counter. This circuit was from negative battery, to a front contact of printing relay PR, to movable brush 330, stationary contact 331, wire 332, back contact of relay NSR, to brush 100 of impulse receiver, to a contact on which the brush was resting, to and through one of the magnets in the clerks' group of relays, to movable brush 356 and contact 357.

In the present case, although the relay PR is operated as in the above described circuit, the clerk A's relay RA is not locked up over the wire 334 as would be the case if the transaction was a cash one, and this for the reason that at this second position of the spacing and switching carriage the wire 333, connected to movable brush 432, has been moved out of connection with contact 331, and the circuit over wire 332 has been opened at the back contact of "no sale" relay NSR through the operation of the printing relay in the first position of the spacing carriage. Hence it follows that a circuit to brush 100 cannot be made under the conditions described, and consequently a circuit to clerk A's relay over wire 334 will not be complete and its attendant transaction counter will not be affected.

Mention was made in describing a cash transaction, that the clerks' group of contacts on the impulse transmitter contained, in addition to the contacts connected to the contact springs in bank 78, an additional contact, which same is permanently connected to wire 301. The reason for this extra contact being supplied in this group is to provide for the brushes of the impulse receiver, when stepping under the influence of impulses from the clerk's group of contacts, to never be able to stop on the first or "no sale" row of contacts of the impulse receiver. Thus, if clerk A's key, which is the first of the bank, is pressed, the impulse receiver brushes must advance two steps and the printing mechanism print the character A; whereas if this extra contact were not used the brush of the impulse receiver would advance but one step or to the "no sale" position, and the character NS, as for no sale, would be printed.

The brush 72 in its forward progress now makes circuit through the release relay, as described in previous operations, and the impulse receiver brushes are restored to normal, the spacing and switching carriage advanced one step, and the platen of the printing apparatus dropped to print lower case.

The brush 72 in its further movement in completing its cycle passes over the cents, tens of cents, dollars and tens of dollars groups of contacts, and as it passes each group, three impulses are sent from each group, a selecting impulse, a printing impulse and a release impulse, the first of these as the brush passes contacts in each group connected to wire 301; the second to contacts connected to wire 323, and the third to contacts connected to wire 343. In passing over these contacts in the different groups, a circuit is first made through the impulse relay over wire 301 and 300, and energizing the impulse relay which results in the moving of the brushes of the impulse receiver one step. The printing relay then being energized, printing magnet PM 431 is energized and the character 0 is printed over circuits that have been previously described. This same action follows for the succeeding groups of tens of cents, dollars and tens of dollars, and upon the release impulse in the dollars group being sent, the spacing and switching carriage is returned to normal and the platen of the printing mechanism is raised to upper case in the same manner as for the cash transaction. The record that will appear on the tape in this case of no sale will read as follows: 0—0—0—0—A—NS.

The brush in its further movement restores the depressed keys in the same manner as before described, by a circuit including contact 500 and restoring magnet 81. It will be noted that in this case of a no sale transaction that the adding relay AR has not been brought into use, as the brush 101 of the impulse receiver in making its single step on the third, fourth, fifth and sixth movements does not reach the bank of contacts of the impulse receiver which is connected to wire 392.

It has been mentioned in the previous description that the amounts of cash and charge transactions are registered on their respective counters and also on the counter of the clerk making the transaction and on the total money counter. It has also been stated that the received on account transactions are recorded on the received on account money counter and on the clerk's counter, but not on the total money counter, and also that "paid out" transactions are recorded only on the "paid out" counter.

It will be unnecessary to give any description of the action of a "charge" transaction, as it is the same as that of cash, except that it is recorded on the "charge" money counter by the selection of a "charge" relay in the transactions group by the first set of impulses.

I will now describe the action of the apparatus when operated in case of a "received on account" and a "paid out" transaction. In doing this it will be unnecessary to refer to the different parts and circuits which have been described previously, except in a general way.

In the case of a "received on account" transaction, the fourth key of the sixth bank would be pressed (Fig. 3), and four impulses would be transmitted to the impulse relay, which would in turn step the brushes of the impulse receiver four steps. On this position a circuit is made over a wire 436 connected to fourth contact from normal in row 104 of the impulse receiver, whereby relay TR 414 of the transactions group is energized and locked up. The circuit which energizes this relay is the same in detail as that used to select and lock up cash relay TR 397 and will need no further description. When this relay TR 414 is operated, this circuit over wire 412 is broken at the back contacts 413 and the total money counter magnet MCM 417, which is operated over wire 412, is cut out during the time this relay TR 414 is locked up. It is, therefore, impossible for the set of impulses which follow and which designate value, to be registered on the total money counter, and they are, therefore, registered on the clerk's and "received on account" money counters only.

In the case of a "paid out" transaction, the action is again different in that the clerk's money counter magnets, as well as the total money counter magnets, must not be energized. This is accomplished by cutting out the circuit wires to all clerks' money counter magnets, as well as the circuit to the total money counter magnet. This is done at the back contacts 401 of the "paid out" relay 402. In the case of a "paid out" transaction five impulses would be sent by the impulse transmitter and the brushes of the impulse receiver would be stepped forward five steps and its brush 100 would rest on a contact connected to wire 437, and upon the operation of the printing relay a circuit will be made over this wire, including movable brush 354 and stationary contact plate 355, whereby "paid out" relay 402 is operated and its armature lever brought against its front contact and locked in this position. This circuit is the same, except as to the position of the brush of the impulse receiver, as was used to select the "cash" relay 397, and requires no detailed description.

The relay 402 being energized and locked up, as has been previously described in connection with other relays in this group, causes the back contacts 401 to be separated, and when this is accomplished the relayed circuit from the adding relay is broken and no impulses can be transmitted to any money counter magnet of the clerks' group or to the total money counter magnet 417. This is accomplished by the circuit from the front contact of adding relay AR being opened at the contacts 401, and there can be no circuit through wire 407, over which the counting impulses to clerks' money counters must go, and in addition the circuit over wire 412 and 415, over which the total money counter magnet 417 is energized, is broken at these contacts 401. It is to be noted, however, that the subsequent sets of impulses will be operative on the "paid out" money counter 390, as the circuit from the adding relay AR to the magnet MCM 438 has not been broken at contacts 401, owing to the branch to one of the front contacts of relay 402 and shown at 439. The circuit over which the subsequent series of impulses pass to the money counter magnet MCM 438 may be traced as follows: from negative battery, pivot and front contact of adding relay AR, wire 400 to branch wire 439 (relay 402 now being energized), wire 440, to and through money counter magnet MCM 438 to wire 406, to movable brush 380, which when the impulses designating value are being transmitted is in connection with plate 381, and from there to positive battery. The action just described results in the money counter wheels controlled by the magnet MCM 438 being moved to their proper positions. The further action of the apparatus is the same as was described in the operation covering a cash transaction.

I do not wish to be confined to the exact details of the system herein disclosed, as, obviously, many changes may be made in the apparatus, the circuits and in the method of operation without departing from the spirit of my invention. While I refer to the system, as a whole, as a cash register, it is obviously capable of performing other functions than the mere registration of cash transactions, since, in the particular embodiment of my invention which I have described in detail, it is capable of not only registering such transactions, but of recording, classifying and computing them. Obviously, also, the system is adapted for the registration, recording, classification and computation of other types of transactions than those involving money values. Clearly, the designations on the keys and registers and computing apparatus might be arranged to read in properly subdivided time units or properly subdivided weight units. Or, again, they may be so arranged as to register, record and compute in the ordinary decimal system of enumeration without regard to the particular kind of thing that is being counted.

Having thus described my invention, what I claim as new, and desire to secure by United States Letters Patent is:

1. In a system of registers having remote control, the combination of a mechanism located at a remote station for designating the characteristics of a transaction; an impulse generating means at the remote station, a plurality of registering devices located at a home station; electromagnets for causing the operation of said registering apparatus; adjustable means at the home station under the control of said impulse means for selecting the electromagnet to be operated, a plurality of circuits connecting the remote and home stations, and a source of current common to all said circuits for causing the operation of said registering apparatus under the control of said designating apparatus.

2. In a system of registers, the combination of a designating apparatus at a remote station; indicating apparatus at said remote station adapted to indicate the designations of said designating apparatus; means at said remote station, under the control of said designating apparatus, for generating electrical impulses; a home station having a plurality of registering devices selectively operable; means at the home station for recording, under the control of said impulses, the designation and indication of the apparatus at said remote station, and means at the home station also under control of said impulse means for selecting the registering devices for operation.

3. In a system of registers, the combination of a designating apparatus at a remote station; indicating apparatus at said remote station adapted to respond to said designating apparatus; means at said remote station, under the control of the designating apparatus, for generating electrical impulses, a home station having a plurality of registering devices selectively operable; means at a home station for recording and indicating under the control of said impulses, the designation and indication of the apparatus at said remote station, and means at the home station also under control of said impulse means for selecting the registering devices for operation.

4. In a system of cash registers having remote control, registering apparatus at a remote station; a manually operated keyboard mechanically controlling said registering apparatus to indicate the characteristics of a transaction; electrical apparatus at the remote station, under the control of said keyboard, for generating impulses according to the characteristics shown by said registering apparatus, a plurality of registering devices at a home station, and means under control of said impulses, for selectively operating said registering devices according to the characteristics shown by said remote indicating apparatus.

5. In a system of cash registers having remote control, indicating apparatus at a remote station; a manually operated keyboard at said remote station controlling said indicating apparatus to indicate the characteristics of a transaction; electrical apparatus at the remote station, under the control of said keyboard, for generating impulses according to the characteristics shown by said indicating apparatus; and a plurality of recording devices at a home station adapted, under control of said impulses, selectively to record the characteristics shown by said remote indicating apparatus.

6. In a system of cash registers having remote control, indicating apparatus at a remote station; a manually operated keyboard mechanically controlling said indicating apparatus to indicate the characteristics of a transaction; electrical apparatus at the remote station, under control of said keyboard, for generating impulses according to the characteristics shown by said indicating apparatus, and a plurality of registering devices and a recording apparatus at a home station adapted, under control of said impulses, selectively to register and record the characteristics shown by said remote indicating apparatus.

7. In a system of cash registers, the combination of an impulse transmitter located at a remote station; an indicating device and a series of totalizing devices at said remote station; an impulse receiving device at a home station, and electrical means, under control of the impulse receiving device, for selectively operating said totalizing devices to register the indication shown at said remote station.

8. In a system of cash registers, the combination of an impulse transmitter located at a remote station; an indicating device at said remote station associated with said transmitter; a home station, a plurality of totalizers located at the home station; an impulse receiving device at the home station controlled by the impulses from said transmitter, and means, under the control of the impulse receiving device, for selectively operating said totalizing devices to register and record, the indication at said remote station.

9. In a system of cash registers, the combination of means at a remote station for designating the amount and kind of a transaction and the identification of the operator making it; an indicating device at said remote station for indicating said amount, a home station, a plurality of counters at the home station; means at the home station for registering on certain of said counters and recording said amount and character of the transaction and the identification of said operator, and impulse means at the remote station for controlling the selection of the counters to be operated.

10. In a system of cash registers, the combination of means at a remote station for designating the amount and kind of a transaction and the identification of the operator making it; an indicating device at said remote station for registering said amount; a home station, a plurality of counters at the home station, means at the home station for registering on certain of said counters and recording said amount and character of the transaction and the identification of the operator, impulse means at the remote station for controlling the selection of the counters to be operated, and means at said home station for showing the summation of a succession of said amounts.

11. In a system of cash registers with remote control, the combination of apparatus at a distant station for indicating the value of a purchase; an impulse transmitter at said distant station adapted to produce electrical impulses in series or sets corresponding, respectively, to the digits representing said value, a plurality of registering devices at a home station adapted to register the value indicated at said distant station as transmitted by said sets of impulses, and means at the home station under control of the impulse transmitter to select said registering devices for operation.

12. In a system of cash registers with remote control, the combination of apparatus at a distant station adapted to indicate the value and other characteristics of a transaction; an impulse transmitter at said distant station adapted to produce electrical impulses in series or sets corresponding, respectively, to the digits and other characters representing the characteristics of said transaction, a plurality of registering devices at a home station adapted to be actuated according to the characteristics indicated at said distant station under the control of said sets of impulses, and means under control of certain of said sets of impulses for selecting the registering device to be operated.

13. In a system of cash registers with remote control, the combination of an indicating device at a remote station; printing devices and a plurality of selectively operable registering devices at a home station; electrical circuits connecting the remote and home stations, and means for transmitting electrical impulses over said circuits, whereby the printing devices at said home station are operated to correspond with the indications shown on the remote indicating device, and the registering devices are selected according to the said indications.

14. In a cash register system, the combination of an impulse transmitter located at a remote station and adapted to transmit impulses in series or sets; an impulse receiving device at a home station responsive to a predetermined number of impulses in each series or sets; releasing means for said impulse receiving device; a printing device at said home station; said releasing means and said printing device being also responsive to certain other impulses in each of said sets, said printing and releasing devices being energized after the response of the impulse receiving device to each of its actuating series of impulses.

15. In a cash register system, the combination of a keyboard; an impulse transmitter located at a remote station and adapted to transmit impulses in series or sets as determined by said keyboard; an impulse receiving device at a home station; an actuating and a releasing magnet for said impulse receiving device; a printing device at said home station, and an actuating magnet therefor; electrical conductors connecting said remote and home stations, and means within said impulse transmitting device for causing some of the impulses in each set to energize the actuating magnet of said impulse receiving device and for causing the succeeding impulses in each set to energize the printing and the release magnets, respectively.

16. In a cash register system, an impulse transmitter located at a remote station and adapted to transmit impulses in series or sets corresponding, respectively, in number to the digits or characters to be registered; a register at a home station; an impulse receiving device at the home station; electrical connections between said stations, and means for causing said impulse receiving device to respond to some of the impulses in each set, and means for causing a succeeding impulse in each set to release said impulse receiving device, whereby said impulse receiving device is first actuated and then returned to normal by each series of impulses.

17. In a cash register system, the combination of an impulse transmitter located at a distant station and adapted to transmit impulses in series or sets; an impulse receiver at a home station adapted to be moved successively to positions corresponding to the number of impulses in the respective sets; a printing device; a printing circuit therefor energized after each set or series of impulses, and a release circuit for said impulse receiver energized after the energization of said printing circuit.

18. In a cash register system, the combination of an impulse transmitter located at a distant station and adapted to transmit impulses in series or sets; an impulse receiver at a home station adapted to be moved successively to positions corresponding to the number of impulses in the respective sets; a printing device having a plurality of printing elements; circuits whereby the position of the impulse receiver will determine the printing element to be actuated; an actuating circuit for said printing device, closed after each series or set of impulses, and a release circuit for said impulse receiver, closed after the closure of said printing circuit.

19. In a cash register system with remote control, an impulse transmitter located at a distant station; a plurality of registering devices located at a home station, and means for automatically picking out and isolating a particular one of said registering devices to receive a registration by the impulses from said impulse transmitter.

20. In a cash register system with remote control, a controlling mechanism located at a distant station; a plurality of registering devices at the home station under the control of the distant controlling mechanism, and means under control of said controlling mechanism for selecting and isolating certain of the registering devices at will to make them responsive to said controlling mechanism for operation.

21. In a cash register system with remote control, a controlling mechanism located at a distant station; a printing device at a home station under control of the distant controlling mechanism; a plurality of registering devices at the home station, and means controlled by said controlling mechanism for segregating certain of said registering devices to make them alone responsive to said controlling device.

22. In a cash register system, an impulse transmitter adapted to transmit impulses in series or sets; an impulse receiving apparatus movable in response to said impulses; a printing apparatus having a plurality of printing elements; a step-by-step mechanism for determining the spacing of the imprints of said elements; registering devices controlled by said impulse receiving apparatus; means whereby the amount of movement of said impulse receiving apparatus determines the selection of the printing elements, and means for advancing the step-by-step mechanism between each set of impulses.

23. In a system of cash registers with remote control, an impulse transmitter located at a distant station; an impulse receiver at a home station; electrical circuits connecting said transmitter and receiver, said impulse receiver being adapted to be moved step-by-step by the impulses of said impulse transmitter over said circuits, and printing and registering devices at the home station adapted to be selected and operated through the action of said impulse receiver.

24. In a cash register system, an impulse transmitter at a remote station; a movable carriage at a home station controlled by said impulse transmitter; a registering device associated with said carriage, a plurality of number wheels for said registering device; an impulse receiver controlled by said transmitter; means whereby the position of said carriage determines the number wheel that is to be operated, and means whereby the position of said impulse receiver determines the amount by which said number wheel is to be advanced.

25. In a cash register system, an impulse transmitter; an impulse receiving device operated by impulses from said transmitter; registering devices operated by impulses sent out by said impulse receiving device, and means whereby said impulse receiving device sends out a less number of impulses than those sent out by said impulse transmitter.

26. In a system of cash registers, the combination of an impulse transmitter and an impulse receiver; printing and registering apparatus under control of the impulse receiver, and a progressive contact maker adapted to control the sequence of operations of said printing and registering apparatus.

27. In a system of cash registers, registering devices arranged in groups at a home station; means under the control of a distant station for selecting one of each group, and means at said home station for isolating and guarding the selected ones from interference.

28. In a cash register system, an impulse transmitter adapted to transmit impulses in series or sets; a circuit changing carriage; groups of registering devices; an impulse receiver, and means controlled by said carriage for bringing said registering devices successively under the control of said impulse receiver.

29. In a system of cash registers, registering devices at a home station arranged in groups, said groups being adapted to register according to different classifications of transactions; means under the control of a distant station for selecting particular ones of each group of registers, and means at said home station for isolating and guarding said selected ones from interference.

30. In a system of cash registers, registering devices arranged in groups at a home station; means under control of a distant station for selecting one of each group; means at said home station for isolating and guarding the selected ones from interference, and means for operating said selected registers to indicate an amount as determined at said distant station.

31. In a system of cash registers, an impulse transmitter; a keyboard controlling the operation of said impulse transmitter, and a frictionally operating indicating device, the operation of which is dependent upon the operation of said impulse transmitter.

32. In a system of cash registers, an impulse transmitter; a keyboard for determining the impulses to be sent by said transmitter; a mechanically operated indicating device, the indications of which are controlled by said keyboard and the actuation of which is controlled by said impulse transmitter.

33. In a system of cash registers, an impulse transmitter; a keyboard for determining the impluses to be sent by said transmitter; a mechanically operated indicating device, and a distant register responsive to the impulses from said transmitter, said mechanically operated indicating device being actuated by said impulse transmitter, but controlled in its indications by said keyboard.

34. In a system of cash registers, an impulse transmitter; a keyboard for determining the impulses to be sent by said transmitter; a distant registering and printing apparatus responsive to the impulses from said transmitter, and a mechanically operated indicating device actuated by said impulse transmitter, but controlled in its indications by said keyboard.

35. In a system of cash registers, the combination of a keyboard; an impulse transmitter; a plurality of cash drawers; and means for normally locking said cash drawers, and means for unlocking a drawer through the operation of said keyboard, said means including a circuit completed by the action of said impulse transmitter.

36. In a system of cash registers, the combination of a keyboard; an impulse transmitter; a plurality of cash drawers; means for normally locking said cash drawers, including a plurality of unlocking circuits, one for each of said drawers; means controlled by said keyboard for selecting the unlocking circuit to be closed, and means controlled by said impulse transmitter for finally closing said circuit.

37. In a system of cash registers, a keyboard; an impulse transmitter controlled thereby, and a normally locked cash drawer, and means for unlocking said cash drawer controlled by the manipulation of said impulse transmitter.

38. In a system of cash registers, a keyboard; an impulse transmitter; a normally locked cash drawer, and means for unlocking said cash drawer, said means including a circuit prepared by the operation of said keyboard, and finally closed by the manipulation of said impulse transmitter.

39. In a cash register, the combination of a keyboard, a normally locked impulse transmitter and a register; means operated by said keyboard for controlling the setting of said register; means operated by said keyboard for unlocking said impulse transmitter, and means for causing said registers to indicate upon the operation of said impulse transmitter.

40. In a cash register system with remote control, the combination of cash drawers normally locked; a keyboard adapted upon its final operation to prepare for the automatic opening of said drawers; an impulse transmitter adapted to transmit impulses to a distant station; registering and recording apparatus at said distant station responsive to said impulses, and means for opening one of said drawers upon the operation of said impulse transmitter.

41. In a cash register system with remote control, the combination of cash drawers normally locked; a keyboard adapted upon its final operation to select one of said cash drawers and prepare for its opening; an impulse transmitter controlled by said keyboard adapted to transmit impulses to a distant station; registering and recording apparatus at said distant station responsive to said impulses, and means for opening the selected drawer upon the operation of said impulse transmitter.

42. In a system of cash registers, designating devices located at the remote stations; a transmitting device under the control of said designating devices for sending impulses to a home station; registering and printing apparatus located at said home station; circuit wires connecting said remote stations with said home station, and a common source of energy for all said circuit wires for the control of said printing and registering devices from said remote stations.

43. In a system of cash registers, designating devices located at the remote station; a transmitting device at said remote station under the control of said designating devices for sending impulses to a home station; registering and printing apparatus located at said home station; electrical circuits connecting said remote station with said home station; other circuits local to said home station, and a common source of current for supplying all said circuits.

44. In a system of cash registers, designating devices located at a remote station; a transmitting device under control of said designating devices for sending impulses to a home station; a cash drawer at said remote station; electrical circuits controlling the opening of said cash drawer; registering and printing apparatus located at said home station; electrical circuits connecting said remote station with said home station, and a common source of energy for all said circuits.

45. In a cash register system, a transmitter adapted to transmit impulses; a movable carriage adapted to be moved by said impulses; a register associated with said carriage; a plurality of digit levers for said register; an impulse receiving device controlled by said impulses, and means actuated by the movement of the carriage for bringing said digit levers successively under the control of said impulse receiving device.

46. In a system of cash registers, the combination of means at a remote station for designating the amount and kind of a transaction and the identification of the operator making it; an indicating device at said remote station for indicating said amount; means at a home station for registering and recording said amount and the character of the transaction and the identification of said operator, and means at said home station for summing up the recorded amounts under their several classifications.

47. In a cash register system, the combination of means at a remote station for designating the amounts of successive transactions and the identification of the operator involved in each, and means at a home station controlled by said designating apparatus for classifying said designated amounts according to the operators making them.

48. In a cash register system, the combination of means at a remote station for designating the amounts of successive transactions and the identification of the operator involved in each; means at a home station controlled by said designating apparatus for classifying said designated amounts according to the operators making them, and means at said home station for summing up said amounts under each of said classifications.

49. In a cash register system, the combination of means for designating the amounts of successive transactions and the identification of the operator involved in each, and means at a distant station, electrically controlled by said designating apparatus, for classifying said designated amounts according to the operators making them.

50. In a registering and computing system, the combination of means for designating the respective amounts of successive transactions and the identification of the operator involved in each; means at a distant station, electrically controlled by said designating apparatus, for registering said designated amounts classified according to the operators involved, and means for maintaining a running total of each set of amounts so classified.

51. In a registering and computing system, the combination of means for designating the respective amounts of successive transactions and for the identification of the operator involved in each; means at a distant station, electrically controlled by said designating apparatus, for registering said designated amounts classified according to the operators involved; means for maintaining a running total of each of said amounts so classified, and means for automatically registering the sum of said classified totals.

52. In a registering and computing system, the combination of means for designating the respective amounts of successive transactions and for designating their classification as to kind; means at a distant station, electrically controlled by said designating apparatus, for registering said designated amounts classified according to kind; means for maintaining a running total of each set of amounts so classified, and means for automatically registering the sum of said classified totals.

53. In a registering and computing system, a keyboard for setting up the respective amounts of successive transactions and for identifying the operator involved in each; means at a distant station, electrically controlled by the setting of said keyboard, for printing the corresponding amounts and the identification of the operator involved; means at said distant station controlled from said keyboard for designating said amounts classified according to the operator involved, and means for maintaining a running total of each set of amounts so classified.

54. In a registering and computing system, a keyboard for setting up the respective amounts of successive transactions and for designating their classification as to kind; means at a distant station, electrically controlled by the setting of said keyboard, for printing each corresponding amount and its identification as to kind; means at said distant station for registering said amounts classified according to kind, and means for maintaining a running total of each set of amounts so classified.

55. In a machine of the class described, the combination with a plurality of manipulative devices, of circuit making devices controlled thereby, a distant accounting device and connections whereby the manipulative devices close a number of circuits of the circuit making devices corresponding to the value of the manipulative device operated.

56. In a machine of the class described, the combination with a plurality of keys, of a distant accounting device and circuit making contacts controlling said accounting device with connections whereby each key closes a number of said circuits proportional to the value of the key.

57. In a machine of the class described, the combination with a bank of keys and a locking plate therefor, of a magnet serving when energized to release said locking plate, a release key and a circuit therefor including said magnet whereby the operated keys may be released by depression of the release key.

58. In a machine of the class described, the combination with the remote station having manipulative devices as an element thereof, of a transmitter controlled by said manipulative devices, a home station including totalizing mechanisms arranged for the classification of entries according to two different types, connections whereby the transmitter controls the entry to be made on said totalizers, and connections whereby one totalizer of each of the groups is controlled for operation by the transmitter.

59. In a machine of the class described, the combination with a remote station including a plurality of manipulative devices, of a home station including totalizers for two different classes of transactions, a transmitter at the remote station and controlled by said manipulative devices, a receiver at the home station controlled from the transmitter, and connections whereby said receiver successively renders one totalizer in each of the groups in operative condition at each operation of the machine.

60. In a machine of the class described, the combination with a plurality of manipulative devices and circuits controlled thereby, of accounting mechanisms having their operation determined by said circuits, a no sale key, and connections whereby the no sale key when operated prevents the energizing of said circuits.

61. In a machine of the class described, the combination with a plurality of keys and circuits controlled thereby, of totalizers for accounting for transactions indicated on the keys, circuits controlled by said keys serving to determine the operation of said accounting devices, a no sale key, and a relay controlled by said key and serving to break the circuit connections thereby preventing operation of the accounting devices when the no sale key is operated.

62. In a system of the class described, the combination with a home station and a remote station, of an impulse generator at the remote station, a series of totalizers at the home station, and means controlled by said impulse generator for selecting said totalizers for operation.

63. In a system of the class described, the combination with a home station and a remote station, of an impulse generator at the remote station, a plurality of series of totalizers at the home station, and means controlled by said impulse generator for selecting totalizers of each series for simultaneous actuation.

64. In a system of the class described, the combination with a home station and a remote station of a plurality of series of keys of different classes at the remote station, an impulse generator common to and under the control of all of said keys at the remote station, a plurality of series of totalizers at the home station corresponding to certain of said classes of keys, and means controlled by said impulse generator for selecting totalizers of each series for simultaneous actuation.

65. In a system of the class described, the combination with a home station and a remote station of an impulse generator at the remote station, a series of totalizers at the home station, and means controlled by said impulse generator for selecting said totalizers for operation whereby the selected totalizers will be actuated under the control of said impulse generator.

66. In a system of the class described, the combination with a home station and a remote station, of a series of totalizers at the home station and an impulse generator at the remote station for controlling the selection for operation and operation of said totalizers.

67. In a system of the class described, the combination with a home station and a remote station, of an impulse generator at the remote station, a plurality of series of totalizers at the home station, and means controlled by said impulse generator for selecting totalizers of each series whereby the selected totalizers may be operated simultaneously under the control of the impulse generator.

68. In a system of the class described, the combination with a home station and a remote station, of a plurality of manipulative means of different classes at the remote station, of an impulse generator common to and under the control of all of said manipulative means located at the remote station, a plurality of series of totalizers at the home station corresponding to certain of said classes of manipulative means, and means controlled by said impulse generator for selecting totalizers of each series for actuation, whereby the selected totalizers will be actuated under control of the impulse generator.

69. In a system of the class described the combination with a home station and a remote station, of a series of totalizers at the home station selectively operable, and an impulse generator at the remote station for controlling both the selection and operation of the totalizers.

Signed by me at Piqua, county of Miami, and State of Ohio, in the presence of two witnesses.

GEORGE W. LORIMER.

Witnesses:
CHAS. F. SCHUTTA,
EDWARD TEACH.